(12) United States Patent
Tencza, Jr.

(10) Patent No.: US 8,740,684 B1
(45) Date of Patent: Jun. 3, 2014

(54) METHOD AND APPARATUS FOR FOOTBALL BOARD GAME

(76) Inventor: Walter J. Tencza, Jr., Edison, NJ (US)

( * ) Notice: Subject to any disclaimer, the term of this patent is extended or adjusted under 35 U.S.C. 154(b) by 75 days.

(21) Appl. No.: 13/211,540

(22) Filed: Aug. 17, 2011

(51) Int. Cl.
*A63F 3/00* (2006.01)
(52) U.S. Cl.
USPC .................. 463/9; 463/10; 463/14; 273/236; 273/242; 273/243; 273/244; 273/247; 273/259
(58) Field of Classification Search
USPC .............. 463/9–10, 14, 1; 273/236, 242, 243, 273/244, 247, 259, 260
See application file for complete search history.

(56) References Cited

U.S. PATENT DOCUMENTS

| | | | | |
|---|---|---|---|---|
| 1,190,003 | A | 7/1916 | Quinn | 273/259 |
| 2,069,514 | A | 2/1937 | Wylie | 273/94 |
| 3,386,738 | A | 6/1968 | Wylie | 273/259 |
| 4,443,011 | A | 4/1984 | Sheridan | 273/247 |
| 4,989,879 | A | 2/1991 | Nigh | 273/247 |
| 5,046,743 | A | 9/1991 | Salerno | 273/247 |
| 5,158,301 | A | 10/1992 | Martukovich, Jr. | 273/247 |
| 5,221,084 | A | 6/1993 | Stelmach | 273/247 |
| 5,558,335 | A | 9/1996 | Wise | 273/237 |
| 5,957,455 | A * | 9/1999 | Aldridge | 273/260 |
| 6,428,006 | B1 | 8/2002 | Stewart | 273/277 |
| 6,478,300 | B1 | 11/2002 | Pickett | 273/260 |
| 6,715,758 | B1 * | 4/2004 | Shinderman | 273/247 |
| 7,036,820 | B2 | 5/2006 | Macomber | 273/259 |
| 7,159,867 | B2 | 1/2007 | Huley | 273/259 |
| 2008/0122170 | A1 * | 5/2008 | Ruddell | 273/108.1 |

FOREIGN PATENT DOCUMENTS

| | | | |
|---|---|---|---|
| GB | 2030456 A * | 4/1980 | |
| GB | 2221846 A * | 2/1990 | |
| WO | WO 8800853 A1 * | 2/1988 | |

* cited by examiner

*Primary Examiner* — Arthur O Hall
*Assistant Examiner* — Jasson Yoo
(74) *Attorney, Agent, or Firm* — Walter J. Tencza Jr.

(57) ABSTRACT

A plurality of first team player game pieces, a plurality of second team player game pieces, a football designation device, and a game board are provided for playing a football board game. At least one of the player game pieces may have an advantage over one or more of the other player game pieces. One or more of the player game pieces, may be allowed to move twice as fast as one or more other player game pieces, when a first designation is associated with the one or more player game pieces that are given the advantage. The player game pieces given the advantage may move from a "fast" space, marked with a graphic, to another "fast" space, marked with the same graphic, located a predetermined number of spaces away, such as two spaces away, in any direction.

17 Claims, 26 Drawing Sheets

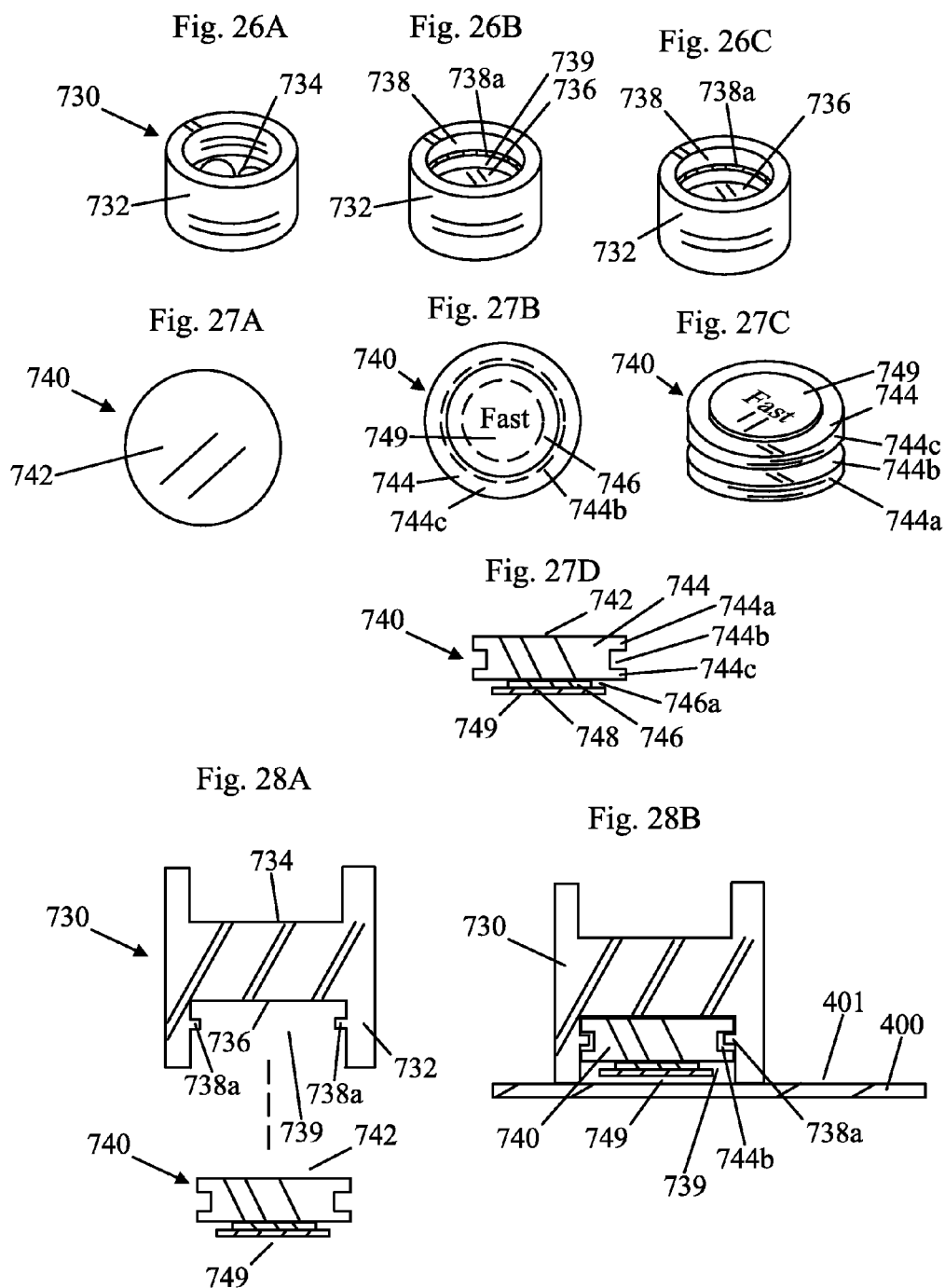

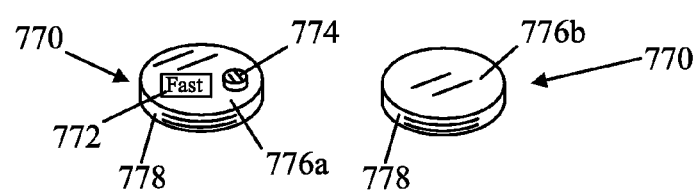
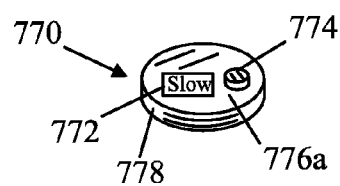
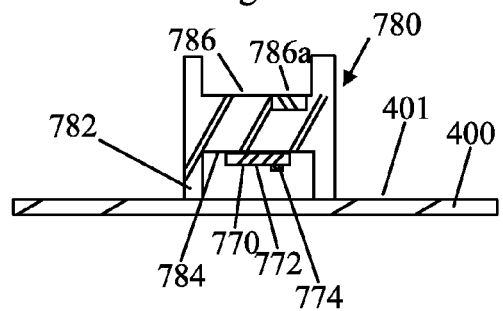

METHOD AND APPARATUS FOR FOOTBALL BOARD GAME

FIELD OF THE INVENTION

This invention relates to improved methods and apparatus concerning football board games.

BACKGROUND OF THE INVENTION

Board games such as checkers, chess, and backgammon have been popular for a long time because although they may require skill, they have straightforward, clear rules and are enjoyable to play. Checkers for example involves moving one piece at a time on a turn, in a clearly defined manner. Chess involves moving one piece at a time on a turn, wherein different pieces move different ways, but these ways are straightforward to understand. Backgammon involves moving two pieces on a turn, but again in a clearly defined manner.

Unlike checkers, chess, and backgammon, there are many games which incorporate various aspects of American Football (hereinafter "football") which have many rules which often may make the games tedious, and not enjoyable to play, such as U.S. Pat. No. 7,036,820 to Macomber, U.S. Pat. No. 4,443,011 to Sheridan, and U.S. Pat. No. 2,069,514 to Wylie. Often these games attempt to replicate every aspect of a football game and end up being far too complex. These games may involve calling many different plays, moving many players in many different ways, and executing many plays in order to score.

There are other games which incorporate football in a superficial sense, but which allow movements which do not resemble football at all. For example, there are "football" chess games which basically play like chess but with football characters and extra points for capturing various pieces, such as U.S. Pat. No. 5,558,335 to Wise. There is also a football checkers game, U.S. Pat. No. 6,428,006 to Stewart, which plays more like checkers, allowing a "quarterback" to jump as many offensive players on a turn as he is able to, something that no real quarterback could ever do. The football checkers game to Stewart, also crams in twelve defensive players and eleven offensive players on an eight space width board, which prevents the game from playing like football. I.e. there is inadequate space to run or throw as in a game of football.

There is a need for a football board game which has straightforward rules so that it is enjoyable to play and which incorporates main aspects of football so it can play like football.

SUMMARY OF THE INVENTION

In at least one embodiment, a plurality of first team player game pieces and a plurality of second team player game pieces, a ball designation device, and a game board, are provided for playing a football board game. At least one of the player game pieces, first team or second team, may be given an advantage over one or more of the other player game pieces. The players given the advantage may be called "fast" players or "fast" player game pieces. The players without the advantage may be called "slow" players or "slow" player game pieces. For example, each non ball carrier player game piece, on offense, may be allowed to move twice as fast as a ball carrier player game piece, on offense, and twice as fast as any player game piece, on defense, under appropriate circumstances. These circumstances may be that a particular non ball carrier offensive player game piece is moving from a "fast" space, marked with a graphic symbol, to another "fast" space, marked with the same graphic symbol, located a predetermined number of spaces away, such as two spaces away, in any direction. Generally allowing player game pieces to move in any direction and allowing the same number of moves makes the rules for a football board game of at least one embodiment of the present invention more straight forward and enjoyable to play.

In at least one embodiment, the football game is played as a three on three game, i.e. only three player game pieces on the first team and three player game pieces on the second team on the field for a play from a scrimmage line. This allows the game board to be relatively compact, and have fewer spaces, and means that fewer player game pieces need to be moved by each team on a turn. For example, the team on offense would only need to move up to three player game pieces on an offensive turn, and then the team on defense would only need to move up to three player game pieces on a defensive turn. In one embodiment, each player game piece of each team is allowed up to two moves, on a particular turn. This makes the rules of movement of player game pieces straight forward to play. Some of the player game pieces may be allowed to take advantage of "fast" spaces during a move and some may not.

A three on three football board game embodiment may be played on a board which has a grid of spaces having ten columns and fourteen rows of spaces. Different numbers of columns and rows can be provided. The number of columns, which represent the width of a football field, should be at least three times the number of player game pieces on each side to allow for adequate spacing for running and getting open for a pass. More player game pieces and a larger board, with a greater number of columns and rows may be provided in other embodiments, however, the three on three embodiment, which is three first team player game pieces versus three second team player game pieces together with a game board having about nine to fifteen columns (i.e. a ratio of between three to one and five to one, inclusive), representing a football field width, and fourteen to twenty-six rows, representing a football field length is preferred since then few player pieces have to be moved, the board is small enough so it will not take up a large area, and the pieces are large enough so they are not easily lost. For example, if each space is one inch by one inch, a ten by fourteen game board only takes up ten inches by fourteen inches, and each game piece can be one inch by one inch, i.e. the size of a space.

One or more embodiments of the present invention provide a method of playing a football game on a game board comprised of a grid of a plurality of spaces, said grid having a plurality of rows and a plurality of columns, each of the plurality of rows having a subset of spaces of the plurality of spaces, and each of the plurality of columns having a subset of spaces of the plurality of spaces, wherein the football game includes a plurality of player game pieces, which includes a plurality of first team player game pieces, including a first team first player game piece and a first team second player game piece, and the plurality of player game pieces includes a plurality of second team player game pieces.

The method may include allowing a first player game piece, which is one of the first team player game pieces or one of the second team player game pieces to move from a first space of the plurality of spaces marked as a first fast space to a second space of the plurality of spaces marked as a second fast space without counting any spaces not marked as fast spaces in between the first fast space and the second fast space towards a number of moves allowed for the first player game piece during an offensive turn if the first player game piece is on offense during a play from a line of scrimmage or during a defensive turn if the first player game piece is on defense during the play from the line of scrimmage.

The method may further include not allowing a second player game piece, which is one of the first team player game pieces or one of the second team player game pieces, to move from the first fast space to the second fast space without counting any spaces not marked as fast spaces in between the first fast space and the second fast space towards a number of moves allowed for the second player game piece during an offensive turn if the second player game piece is on offense during the play from the scrimmage line or during a defensive turn if the second player game piece is on defense during the play from the scrimmage line.

A first subset of the plurality of spaces may be marked as fast spaces, such that the first subset includes a plurality of fast spaces, including the first fast space and the second fast space, and the plurality of spaces includes a plurality of spaces which are not marked as fast spaces. In at least one embodiment, the first fast space and the second fast space are not adjacent to one another and are separated by at least one space of the plurality of spaces, which is not marked as a fast space.

In another embodiment of the present invention a method is provided which includes allowing a first team first player game piece, when the first team, is on offense on a play from a scrimmage line, to make a first predetermined number of non-ball carrier moves into one or more spaces of the plurality of spaces which do not include another player game piece, during a first team first offensive turn, when the first team first player game piece is not designated as a carrier of a football. The method may further include allowing a first team second player game piece, when the first team is on offense, on the play from the scrimmage line, to make the first predetermined number of ball carrier moves into one or more spaces of the plurality of spaces which do not include another player game piece during the first team first offensive turn, when the first team second player game piece is designated as the carrier of the football. The predetermined number may be two, such that two non-ball carrier moves are allowed and two ball carrier moves are allowed.

The method may also include allowing each of a plurality of second team player game pieces, when the second team is on defense on the play from the scrimmage line, to make the first predetermined number of defensive moves, such as two moves, into one or more spaces which do not include another player game piece, during a second team first defensive turn, following the first team first offensive turn.

Each of the first predetermined number of defensive moves may be made by moving one of the plurality of second team player game pieces from a first space of the plurality of spaces to a space of the plurality of spaces adjacent to the first space. Each of the first predetermined number of non-ball carrier moves may be allowed to be made by the first team first player game piece, when the first team is on offense on the play from the scrimmage line, and the first team first player game piece is not designated as the carrier of the football, by either moving the first team first player game piece from a second space of the plurality of spaces to a space of the plurality of spaces adjacent the second space or by moving the first team first player game piece from the second space of the plurality of spaces to a third space of the plurality of spaces which is not adjacent to the second space and which is a second predetermined number of spaces away from the second space. In one or more embodiments, the second space, the third space, and one or more spaces of the plurality of spaces in between the second space and the third space form a straight line. The second predetermined number may be two.

Each of the first predetermined number of ball carrier moves may be allowed to be made by the first team second player game piece when the first team is on offense on the play from the scrimmage line and the first team second player game piece is designated as the carrier of the football, by moving the first team second player game piece from a fourth space of the plurality of spaces to a space of the plurality of spaces which is adjacent to the fourth space.

The method may also include allowing each of the plurality of second team player game pieces, when the second team is on defense on the play from the scrimmage line, to make a covering defensive move by moving into a space which includes one of the plurality of first team player game pieces, wherein any second team player game piece making a covering defensive move during a particular second team defensive turn cannot move again during that particular second team defensive turn.

The first fast space and the second fast space may be separated by one or more spaces of the plurality of spaces which in combination with the first fast space and the second fast space define a straight line. The plurality of fast spaces may be arranged so that each fast space of the plurality of fast spaces is separated from a plurality of next closest fast spaces of the plurality of fast spaces by one space of the plurality of spaces that is not marked as a fast space.

The plurality of fast spaces may be arranged so that a first row of the plurality of rows has at least some fast spaces and rows of the plurality of rows adjacent the first row and an odd number of rows away from the first row have no fast spaces and rows of the plurality of rows a multiple of two rows away from the first row have at least some fast spaces. The plurality of fast spaces may be arranged so that a first column of the plurality of columns have at least some fast spaces and columns of the plurality of columns adjacent the first column and a odd number of columns away from the first column have no fast spaces and columns of the plurality of columns a multiple of two columns away from the first column have at least some fast spaces.

The method, in one embodiment, may also include generating a random number during a first team second offensive turn. The method may further include moving a ball designation device designating a football from the first team second player game piece to the first team first player game piece if (a) a space on which the first team second player game piece is located, and a space on which the first team first player game piece is located, and one or more spaces in between the spaces on which the first team first and the second player game pieces are located, are in a straight line, and (b) if the random number is greater than or equal to a number of spaces that the first team first player game piece is away from the first team second player game piece in a straight line, and (c) if no second team player game piece is located on the space on which the first team first player game piece is located.

The method may further include moving the ball designation device designating the football from the first team second player game piece to a second team first player game piece of the plurality of second team player game pieces if (a) a space on which the first team second player game piece is located, and a space on which the second team first player game piece is located, and the one or more spaces in between the spaces on which the first team second player game piece and the second team first game player piece are located, are in a straight line, and (b) if the random number is equal to a number of spaces that the second team first player game piece is away from the first team second player game piece in a straight line or if the random number is greater than or equal to a number of spaces that the first team first player game piece is away from the first team second game player piece in a straight line and the second team first player game piece is on the same space as the first team first player game piece. In this embodiment, just prior to executing a throw, pitch, or handoff, on the first team second offensive turn, the first team second player game piece is typically designated as the carrier of the football, and the first team first player game piece is typically not designated as the carrier of the football.

The football game may be played on a computer and the game board may be displayed on a computer monitor by a computer processor.

The method may further include playing the football game by having the first team first player game piece on a space of the plurality of spaces, the first team second player game piece on a space of the plurality of spaces, and a first team third player game piece on a space of the plurality of spaces during the first team first offensive turn and by not having any other first team player game pieces on any spaces of the plurality of spaces during the first team first offensive turn. The method may also include playing the football game by having a second team first player game piece on a space of the plurality of spaces, a second team second player game piece on a space of the plurality of spaces, and a second team third player game piece on a space of the plurality of spaces during the second team first defensive turn and by not having any other second team player game pieces on any spaces of the plurality of spaces during the second team first defensive turn.

The plurality of columns of the game board may include at least nine columns, and the plurality of rows may include at least ten rows. There may be a plurality of yard markers to indicate that the plurality of rows represent length in a football field from a first goal line to an opposing second goal line. The first goal line and the second opposing goal line may be delineated on the game board. The plurality of columns may represent width on a football field from a first sideline to a second opposing sideline. The first sideline and the second opposing sideline may be delineated on the game board, wherein the first sideline and the second sideline are substantially perpendicular to the first goal line and the second goal line.

The method may further include allowing a first team player game piece of the plurality of first team player game pieces, when the first team is on offense during the play from the scrimmage line, to push a second team player game piece, which is on defense during the play from the scrimmage line, into another space of the plurality of spaces during the first team first offensive turn.

In at least one embodiment of the present invention an apparatus is provided for playing a football game comprising a plurality of first team player game pieces, a plurality of second team player game pieces, a ball carrier designation device which can be associated with any of the plurality of first team player game pieces or any of the plurality of second team player game pieces, and a game board having a first goal line, an opposing second goal line, a first side line, and an opposing second side line. The game board may have a grid of a plurality of spaces, said grid having a plurality of rows and a plurality of columns, each of the plurality of rows having a subset of spaces of the plurality of spaces, and each of the plurality of columns having a subset of spaces of the plurality of spaces.

The apparatus may be further comprised of a computer processor programmed by computer software to display the game board, the plurality of first team player game pieces, the plurality of second team player game pieces, and the ball carrier designation device on a computer monitor. The apparatus may also be comprised of a computer interactive device configured to receive user inputs to be supplied to the computer processor to move one or more of the plurality of first team player game pieces and one or more of the plurality of second team player game pieces, and the ball carrier designation device on the computer monitor.

In yet another embodiment, each of the plurality of first team player game pieces and each of the plurality of second team player game pieces is a solid piece which can be physically picked up by a user, removed from the board, and moved by a user from one space of the plurality of spaces to another space of the plurality of spaces. The ball carrier designation device may be a detachable solid piece which can be attached to and detached from any of the plurality of first team player game pieces and any of the plurality of second team player game pieces by a user, and physically picked up, removed from the board, and moved by a user from one player game piece, first team or second team, to another player game piece, first team or second team.

At least one embodiment of the present application provides a method of playing a football game on a game board having an image of a football field. The image of the football field may be comprised of a grid of a plurality of spaces, said grid having a plurality of rows and a plurality of columns, each of the plurality of rows having a subset of spaces of the plurality of spaces, and each of the plurality of columns having a subset of spaces of the plurality of spaces, wherein the football game includes a plurality of player game pieces, which includes a first team comprised of a plurality of first team player game pieces, including a first team first player game piece and a first team second player game piece, and the plurality of player game pieces includes a second team comprised of a plurality of second team player game pieces, including a second team first player game piece and a second team second player game piece.

The method may include placing the first team first player game piece on a first space of the plurality of spaces, on a first side of a line of scrimmage, so that a first designation is associated with the first team first player game piece, wherein the first designation as associated with the first team first player game piece is hidden from view when the first team first player game piece is placed on the first space, but the first designation as associated with the first team first player game piece is configured so that a first person controlling the first team first player game piece is able to reveal the first designation as associated with the first team first player game piece. The method may further include placing the first team second player game piece on the first side of the line of scrimmage and on a second space of the plurality of spaces, different from the first space, so that the first designation is not associated with the first team second player game piece.

The method may also include, for a first offensive play (which may include one or more offensive turns and one or more defensive turns) initially placing a football designation device on either the first team first player game piece or the first team second player game piece, so that the football designation device is not hidden from view, wherein the football designation device is different from the first designation.

The method may further include placing the second team first player game piece on a second side of the line of scrimmage opposing the first side, and on a third space of the plurality of spaces, different from the first and second spaces, so that the first designation is associated with the second team first player game piece, wherein the first designation as associated with the second team first player game piece is hidden from view when the second team first player game piece is placed on the third space, but the first designation as associated with the second team first player game piece is configured so that a second person controlling the second team first player game piece is able to reveal the first designation as associated with the second team first player game piece.

The method may further include placing the second team second player game piece on the second side of the line of scrimmage, and on a fourth space of the plurality of spaces, different from the first, second, and third spaces, so that the first designation is not associated with the second team second player game piece.

The plurality of spaces may include a plurality of fast spaces and a plurality of non fast spaces, wherein the plurality of fast spaces includes a first, a second, a third, a fourth, a fifth, a sixth, a seventh, and an eighth fast space, wherein there are one or more non fast spaces between the first fast space and the second fast space in a first straight line, wherein there are one or more non fast spaces between the third fast space and the fourth fast space in a second straight line, wherein there are one or more non fast spaces between the fifth fast space and the sixth fast space in a third straight line, wherein there are one or more non fast spaces between the seventh fast space and the eighth fast space in a fourth straight line.

Each fast space of the plurality of fast spaces may have a first graphic, such that any space of the plurality of spaces having the first graphic is a fast space; and each non fast space of the plurality of non fast spaces does not have the first graphic, such that any space of the plurality of spaces not having the first graphic is a non fast space.

The method may further include during a first team first offensive turn for the first offensive play, moving the first team first player game piece from the first fast space to the second fast space, in the first straight line, and counting this movement as one move, without counting one or more non fast spaces that are between the first fast space and the second fast space in the first straight line; and during the first team first offensive turn for the first offensive play, moving the first team second player game piece from the third fast space to the fourth fast space, in the second straight line, and counting this movement as more than one move, by counting one or more non fast spaces that are between the third fast space and the fourth fast space in the second straight line.

The method may also include during a second team first defensive turn which follows the first team first offensive turn for the first offensive play, moving the second team first player game piece from the fifth fast space to the sixth fast space, in the third straight line, and counting this movement as one move, without counting one or more non fast spaces that are between the fifth fast space and the sixth fast space in the third straight line; and during the second team first defensive turn, moving the second team second player game piece from the seventh fast space to the eighth fast space, in the fourth straight line, and counting this movement as more than one move, by counting one or more non fast spaces that are between the seventh fast space and the eighth fast space in the fourth straight line.

The method may also include alternating turns between the offensive turns for first team and defensive turns for the second teams during an offensive play, until one of the plurality of second team player game pieces occupies the same space of the plurality of spaces as the football designation device.

The first designation as associated with the first team first player game piece may be configured so that a first person controlling the first team first player game piece is able to reveal the first designation as associated with the first team first player game piece by lifting the first team first player game piece off of the game board and turning the first team first player game piece upside down; and the first designation as associated with the second team first player game piece may be configured so that a second person controlling the second team first player game piece is able to reveal the first designation as associated with the second team first player game piece by lifting the second team first player game piece off of the game board and turning the second team first player game piece upside down.

The game board may be displayed on a computer display. The first team first player game piece may be placed on the first space by being displayed on the computer display. The first team second player game piece may be placed on the second space by being displayed on the computer display. The second team first player game piece may be placed on the third space by being displayed on the computer display. The second team second player game piece may be placed on the fourth space by being displayed on the computer display. The football designation device may be placed on either the first team first player game piece or the first team second player game piece by being displayed on the computer display.

The first designation as associated with the first team first player game piece may be configured so that it is able to be revealed by the first person using a computer interactive device to cause the first designation as associated with the first team first player game piece to be displayed on the computer display; and the first designation as associated with the second team first player game piece is able to be revealed by the second person using a computer interactive device to cause the first designation as associated with the second team first player game piece to be displayed on the computer display.

In at least one embodiment, the grid may include a plurality of passing zones, wherein each passing zone of the plurality of passing zones includes one or more adjacent rows of the plurality of rows, and wherein spaces of the plurality of spaces in each passing zone have a substantially same characteristic as spaces in the same passing zone, and a substantially different characteristic from spaces in adjacent passing zones. In at least one embodiment, movement of the ball designation device, along the image of the football field of the game board, in a single direction, from one passing zone of the plurality of passing zones to an adjacent passing zone of the plurality of passing zones is a passing zone transition.

The method may further include generating a random number; and moving the football designation device from a first team passer player game piece of the plurality of first team player game pieces to a first team receiver player game piece of the plurality of first team player game pieces if the random number satisfies a mathematical relationship with respect to a number of passing zone transitions when moving the football designation device, in a single direction, along the image of the football field of the game board from a first location on the game board on which the first team passer player game piece is located to a second location on the game board on which the first team receiver player game piece is located. The mathematical relationship may be that the random number is greater than or equal to the number of passing zone transitions from the first team passer player game piece to the first team receiver player game piece.

The method may include, after the first offensive play has ended: altering the first team first player game piece so that the first designation is no longer associated with the first team first player game piece, altering the second team first player game piece so that the first designation is no longer associated with the second team first player game piece; altering the first team second player game piece so that the first designation is associated with the first team second player game piece; and altering the second team second player game piece so that the first designation is associated with the second team second player game piece.

For a second offensive play the method may further include placing the first team second player game piece on a fifth space of the plurality of spaces, on a first side of a second line of scrimmage, so that the first designation is associated with the first team second player game piece, wherein the first designation as associated with the first team second player game piece is hidden from view when the first team second player game piece is placed on the fifth space, but the first designation as associated with the first team second player game piece is configured so that a first person controlling the first team second player game piece is able to reveal the first designation as associated with the first team second player game piece; and placing the first team first player game piece on the first side of the second line of scrimmage and on a sixth space of the plurality of spaces, different from the fifth space, so that the first designation is not associated with the first team first player game piece;

For the second offensive play, the method may include initially placing a football designation device on either the first team first player game piece or the first team second player game piece, so that the football designation device is not hidden from view, wherein the football designation device is different from the first designation.

The method may further include placing the second team second player game piece on a second side of the second line of scrimmage opposing the first side, and on a seventh space of the plurality of spaces, different from the fifth and sixth spaces, so that the first designation is associated with the second team second player game piece, wherein the first designation as associated with the second team second player game piece is hidden from view when the second team second player game piece is placed on the seventh space, but the first designation as associated with the second team second player game piece is configured so that a second person controlling the second team second player game piece is able to reveal the first designation as associated with the second team second player game piece; and placing the second team first player game piece on the second side of the second line of scrimmage, and on an eighth space of the plurality of spaces, different from the fifth, sixth, and seventh spaces, so that the first designation is not associated with the second team first player game piece.

The method may further include actuating an actuator for the offensive play to cause a time remaining displayed on a clock device to immediately change from a first time remaining to a second time remaining, wherein the difference between the first time remaining and the second time remaining is a predetermined plurality of seconds. A predetermined number for the predetermined plurality of seconds, such as "5" for five seconds, may be stored in computer memory.

The method may include causing the time remaining displayed on the clock device to count down, in between the first offensive play and a second offensive play, so that one second is taken off the time remaining displayed on the clock device for each second that goes by.

The method may further include generating a random number on a field goal attempt for the first team. The method may further include moving the ball designation device, a number of the plurality of spaces of the image of the football field, in a single direction, in a column of the plurality of columns of the image of the football field, based on the random number, until the ball designation device crosses an image of a cross bar of an image of a goal post; and when the ball designation device crosses the image of the cross bar of the image of the goal post, increasing a score for the first team on a score keeping device by three points.

An apparatus, in an embodiment of the present invention, may include a plurality of first team player game pieces, including a first team first player game piece and a first team second player game piece; a plurality of second team player game pieces, including a second team first player game piece and a second team second player game piece. A first designation may be associated with the first team first player game piece and as associated is hidden from view when the first team first player game piece is placed on a first space of the plurality of spaces, but the first designation as associated with the first team first player game piece is configured so that a first person controlling the first team first player game piece is able to reveal the first designation as associated with the first team first player game piece. The first designation may not be associated with the first team second player game piece;

The first designation may be associated with the second team first player game piece and as associated is hidden from view when the second team first player game piece is placed on a second space of the plurality of spaces, but the first designation as associated with the second team first player game piece is configured so that a second person controlling the second team first player game piece is able to reveal the first designation as associated with the second team first player game piece. The first designation may not be associated with the second team second player game piece.

The apparatus may include a football designation device, which is different from the first designation, wherein the football designation device is configured to be placed on any one of the plurality of first team player game pieces or any one of the plurality of second team player game pieces so that the football designation device is not hidden from view.

The first team first player game piece may be configured so that it can be altered to associate or disassociate the first designation with the first team first player game piece. The first team second player game piece may be configured so that it can be altered to associate or disassociate the first designation with the first team second player game piece. The second team first player game piece may be configured so that it can be altered to associate or disassociate the first designation with the second team first player game piece. The second team second player game piece is configured so that it can be altered to associate or disassociate the first designation with the second team second player game piece.

Each of the first team first player game piece, the first team second player game piece, the second team first player game piece, and the second team second player game piece may include an attachment device which allows the first designation to be attached to or detached from each of the first team first player game piece, the first team second player game piece, the second team first player game piece, and the second team second player game piece to associate or disassociate the first designation with each of the first team first player game piece, the first team second player game piece, the second team first player game piece, and the second team second player game piece.

Each of the first team first player game piece, the first team second player game piece, the second team first player game piece, and the second team second player game piece may include a device which allows the first designation to be displayed or not displayed on each of the first team first player game piece, the first team second player game piece, the second team first player game piece, and the second team second player game piece to associate or disassociate the first designation with each of the first team first player game piece, the first team second player game piece, the second team first player game piece, and the second team second player game piece.

The apparatus may include a clock display device; and an actuator in communication with the clock display device. The clock display device has a time remaining on a display which is immediately changed from a first time remaining to a second time remaining in response to actuation of the actuator, wherein the difference between the first time remaining and the second time remaining is a predetermined plurality of seconds.

The apparatus may further include a computer processor, a computer display; a computer interactive device, and a computer memory. The game board may be displayed on the computer display by the computer processor in accordance with a computer program stored in the computer memory. The first team first player game piece, the first team second player game piece, the second team first player game piece, and the second team second player game piece may be displayed on first, second, third, and fourth spaces, respectively, which are different from each other, on the game board on the computer display by the computer processor in accordance with the computer program stored in the computer memory. The football designation device may be displayed on one of the plurality of spaces of the game board on the computer display by the computer processor in accordance with the computer program stored in the computer memory.

The first designation as associated with the first team first player game piece may be configured so that the first designation as associated with the first team first player game piece is able to be revealed by the first person using the computer interactive device to cause the first designation as associated with the first team first player game piece to be displayed on the computer display. The first designation as associated with the second team first player game piece may be configured so that the first designation as associated with the second team first player game piece is able to be revealed by the second person using the computer interactive device to cause the first designation as associated with the second team first player game piece to be displayed on the computer display.

The apparatus may further include a sliding device attached to the game board. The sliding device may be configured to move in a track device parallel to the columns of the image of the football field. The sliding device may have a pointer and the sliding device can be slid to cause the pointer to point to a first line marked with a first yardage number of the image of the football field; and the sliding device can be slid to cause the pointer to point to a second line marked with a second yardage number, different from the first yardage number of the image of the football field. The sliding device may include a football down indicator, indicating first, second, third, or fourth downs.

BRIEF DESCRIPTION OF THE DRAWINGS

FIGS. 26A-C show perspective views of another player game piece;

FIGS. 27A-D show bottom, top, perspective, and a cross sectional views, respectively, of an attachment device for indicating a "fast" player;

FIG. 28A shows a cross sectional view of a player game piece and an attachment device for indicating a fast player, which has not been attached to the player game piece;

FIG. 28B shows a cross sectional view of a player game piece and an attachment device for indicating a fast player, which has been attached to the player game piece;

FIGS. 31A, 31B, and 31C show perspective views of a toggle device which can be set to either indicate a "fast" player or a "slow player";

FIG. 32 shows a cross sectional view of the toggle device of FIGS. 31A-C attached to a player game piece;

DETAILED DESCRIPTION OF THE DRAWINGS

Figure 1:
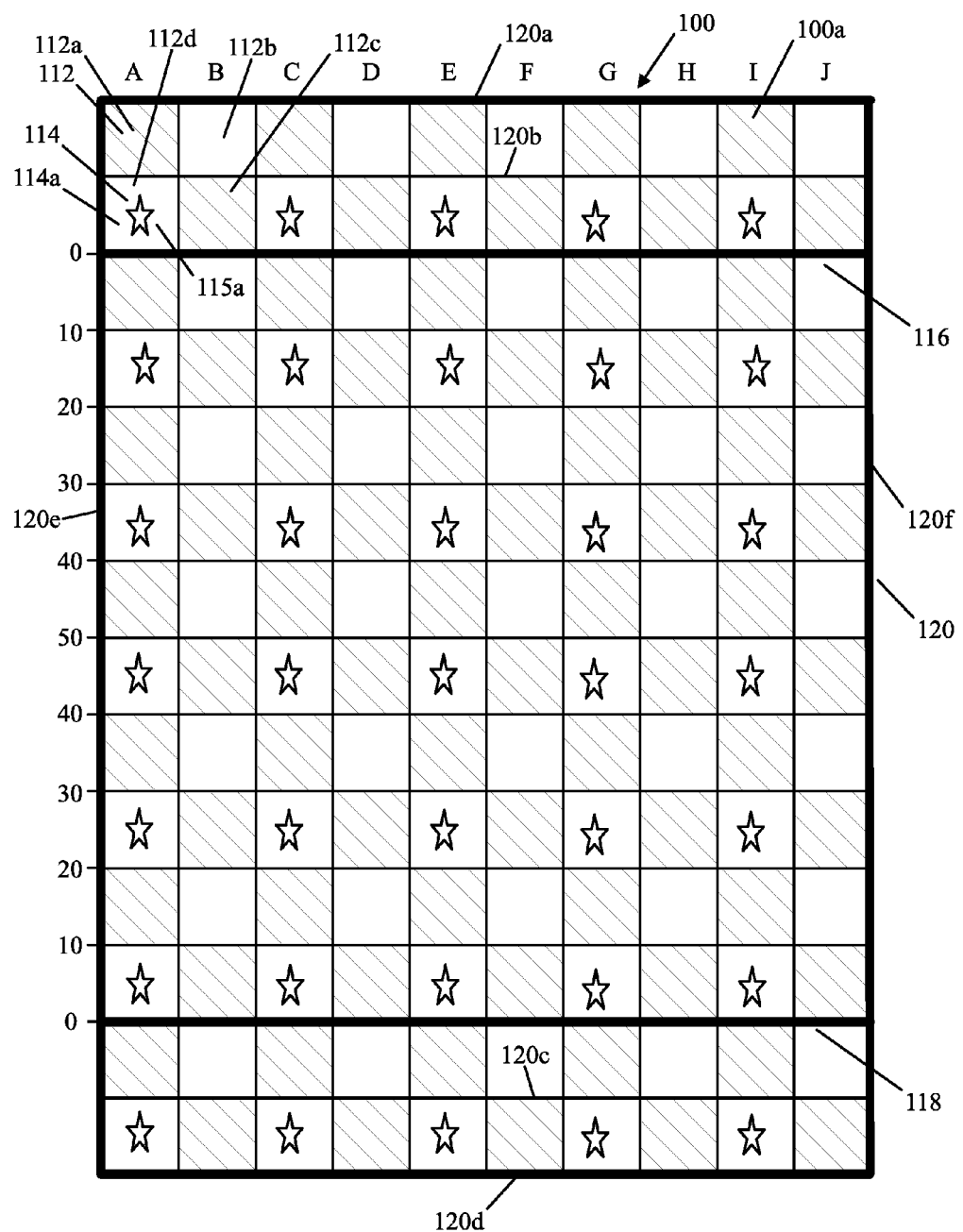
FIG. 1 shows a top view of a football game board in accordance with an embodiment of the present invention.

FIG. 1 shows a top view of a football game board 100 in accordance with an embodiment of the present invention. The football game board 100 include an image of a football field 100a. The football game board 100 may be a part of and may be printed on a piece of cardboard or other hard backing material or may be displayed on a computer monitor, such as a computer monitor 306 of FIG. 11. The game board 100 includes a plurality of spaces 112, such as spaces 112a, 112b, 112c, and 112d. The plurality of spaces 112 are arranged in a grid, which may typically be rectangular in at least one embodiment. The grid includes a plurality of columns marked near the top of FIG. 1, as A, B, C, D, E, F, G, H, I, and J, and a plurality of rows, such as starting from the bottom of FIG. 1, two rows below the line identified as a bottom goal line 118, ten rows above the bottom goal line 118, and two rows above the top goal line 116. Each column has a subset of the plurality 112 of spaces and each row includes a subset of the plurality of spaces 112. In FIG. 1, each of columns A-J has fourteen spaces, and each of the first through fourteenth rows starting from the top of FIG. 1, has ten spaces of the plurality of spaces 112. In alternative embodiments, more columns and more rows than shown in FIG. 1 may be provided. However, to provide adequate spacing for player game pieces to run and get open for passes, it is preferred in one embodiment that the number of spaces in width be at least three times greater than the number of player game pieces on a team. For example, if there are three players on each side or team (in a three versus three game), then there should be at least nine spaces in width from sideline 120*e* to sideline 120*f*. In one embodiment, ten spaces of width (of ten columns A-J) are provided for teams of three player game pieces each.

The spacing for the width of the game board, is somewhat based on the spacing in real football. If each player is a yard in width in real football, then in a real football game, the eleven players take up eleven yard of width of the field. A real football field is one hundred sixty feet wide or about fifty three yards, thus there is a ratio of 53 to 11 or somewhat less than five to 1. Using a game board of at least three to one (spaces in width to number of players on a team) somewhat approximates real football spacing.

The game board 100 includes an outer boundary 120, which may enclose all of the plurality of spaces 112. The outer boundary 120 includes an end line 120*a*, an end line 120*d*, and sidelines 120*e* and 120*f*. A line 120*b* is provided which cuts a top end zone section above the goal line 116 in half, and a line 120*c* is provided which cuts a bottom end zone section below a goal line 118, in half.

The plurality of spaces 112 may have a checkerboard pattern, such that different shades or colors may be alternated every other space. For example, the odd column spaces in the odd rows, starting from the top left hand corner of FIG. 1, may be shaded or colored a first color while the even column spaces in the odd rows may be unshaded or colored a second color, which is different from the first color. For example, in FIG. 1, the space 112*a* in the first column A and first row starting from the top, is shown shaded, while the space 112*b* in the second column B, and the first row starting from the top, has a space 112*b* which is shown unshaded. The odd column spaces in the even rows may be unshaded or colored the second color while the even column spaces in the even rows may be shaded or colored the first color. For example, in FIG. 1, the first column A, second row starting from the top, has a space 112*d* which is shown unshaded, while the second column B, second row starting from the top of FIG. 1, has a space 112*c* which is shown unshaded. The checkerboard pattern is helpful in determining whether there is a straight diagonal line for "throwing" or transferring the football from a ball carrier player game piece on offense (i.e. from the quarterback) to a non-ball carrier, or receiver, or potential defensive interceptor where the ball carrier and the non-ball carrier or receiver, or the potential defensive interceptor are a number of spaces of the plurality of spaces 112, apart from one another. In some embodiments a straight line of spaces for "throwing" or transferring the football is not required.

The spaces in the rows above the top goal line 116 and below the bottom goal line 118 may be colored differently from the spaces in the rows between the goal lines 116 and 118. For example, the spaces in the rows above the top goal line 116 and below the bottom goal line 118 (i.e. in the two end zones or end zone sections) may be a yellow color, with a lighter yellow color used for the even column spaces of the top row in FIG. 1 and first row below the goal line 118 and for the odd column spaces of the second row from the top of FIG. 1 and the last row in FIG. 1 below goal line 118, and a darker yellow color used for the odd column spaces of the top row and for the first row below the goal line 118 and for the even column spaces of the second row from the top and of the last row below the goal line 118.

The spaces between the goal lines 116 and 118 may be colored different shades of green, which may alternate in the shading pattern shown in FIG. 1, i.e. the spaces of the plurality of spaces 112 in between the goal lines 116 and 118 shown shaded in FIG. 1 may be a darker green, while the spaces of 112 in between the goal lines 116 and 118 shown not shaded may be a lighter green.

The plurality of spaces 112 includes a plurality of fast spaces 114, such as the fast space 114*a*. Each fast space is marked to indicate that it is a fast space. In one embodiment, a fast space is identified or marked by having a star symbol or some other graphic or graphic symbol in the space. For example the fast space 114*a* is marked with the star symbol or graphic symbol 115*a*. Each of the other fast spaces of fast spaces 114 is also marked with the same star symbol, as in fast space 114*a*, in FIG. 1. In FIG. 1 there are alternating fast spaces in each even row from the top of FIG. 1 and there are alternating fast spaces in each odd column from the sideline 120*e* to the sideline 120*f*. There are alternating fast spaces in columns A, C, E, G, and I, and there are no fast spaces in columns B, D, F, H, and J. There are alternating fast spaces in each even row from the top of FIG. 1 and there are no fast spaces in the odd rows from the top of FIG. 1. This layout for the plurality of fast spaces 114 allows a user of a football game and of the game board 100 in accordance with an embodiment of the present invention to easily move one or more player game pieces, when permitted to do so, from one fast space to another fast space during a move without counting the non-fast spaces in between the fast spaces. Typically, in at least one embodiment only some of a plurality of player game pieces are allowed to take advantage of the fast spaces, which effectively allows those player game pieces to move faster than other player game pieces.

Figure 2:
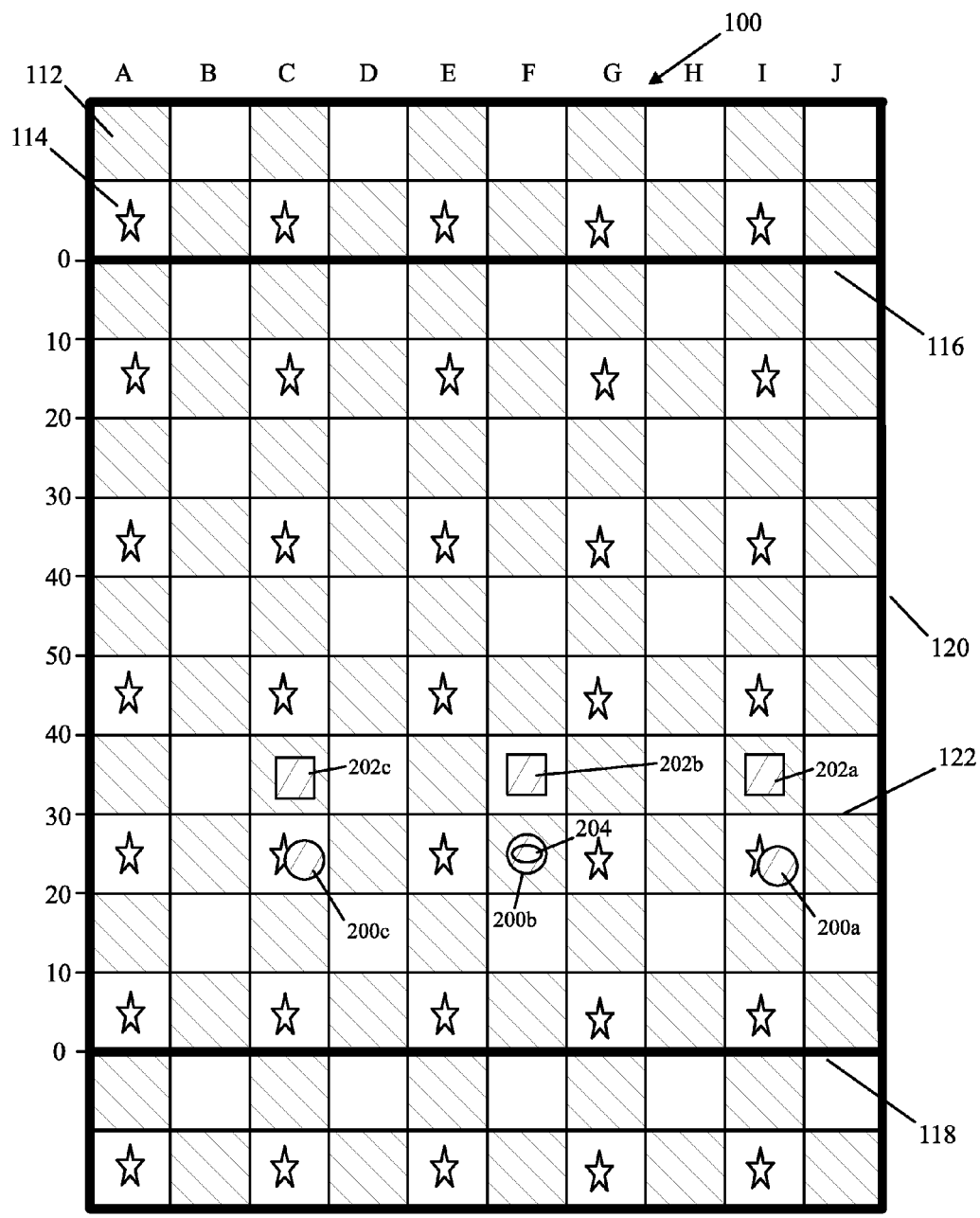
FIG. 2 shows a top view of the football game board of FIG. 1, along with three first team player game pieces, which are on offense for a play from a scrimmage line, three second team player game pieces which are on defense for the play from the scrimmage line, and a ball designation device shown located in spaces of the football game board in a first state.

FIG. 2 shows a top view of the football game board 100 of FIG. 1, along with second team player game pieces 202*a*, 202*b*, and 202*c*, first team player game pieces 200*a*, 200*b*, and 200*c*, and a ball designation device 204 shown located in spaces of the plurality of spaces 112 of the football game board 100 in a first state. Each of the player game pieces 200*a-c* and 202*a-c* may be a solid piece which can be picked up off of the game board 100 by a user. For example, each of the player game pieces 200*a-c* and 202*a-c* may be solid disks or blocks, such as made of wood, plastic, metal or any other solid material. The first team player game pieces 200*a-c* may be colored one color or set of colors, such as for example red (or red and white), consistent with a particular football team, such as the Arizona Cardinals (trademarked) of the NFL (National Football League) (trademarked) while the second player game pieces 202*a-c* would typically be colored a different color or set of colors, such as for example blue (or blue and white), consistent with a particular football team such as the New York Giants (trademarked) of the NFL (trademarked) in order to easily distinguish a first team (comprised of pieces 200*a-c*) from a second team (comprised of pieces 202*a-c*). The pieces 200*a-c* and 202*a-c* may have other team appropriate designations from the NFL or college football, for example. The pieces 200*a-c* may have one shape, such as circular in FIG. 2, while the pieces 202*a-c* may have a different shape, such as square in FIG. 2 to further distinguish the first team from the second team.

Figure 11:
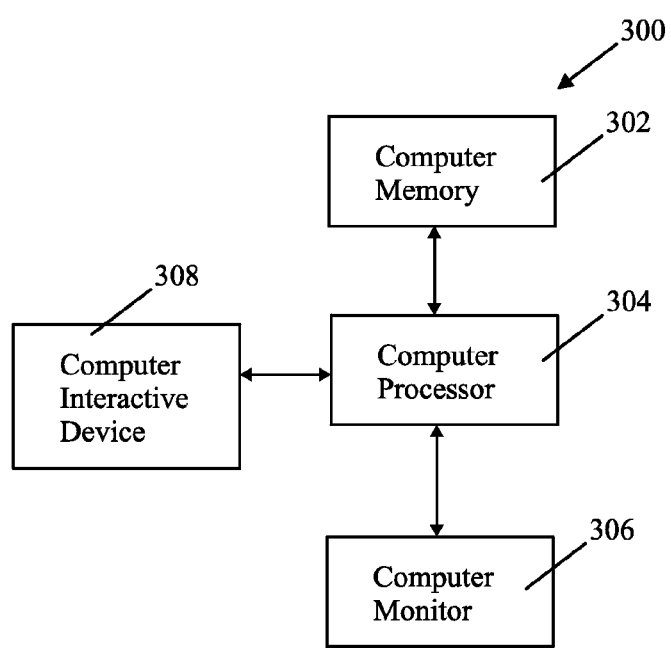
FIG. 11 shows a computer apparatus 300 which can display a game board, such as the game board of FIG. 1 in accordance with an embodiment of the present invention.

In another embodiment, each of the player game pieces 200*a-c* and 202*a-c* may be images shown on a computer screen which can be moved from one location on the computer screen to another location, such as by selecting with a computer interactive device such as 308 in FIG. 11.

In the first state of FIG. 2, a possible set up of the player game pieces 200*a-c* and 202*a-c* for a play from a line of scrimmage or scrimmage line 122 is shown. The first team (200*a-c*) has the ball designation device 204 and therefore is on offense for the set up shown in FIG. 2. The line of scrimmage 122 is labeled as "30" to represent the 30 yard line nearer the goal line 118 than to the goal line 116. There is another line labeled "30" which is the "30" yard line nearer the goal line 116 than to the goal line 118. There are yard lines labeled 0, 10, 20, 30, and 40 nearer the line 116 than line 118, a yard line labeled 50 in the middle, and yard lines labeled 0, 10, 20, 30, and 40 nearer the line 118 than line 116. The yard lines represent yard lines on a football field.

In one embodiment, a team gets a limited number of downs, such as four, to score and there are no first downs. In this embodiment the player game pieces (such as 200*a-c* and 202*a-c*) are effectively bigger in relation to the length of the football game board 100, then in comparison with real football players on a real football field. This is done to make a football game in accordance an embodiment of the present invention more compact, easier to play and more exciting to play since scoring can be done more easily.

When setting up a play from a scrimmage line, such as in this case line 122, assuming the team on offense is trying to score in the direction of goal line 116, typically, each of the player game pieces on the team on offense (in this case pieces 200*a-c*) are placed on a separate space of the plurality of spaces 112 below the line of scrimmage (in this case line 122) and then after the player game pieces (200*a-c* in this example) on offense have been placed, each of the player game pieces on defense (in this case 202*a-c*) are placed on a separate space of the plurality of spaces 112 above the line of scrimmage 122. Although the player game pieces 200*a-c* and 202*a-c* are shown on spaces adjacent to the line of scrimmage 122 in FIG. 2, in at least one embodiment, the player game pieces on defense (202*a-c* in this case) can be placed on any spaces of spaces 112 above the line of scrimmage 122 (typically as long as each of pieces 202*a-c* is on a different space above line 122), and the player game pieces on offense (in this case 200*a-c*) can be placed anywhere below the line of scrimmage 122 (typically as long as each of pieces 200*a-c* are in a different space below the line 122), except that typically the quarterback or initial ball carrier, such as 200*b*, which has ball designation device 104, in FIG. 2, in at least one embodiment, must be placed on a space of spaces 112 which is adjacent the line of scrimmage 122 and below the line of scrimmage 122 in this example, at the start of the play. Note that the strategy of where to place one's player game pieces (such as 202*a-c* in this example) on defense during the initial defensive setup is very important, since in this embodiment the non ball carrier game pieces on offense (200*a-c*) can move faster then the defensive player game pieces when using "fast" spaces 114.

Also note that if the team on offense were trying to score in the opposite direction, i.e. towards goal line 118, then the offensive player game pieces 200*a-c* would be placed in spaces of 112 above the line of scrimmage 122 and the defensive player game pieces 202*a-c* would be placed in spaces of 112 below the line of scrimmage 122.

Typically the team on offense places its player game pieces (in this case 200*a-c*) first during an offensive setup stage, and after the offense has done this, the team on defense places its player game pieces, such as 202*a-c* in spaces during a defensive setup stage.

In FIG. 2, the first team player game piece 200*b* is a ball carrier and the ball designation device 204, which may be shaped in the form of a football, is attached or placed on the game piece 200*b* to indicate that the game piece 200*b* is the initial ball carrier. The ball designation device 204 may be a solid piece which can be picked up and moved by a user. The ball designation device 204 may be magnetically attracted to the game pieces 200*a-c* and 202*a-c* so that 204 can be held by one of the game pieces 200*a-c* or 202*a-c*. Alternatively, another method may be used to hold the ball designation device 204 to one of the game pieces 200*a-c* or 202*a-c*. In another embodiment, the device 204 may be an image on a computer screen or monitor, such as 306 in FIG. 11, which can be moved by clicking on the device 204 with a computer mouse of for example computer interactive device 308.

Figure 3:
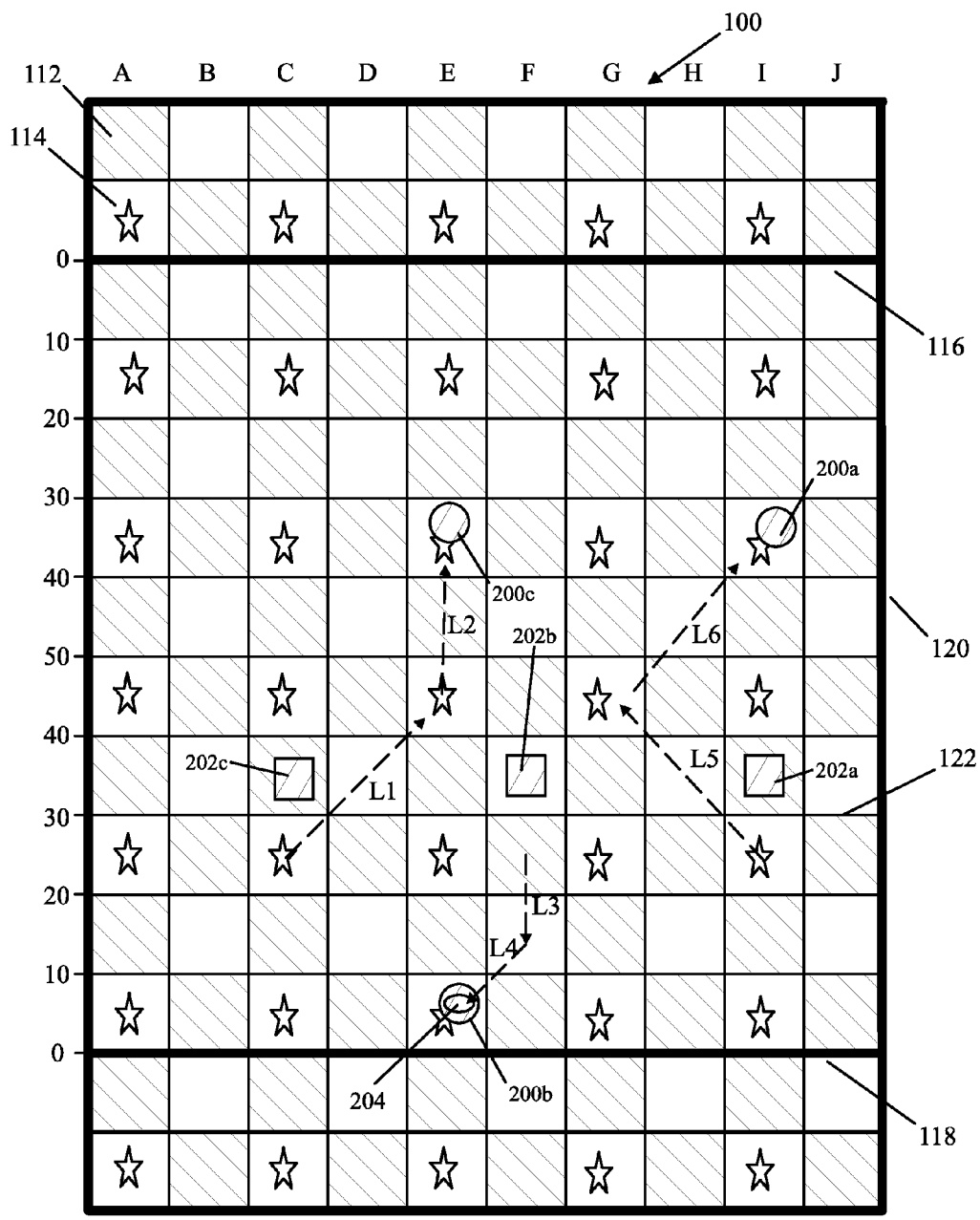
FIG. 3 shows a top view of the football game board of FIG. 1, along with the three first team player game pieces, the three second team player game pieces, and the ball designation device shown in FIG. 2, with the three first team player pieces shown moved during a first team first offensive turn from their positions in FIG. 2 to different positions in FIG. 3, to form a second state.

FIG. 3 shows a top view of the football game board 100 of FIG. 1, along with the three second player game pieces 202*a-c*, the three first team player game pieces 200*a-c*, and the ball designation device 204, with the three first team player pieces 200*a-c* shown moved during a first team first offensive turn from their positions in FIG. 2 to different positions, to form a second state. The first team first player game piece 200*b*, which is the ball carrier in this example, and has ball designation device 204 attached or placed on the piece 200*b*, is allowed in one embodiment, to move two ball carrier moves during an offensive turn. A ball carrier move, in one embodiment, is a move from a first space of the plurality of spaces 112 to a second space of the plurality of spaces 112 which is adjacent to the first space. For example, the first team first player game piece 200*b*, which is the ball carrier, can move one move in the downwards vertical direction of the dashed line L3 from a space in column F between the 30 and 20 yard lines (nearer the goal line 118 than goal line 116) to a space in column F between the 20 and 10 yard line (nearer the goal line 118 than goal line 116). In one embodiment, each player game piece, such as each of player game pieces 200*a-c* and 202*a-c*, has only two moves for each turn, so the player game piece 200*b* may next, for example, move one space in the direction of a line L4 from the space in column F between yard lines 20 and 10 (nearer the goal line 118 than the goal line 116) diagonally into the space in column E between the yard lines 10 and 0 (nearer the goal line 118 than the goal line 116).

Typically, in at least one embodiment, each player game piece, such as each of player game pieces 200*a-c* and 202*a-c*, can move from one space of spaces 112 to an adjacent space of 112, assuming the space is unoccupied, in any direction during a move, such as vertically, horizontally, diagonally, or to the left side or the right side. For example, the first team first player game piece 200*b*, for its first ball carrier move, could have moved from the space in column F, between the 20 and 30 yard lines (nearer the goal line 118 than 116), one space, to any space of the spaces in column G between yard lines 30 and 10 (nearer the goal line 118 than 116), to any space of the spaces in column E between yard lines 30 and 10 (nearer the goal line 118 than 116), and to the space in column F between yard lines 10 and 20 (nearer the goal line 118 than 116). In at least one embodiment, the ball designation device 204 is not allowed to cross the line of scrimmage, such as 122 in this case, on the first offensive turn, giving the defense a chance to move their player game pieces 202*a-c* before the ball designation device 204 crosses the line of scrimmage 122. Thus, in at least one embodiment, in this example, the player game piece 200*b* cannot move into the spaces in columns E, F, and G, between the yard lines 30 and 40 (nearer the goal line 118 than 116) on the first offensive turn. Also, in at least one embodiment, the offensive player game piece carrying the ball designation device 204 cannot attempt to enter a space in which a defensive player game piece is located without ending the play. For example, in at least one embodiment, if the game piece 200*b*, with the ball designation device 204 attempts to enter the space occupied by 202*b*, the play ends, and the line of scrimmage would be the space last occupied by the game piece 200*b*, not the space the game piece 200*b* attempted to enter. In some embodiments, the offensive player game piece, such as 202*b*, carrying the ball, may be allowed to push a defensive player game piece forward before the play ends.

The player game pieces (in this case 200*c* and 200*a*) are not designated as a ball carrier in FIG. 3, because they do not have the football designation device 204. Since they are non-ball carriers, in at least one embodiment, the player game pieces 200c and 200a, while on offense on a play from scrimmage, can effectively move faster than the ball carrier, in this case 200b, and in at least one embodiment, faster than the game pieces 202a-c, which are on defense. The first team player game pieces 200c and 200a, while on offense, can do this, in at least one embodiment by taking advantage of one or more fast spaces of fast spaces 114. For example, player game piece 200c is allowed to be moved directly, during its first move, in the direction of a line L1, from the fast space in column C between the 30 and 20 yard lines (nearer the goal line 118 than 116) to the fast space diagonally across in the column E between the 40 and 50 yard lines (nearer the goal line 118 than 116). Although the player game piece 200c has traveled two spaces of the plurality of spaces 112, the first move of the game piece 200c only counts as one move from the fast space in column C between the 20 and 30 yard lines (nearer to goal line 118 than 116) to the fast space in column E between the 40 and 50 yard lines (nearer to goal line 118 than 116). The player game piece 200c still has another move (its second move for a first team first offensive turn) and can move directly from the fast space in column E between the 40 and 50 yard lines (nearer to the line 118 than 116) to the fast space in column E between the 30 and 40 yard lines (nearer to the line 116 than 118). The second move during this first team offensive turn for game piece 200c only counts as one move although the game player piece 200c has again traversed two spaces of the plurality of spaces 112.

The player game piece 200c could have moved only one space during a move and not have taken advantage of the fast space feature. The offensive player game piece 200c could also have gone in any direction, such as vertical, horizontal, diagonal, or sideways, during either of its two moves. For example, during a move from the fast space in column C between the 20 and 30 yard lines (nearer line 118 than 116), the offensive player game piece 200c, if it is not carrying the football or ball designation device 204, can move to the fast spaces in column E, between yard lines 40 and 50, between the yard lines 20 and 30, or the yard lines 0 and 10 (nearer the line 118 than 116 and assuming these spaces are unoccupied), the fast spaces in column A, between yard lines 40 and 50, between yard lines 20 and 30, or between yard lines 0 and 10 (nearer the line 118 than 116, and assuming these spaces are unoccupied). Typically the game piece 200c cannot move into a space occupied by another game piece, such as one of game pieces 200a, 200b, or 202a-c, however, in some embodiments, the game piece 200c may be able to do this or may be able to push another game piece of game pieces 200a, 200b, or 202a-c. The offensive player game piece 200c could have been moved one space during a first move such as from the space in column C between the 20 and 30 yard lines (nearer the line 118 than 116) to one of the spaces in column B, between the 40 and 10 yard lines (nearer the line 118 than 116), or one of the spaces in column D, between the 40 and 10 yard lines (nearer the line 118 than 116), or into the space in column C between yard lines 10 and 20 (nearer the line 118 than 116). If the game piece 200c is not starting in a fast space, then it can only move, in one embodiment, one space during a move, in any direction.

First team player game piece 200a, is a non-ball carrier in FIGS. 2 and 3, and may be allowed to be moved in a manner similar to the game piece 200c. For example, the game piece 200a can be moved from the fast space in column I, between the 20 and 30 yard lines (nearer line 118 than 116) to the fast space in column G, between the 40 and 50 yard lines in a direction of a line L5 during a first move, and then can be moved to a fast space in column I between yard lines 30 and 40 (nearer 116 than 118). In one or more embodiments, although some exceptions may apply, player game pieces of 200a-c and 202a-c, are not allowed to run over another player game piece. Therefore the player game piece 200a is not allowed to go directly from the fast space in column I, between yard lines 20 and 30 (nearer 118 than 116) to the fast space in column I between yard lines 40 and 50 (nearer 118 than 116) on a single move. The game piece 200a, however, could have done its first move, as shown in FIG. 3, and then used its second move to move from the fast space in column G between the 40 and 50 yard lines (nearer 118 than 116) to the fast space in column I, between the 40 and 50 yard lines (nearer 118 than 116).

Figure 4:
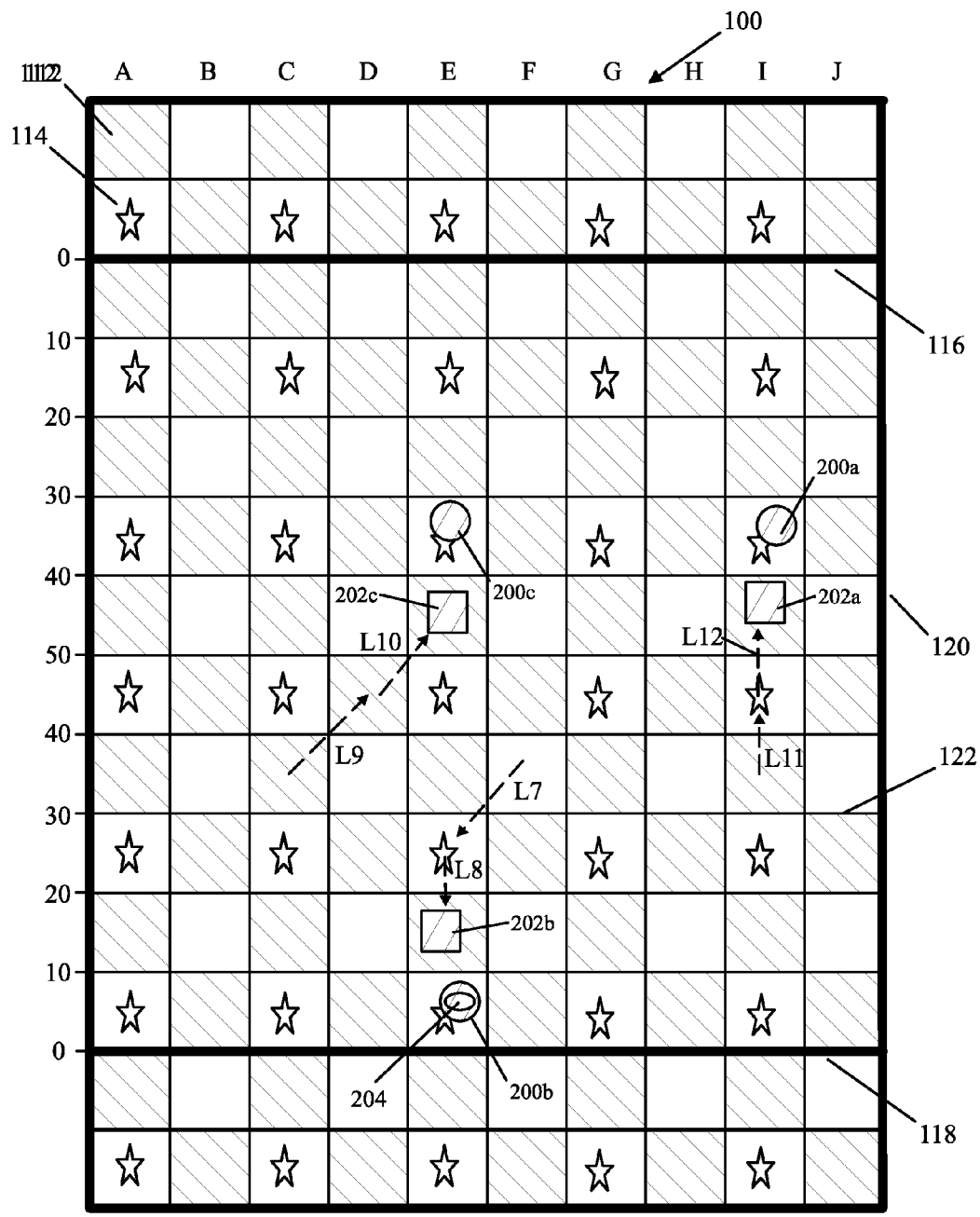
FIG. 4 shows a top view of the football game board of FIG. 1, along with the three first team player game pieces, the three second team player game pieces, and the ball designation device also shown in FIGS. 2 and 3, with the three second team player pieces shown moved during a second team first defensive turn from their positions in FIGS. 2 and 3 to different positions in FIG. 4, to form a third state.

FIG. 4 shows a top view of the football game board 100 of FIG. 1, along with the three second team player game pieces 202a-c, which are on defense, the three first team player game pieces 200a-c, which are on offense, and the ball designation device 204, with the three player game pieces 202a-c shown moved during a second team first defensive turn from their positions in FIGS. 2 and 3 to different positions in FIG. 4, to form a third state. In at least one embodiment, the game pieces 202a-c cannot take advantage of the fast spaces, since they are on defense, and thus effectively move slower than the non-ball carrier player game pieces 200a and 200c, which are currently on offense. In other embodiments, one or more game player pieces may be able to take advantage of the fast spaces, while on defense. In other embodiments the player game piece with the ball designation device may be able to take advantage of the fast spaces.

FIG. 4 shows an example, where each of the second team player game pieces 202a-c, currently on defense, have been moved two moves during a second team first defensive turn, and wherein the game pieces 202a-c are not allowed to take advantage of the fast spaces. The player game piece 202a has been moved one space in the direction of a line L11, during a first move from the space in column I, between the 30 and 40 yard lines (nearer the line 118 than the line 116) to the space in column I, between the 40 and 50 yard lines (nearer the line 118 than the line 116). The player game piece 202a has been moved one space in the direction of a line L12, during a second move from the space in column I, between the 40 and 50 yard lines (nearer the line 118 than the line 116) to the space in column I, between the 50 and 40 yard lines (nearer the line 116 than the line 118).

The second team player game piece 202b has been moved one space in the direction of a line L7, during a first move from the space in column F, between the 30 and 40 yard lines (nearer the line 118 than the line 116) to the space in column E, between the 20 and 30 yard lines (nearer the line 118 than the line 116). The second team player game piece 202b has been moved one space in the direction of a line L8, during a second move from the space in column E, between the 20 and 30 yard lines (nearer the line 118 than the line 116) to the space in column I, between the 10 and 20 yard lines (nearer the line 118 than the line 116).

The second team player game piece 202c has been moved one space in the direction of a line L9, during a first move from the space in column C, between the 30 and 40 yard lines (nearer the line 118 than the line 116) to the space in column D, between the 40 and 50 yard lines (nearer the line 118 than the line 116). The second team player game piece 202c has been moved one space in the direction of a line L10, during a second move from the space in column D, between the 40 and 50 yard lines (nearer the line 118 than the line 116) to the space in column E, between the 50 and 40 yard lines (nearer the line 116 than the line 118).

In at least one embodiment, each of the player game pieces 202a-c, when on defense, is allowed to move two moves during a defensive turn and during each move, each player game piece is allowed to move from one space of spaces 112 to an adjacent space of spaces 112 in any direction, such as vertical, horizontal, or diagonally. In at least one embodiment, a player game piece, such as one of pieces 202a-c, when on defense, can land on a space occupied by a player game piece of the opposing team, when the opposing team is on offense, when the offensive player game piece is the ball carrier, i.e. has ball designation device 204, in order to tackle the offensive player game piece ball carrier and end the play. A new play from scrimmage would then start, assuming it wasn't fourth down, from a yard line above (towards the top of FIG. 4) where the offensive player game piece ball carrier was tackled, in the example of FIG. 4, where the offense is trying to score over goal line 116 at the top of FIG. 4.

In addition, in at least one embodiment, a player game piece on defense, such as in FIG. 4, one of pieces 202a-c, can land on a space occupied by a non-ball carrier offensive game piece (such as one of pieces 200a and 200c in FIG. 4) in a covering move, however, in that case, the particular defensive player game piece is not allowed any further moves on the particular defensive turn. In that way, the defensive player game piece is not allowed to run over the offensive player game piece, in one embodiment, but can cover a pass as will be described.

Figure 5:
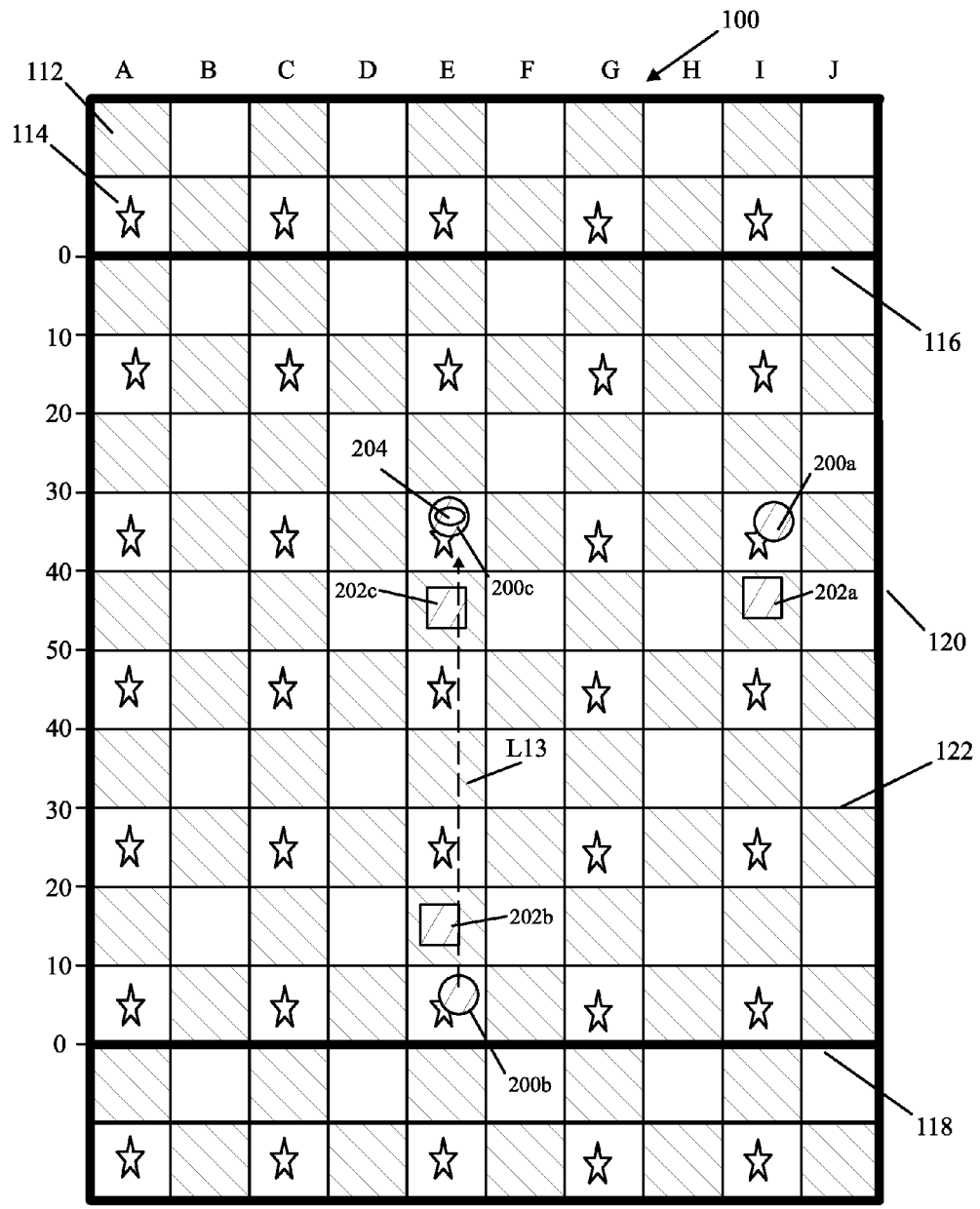
FIG. 5 shows a top view of the football game board of FIG. 1, along with the three first team player game pieces, the three second team player game pieces, and the ball designation device also shown in FIGS. 2, 3, and 4, with the ball designation device shown moved during a first team second offensive turn from its position in FIG. 4 to a different position in FIG. 5, to form a fourth state.

FIG. 5 shows a top view of the football game board 100 of FIG. 1, along with the three second team player game pieces 202a-c, the three first team player game pieces 200a-c, and the ball designation device 204, with the ball designation device 204 shown moved during a first team second offensive turn from its position in FIG. 4 to a different position, to form a fourth state.

The sequence explained prior to FIG. 5, is as follows: the team on offense, in this case the first team (controlled by a first person or first human player) sets up or places its game pieces 200a-c, typically first, then the defense (controlled by a second person or second human player) sets its second team player game pieces on defense, such as in this case 202a-c (set up shown by FIG. 2), then the offense plays a first offensive turn (shown by the movement of player game pieces 200a-c and ball designation device 204 from FIG. 2 to FIG. 3), then the defense plays a first defensive turn (shown by the movement of player game pieces 202a-c from FIG. 3 to FIG. 4). After the first defensive turn, the offense may play a second offensive turn, and the defense may thereafter play a second defensive turn, and the offense and the defense may continue to alternate until the play is concluded by the ball carrier being tackled typically by one of the player game pieces on defense, such as 202a-c in this example, landing on a space occupied by a ball carrier player game piece on offense, such as 200b in this example (or whichever player game piece has the ball designation device 204, or in other circumstances to be described.

Figure 12:
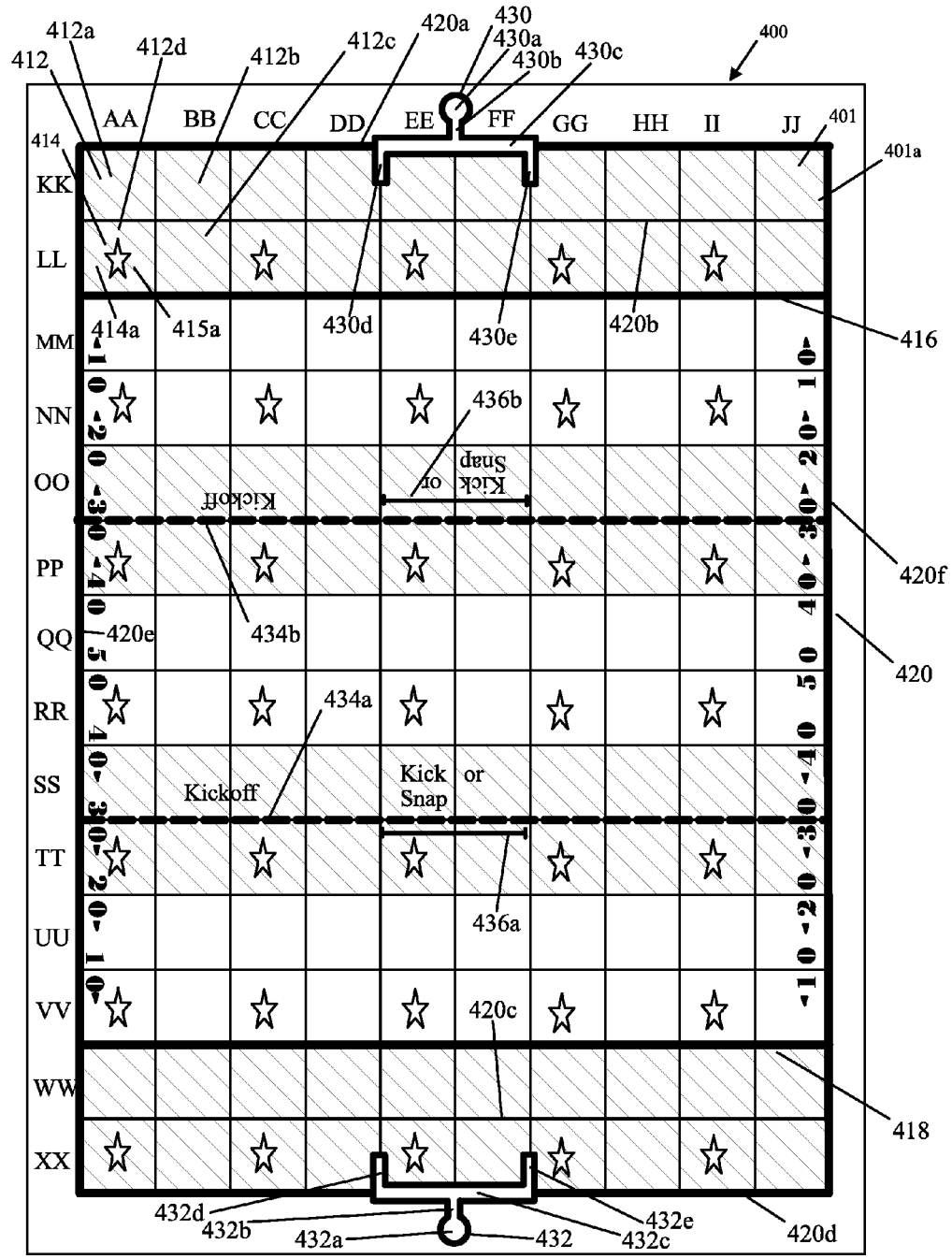
FIG. 12 shows a top view of another football game board in accordance with another embodiment of the present invention.

FIG. 5 shows an example, of a passing play by the offense. If the offense wants to make a pass, pitch, or handoff, from the ball carrier (such as ball carrier 200b in FIG. 4) to a non-ball carrier, such as 200c in FIG. 4, in one embodiment, the ball carrier 200b, the non-ball carrier 200c, and any one or more spaces in between the ball carrier 200b and 200c must be in a straight line, in at least one embodiment, such as a straight vertical, horizontal or diagonal line. However, in other embodiments, such as for example, wherein passing zones are used as shown in FIG. 12, the passer and the receiver game pieces do not need to be in a straight line of spaces.

In a straight line example of FIG. 4, the game piece 200c, the game piece 200b, and spaces in column E between yard lines 40 (nearer line 116 than 118) and yard line 10 (nearer line 118 than 116) form a straight line of spaces. Thus ball carrier 200b can throw a pass to the non-ball carrier 200c shown in FIG. 4. The fact that there are two second team player game pieces 202b and 202c on defense in between the ball carrier 200b and the non ball carrier 200c in FIG. 4 does not prevent the offense from attempting a pass. However, in one embodiment, if the non ball carrier (receiver) is more than two spaces away from the ball carrier (thrower) then the offense uses a random number generator to determine where the ball designation device 204 goes. The random number generator may be a pair of dice. In FIG. 4, the non ball carrier or receiver 200c is six spaces away from the ball carrier 200b, in the direction of the straight line L13. In one embodiment, the offense may use its offensive turn to roll a pair of dice or otherwise generate a random number. In the example of FIGS. 4-5, If the random number is six or above, then the pass is complete and the ball designation device 204 is moved six spaces to the offensive player game piece 200c, which now becomes the ball carrier. In one embodiment, if the random number is greater than the number of spaces that the receiver is away from the thrower, than the receiver upon receiving the ball may move that number of ball carrier spaces. For example, if a seven were rolled for the FIG. 5 example, the receiver game piece 200c which caught the ball can then move one space.

If the number generated by the random number generator is less than the number of spaces that the receiver is away from the thrower, then in one embodiment the ball or ball designation device 204 is moved that number of spaces in a direct line from the thrower towards the receiver. For example, if a five was rolled, then the ball designation device 204 would be moved five spaces into the space in which the second team player game piece 202c on defense is located in FIG. 5. Because the player game piece on defense, in this case 202c, is located on the same space as the ball designation device 204, that would be an interception. The game piece 202c would then be able to move two moves during an intercepting team's turn, along with the other pieces 202a and 202b. The team that lost the ball can thereafter move two moves, after the intercepting team, to try to stop the intercepting team. The teams may thereafter continue to alternate turns. During an interception, sequence, in one embodiment, no player game pieces may be able to take advantage of the fast spaces 114. Alternatively, player game pieces may retain "fast" or "slow" designations that were set at the beginning of the offensive play which resulted in the interception.

If the number generated on a pass play makes the ball designation device 204 land on an unoccupied space of spaces 112, then the pass may either be considered incomplete, or the ball designation device 204 may be left in the appropriate space of spaces 112, until a player game piece, such as one of 200a-c or 202a-c moves into that space. While the ball is "in the air" i.e. lying in that space, the offensive player game pieces 200c and 200a may be allowed to use the fast spaces 114 while the defensive player game pieces 202a-c, and the player game piece 200b that threw the ball, may not be allowed to use the fast spaces. This simulates the concept of a receiver in real football coming back for the ball.

In at least one embodiment, if the receiver offensive game piece is less than two spaces away from the thrower (or player game piece handing off or pitching) game piece than the receiver and the offensive game piece which is not the receiver and not the thrower, may move their predetermined number of moves on a turn, such as two, but the thrower may not. In this embodiment, the thrower's moves are done by moving the ball designation device 204, and so the thrower does not move during a turn in which the thrower throws or hands off.

If the receiver game piece on offense is more than two spaces of spaces 112 away from the thrower then in one embodiment, the offense must use an entire turn in order to attempt a throw. This means that no player game pieces of 200a-c, on offense during a throw of over two spaces, may be moved, but rather only the ball designation device 204 moves during a throwing offensive turn. However, in one embodiment, a receiver offensive game piece may move after catching the ball, if the roll is greater than the number of spaces that the receiver is away from the thrower.

After a receiver receives the ball, the receiver typically in one embodiment becomes a ball carrier and can only move ball carrier moves, which in one embodiment means a move from a space into an adjacent space and does not allow the ball carrier to take advantage of the fast spaces 114.

If a defensive player game piece is on the same space as an offensive player game piece receiver, and a throw is attempted which reaches the space where the two are located then the throw will be intercepted in one or more embodiments. For example, if defensive player game piece 202c is on the same space as offensive player game piece 200c, and a throw is attempted and the roll on the dice is sufficient for the ball designation device 204 to reach the pieces 202c and 200c, then the defensive player game piece 202c intercepts the ball and has the next turn.

Figure 6:
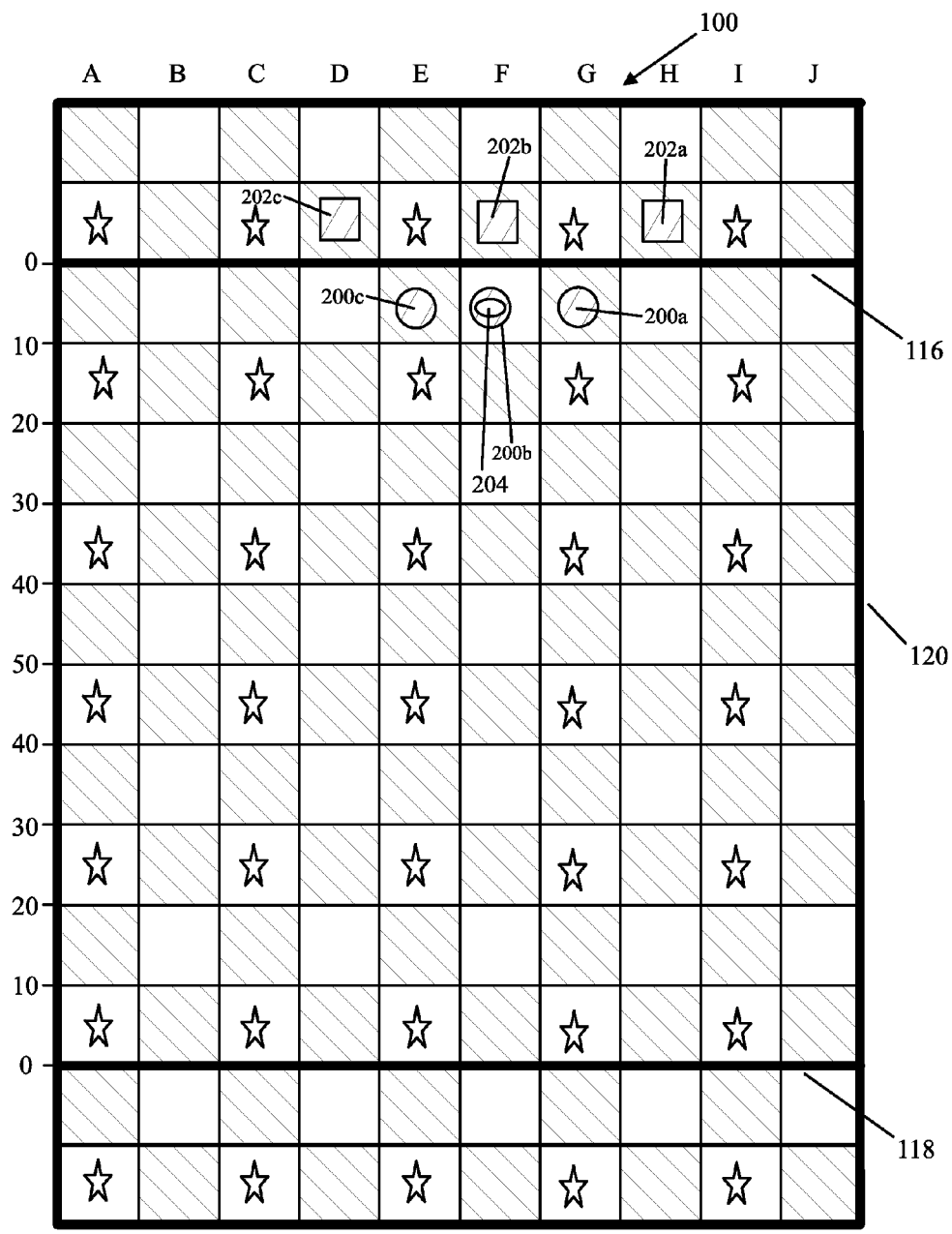
FIG. 6 shows a top view of the football game board of FIG. 1, along with the three first team player game pieces, the three second team player game pieces, and the ball designation device, with the player game pieces and the ball designation device shown set up in different spaces to form a fifth state.

FIG. 6 shows a top view of the football game board 100 of FIG. 1, along with the three second team player game pieces 202a-c, which are on defense, the three first team player game pieces 200a-c, which are on offense, and the ball designation device 204, with the game pieces 202a-c and 200a-c and the ball designation device 204 shown set up in different spaces to form a fifth state. FIG. 6 shows a possible goal line set up at the goal line 116.

Figure 7:
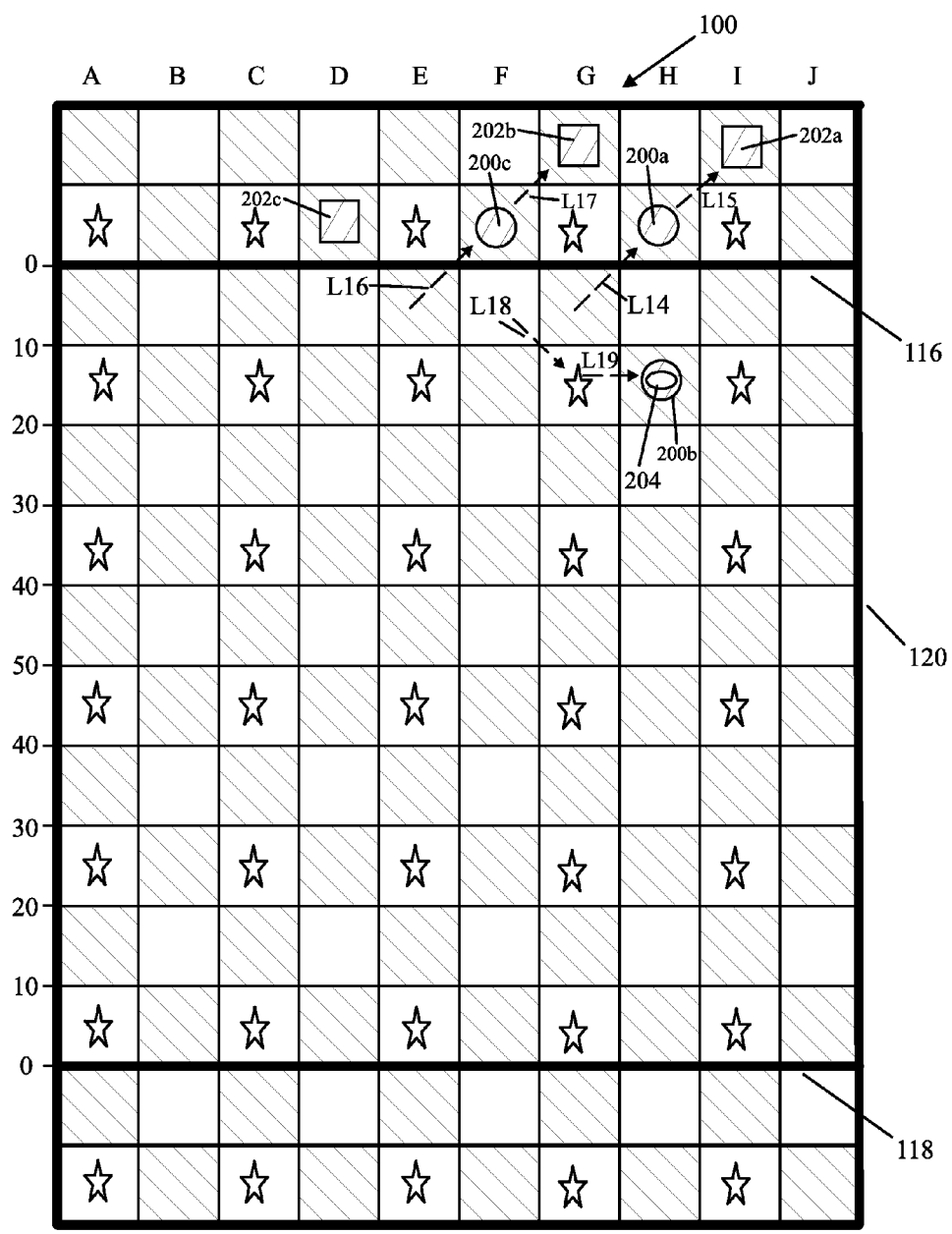
FIG. 7 shows a top view of the football game board of FIG. 1, along with the three first team player game pieces, the three second team player game pieces, and the ball designation device, with the first team player game pieces and the ball designation device shown moved from the positions of FIG. 6 during a first team first running offensive turn to different spaces in FIG. 7, to form a sixth state.

FIG. 7 shows a top view of the football game board 100 of FIG. 1, along with the three player game pieces 202a-c, the three player game pieces 200a-c, and the ball designation device 204, with the player game pieces 200a-c and the ball designation device 204 shown moved from the positions of FIG. 6 during a first team first running offensive turn to different spaces to form a sixth state. FIG. 7 demonstrates a "pushing" feature in accordance with one embodiment of the present invention. Each player game piece of pieces 200a-c, which is a non ball carrier, and which is on offense, may be permitted to push a player game piece on defense into another space. For example, player game piece 200c has moved, in a direction of a diagonal line L16, from a space in column E, between the 0 and 10 yard lines (nearer 116 than 118) to a space in column F in the first row above the goal line 116, from FIGS. 6 to 7. In addition, the player game piece 202b, on defense, has been moved, in a direction of diagonal line L17 during an offensive turn, from the space in column F, in the first row above the goal line 116 to the space in column G, in the second row above goal line 116. The player game piece 200c, on offense, has effectively used its two moves to push the player game piece 202b in a diagonal direction. In at least one embodiment, each player game piece, which is the non carrier of the ball, and which is on offense, may use its two moves to push a player game piece which is on defense, one space, so that the pushing offensive player game piece takes the space of the defensive player game piece and the defensive player game piece is pushed in the direction of the offensive player game piece's move (in this case diagonally upwards).

In at least one embodiment, in order to execute this "push" the particular offensive player game piece must have both of its two moves left. Effectively, there is one move to move the defensive player game piece and one move to move the offensive player game piece, which adds up to the offensive player game piece's two moves. Typically, two defensive player game pieces cannot be pushed so that if there were two defensive player game pieces one directly behind the other in a vertical direction, the offensive player game piece could not push both in the vertical direction.

In FIG. 7 the first team player game piece 200a has executed a push on the second team player game piece 202a. The first team player game piece 200a has moved in an upwards diagonal direction of line L14 from the space in column G, between lines 0 and 10 (nearer 116 than 118) to the space in column H, in the first row above line 116, and the second team player game piece 202a has been pushed during an offensive turn in the direction of line L15 from the space in column H, first row above the line 116, to the space in column I, second row above the line 116.

The ball carrier player game piece 200b has been moved two ball carrier moves from FIG. 6 to FIG. 7. The piece 200b has been moved from a space in column F between lines 0 and 10 (nearer line 116 than 118) in a direction of a line L18 to a space in column G, between lines 10 and 20 (nearer line 116 than 118) during a first move, and in a direction L19 to a space in column H, between lines 10 and 20 (nearer line 116 than 118) during a second move. After the offensive turn, the defense gets a chance to move its defensive player game pieces 202a-c, typically in one embodiment, two moves each, in a manner previously explained.

Figure 8:
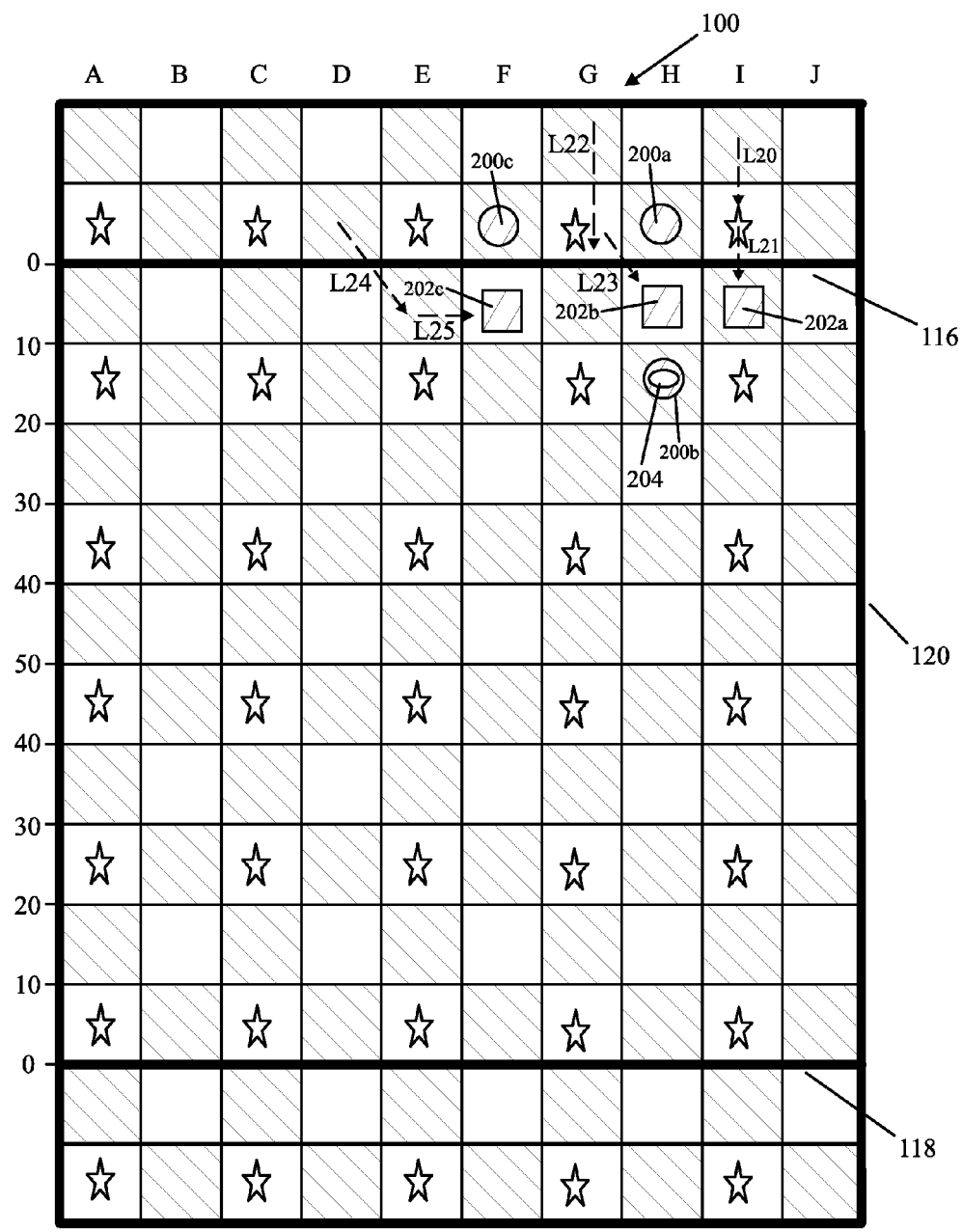
FIG. 8 shows a top view of the football game board of FIG. 1, along with the three first team player game pieces, the three second team player game pieces, and the ball designation device, with the second team player game pieces shown moved from the positions of FIG. 7 during a second team first running defensive turn to different spaces to form a seventh state.

FIG. 8 shows a top view of the football game board 100 of FIG. 1, along with the three second team player game pieces 202a-c, currently on defense, the three player game pieces 200a-c, currently on offense, and the ball designation device 204, with the game pieces 202a-c shown moved from the positions of FIG. 7 during a second team first running defensive turn to different spaces to form a seventh state. The player game piece 202c has moved from a space in column D, first row above line 116 to a space in column E, first row below line 116 in a direction L24 during a first move, and then in a direction L25 to a space in column F, in the first row below line 116, during a second move. The player game piece 202b has moved from a space in column G, first row at the top of the page to a space in column G, first row above line 116 in a direction L22 during a first move, and then in a direction L23 to a space in column H, in the first row below line 116, during a second move. The player game piece 202a has moved from a space in column I, first row at the top of FIGS. 7 and 8, to a space in column I, first row above line 116 in a direction L20 during a first move, and then in a direction L21 to a space in column I, in the first row below line 116, during a second move.

Figure 9:
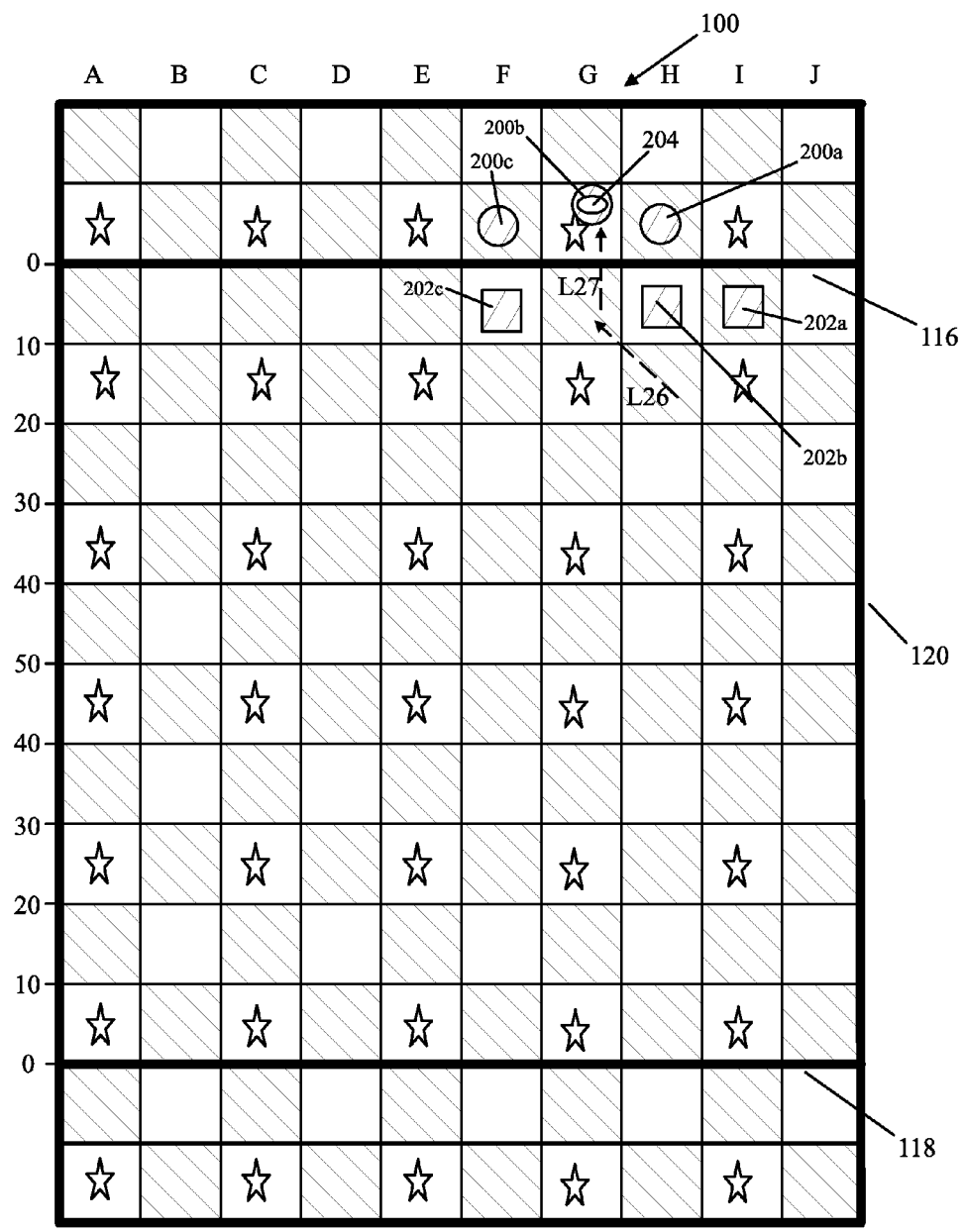
FIG. 9 shows a top view of the football game board of FIG. 1, along with the first team player game pieces, the three second team player game pieces, and the ball designation device, with the first team player game pieces and the ball designation device shown moved from the positions of FIG. 8 during a first team second running offensive turn to different spaces in FIG. 9, to form an eighth state.

FIG. 9 shows a top view of the football game board 100 of FIG. 1, along with the three second team player game pieces 202a-c, the three first team player game pieces 200a-c, and the ball designation device 204, with the player game pieces 200a-c and the ball designation device 204 shown moved from the positions of FIG. 8 during a first team second running offensive turn to different spaces to form an eighth state. The player game piece 200b and the ball carrier designation device 204 located thereon, have been moved from a space in column H, between yard lines 10 and 20 (nearer 116 than 118) in a direction L26 during a first move, to a space in column G, first row below the line 116, and then in a direction L27 during a second move, to a space in column G, first row above the line 116. Because the ball carrier, offensive player game piece 200b and the ball designation device 204 that it is carrying have crossed the goal line 116 into the end zone section which includes the two rows of spaces above the line 116, the offensive team has scored a touchdown for six points. The offensive team may attempt an extra point by using a random number generator such as a die or dice. In one embodiment, rolling a predetermined number on a die or dice or higher that the predetermined number may complete an extra point and rolling less than a predetermined number may mean a missed extra point. For example rolling a one on a die may mean a missed extra point and a two or higher a made extra point. Alternatively, extra points may be attempted by moving the ball designation device 204 a number of spaces, mathematically related to a random number generated (such as greater than or equal to the random number) along an image of a football field on game board 100 (or 400 of FIG. 12), and a successful extra point is moved over an image of a crossbar, such as 430c of an image of a goal post, such as 430.

The teams may then do a kickoff from the team that just scored to the team that did not score. The game pieces 200a-c would then become the kicking team and the game pieces 202a-c would become the receiving team. Assuming the receiving team is tackled on the kickoff or the ball goes out of the end zone, the first team player game pieces 200a-c would then become defensive player game pieces and would move in the manner of a player game piece on defense as previously described. Second team player game pieces 202a-c would become offensive player game pieces and would move in the manner of player game pieces on offense as previously described. Thus during a game, in at least one embodiment the player game pieces 200a-c and 202a-c (and 800a-c and 802a-c of FIGS. 33-35) would play both offense and defense. Each of the first team player game pieces of 200a-c (or 800a-c) may be identical to each other, except for designations which may or may not be associated to indicate whether each game piece is "fast" (able to take advantage of "fast spaces") or "slow" (not able to take advantage of "fast" spaces). Each of the second team player game pieces 202a-c (or 802a-c) may be identical to each other, except for designations which may or may not be associated to indicate whether each game piece is "fast" (able to take advantage of "fast spaces") or "slow" (not able to take advantage of "fast" spaces). This aids in one or more embodiments, in keeping the rules of a football game straight forward, in accordance with at least one embodiment of the present invention, so that the game is enjoyable to play.

Figure 10:
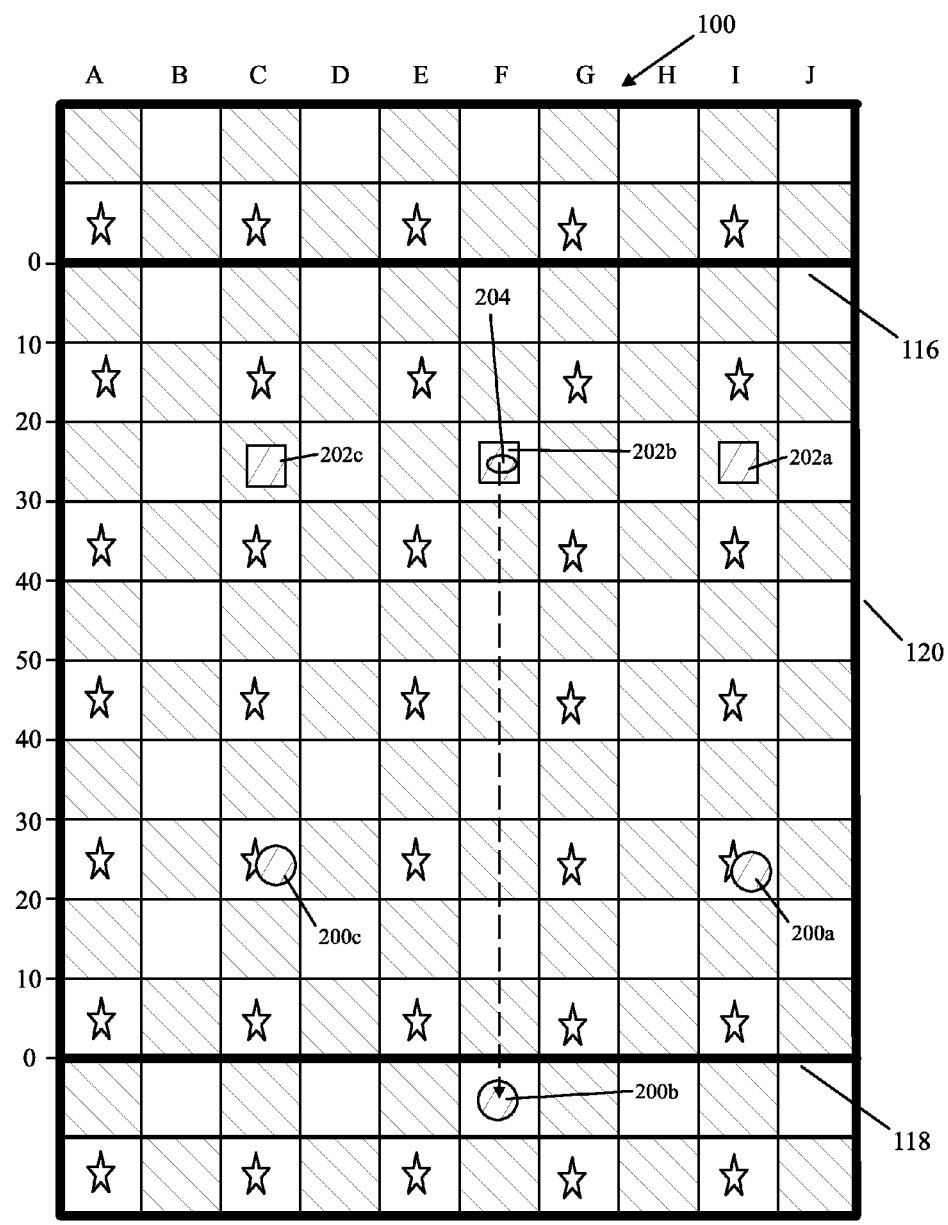
FIG. 10 shows a top view of the football game board of FIG. 1, along with the three first team player game pieces, the three second team player game pieces, and the ball designation device, with the player game pieces and the ball designation device set up for a kickoff.

FIG. 10 shows a top view of the football game board 100 of FIG. 1, along with the three second team player game pieces 202a-c, the three first team player game pieces 200a-c, and the ball designation device 204, with the game pieces 200a-c and 202a-c and the ball designation device 204 set up for a kickoff.

The kicking team, such as in this case including 202a-c, may set its player game pieces on any space above the 30 yard line in the FIG. 10 example (nearer to the goal line 116 than 118, in the FIG. 10 example). If the kickoff occurs from the 30 yard line closer to the bottom goal line 118, then the kicking player game pieces may be set in any spaces below the 30 yard line (nearer to the goal line 118). However, typically the kicker, the player game piece starting with the ball designation device 204, such as 202b, in FIG. 10, would start on a space just above and adjacent to the 30 yard line in the example of FIG. 10 and in a column which is substantially central, such as column F in FIG. 10. The kick receiving team would be placed in any space below the 30 yard line nearer the line 118 than 116, in the example of FIG. 10. A random number generator can be used to determine a number of spaces that the ball designation device 204 or football travels. For example, a pair of dice can be rolled and the ball moved the amount indicated by a pair of dice. If for example, an eight is rolled, then the ball can be moved eight spaces in a direct line from the player game piece 202b to the player game piece 200b. If the number was less than eight in the example of FIG. 10, then the ball will be placed in the appropriate space, in a direct line from 202b to 200b and a player game piece from either the kicking team or the receiving team must land, in at least one embodiment, on that space to pick up the ball or ball designation device 204. If the roll is greater than eight, in the example of FIG. 10, then the ball either goes over game piece's 200b's head into the space in column F, last row for a roll of nine, or goes out of the end zone for a roll of ten, eleven or twelve, and then the line of scrimmage becomes the twenty yard line for the team receiving the ball, which is the team including pieces 200a-c in the FIG. 10 example. Play from scrimmage then commences as previously discussed.

On a kickoff play, the kicking team may be allowed to kick the ball, i.e. move ball designation device 204 based on the dice, and to move the non-kicking players, such as 202c and 202a, two moves each on a kicking team turn. Then the receiving team may be allowed to move its players two moves each on a receiving team turn. The kicking team and the receiving team may then alternate turns thereafter until, for example, a kicking team player game piece lands on a space occupied by a receiving team player game piece carrying the ball designation device 204. Thereafter a play from scrimmage would be done as previously described. In at least one embodiment, on a kickoff play, the kicking team would be allowed to designate up to two fast player game pieces, while the receiving team would only be allowed to designate one fast player game piece. In at least one embodiment, on a regular offensive football play from a line of scrimmage, the team on offense can designate up to two fast player game pieces, while the defense can designate only one fast player game piece.

In one or more embodiments, the player game piece with the ball on offense can use his two moves to throw a pass, lateral, or handoff, if the player passed to or handed off to is two spaces or less away from the player throwing or handing off the ball. The offense can throw or pitch the ball more than two spaces, by rolling two dice. The two dice determine how far the ball goes. If the combined number on the two dice is greater than or equal to the number of spaces to get from the thrower to the receiver, then the pass is complete. If not then the ball sits in a space, as far as it goes and can be intercepted. If there are spaces left over on the roll on a completed pass, the receiver can run after catching the ball, in one or more embodiments. After catching the ball, the receiver can only run one space at a time, i.e. in at least one embodiment, a player with the ball cannot take advantage of the "fast" spaces but can only move one space at a time. In other embodiments a player game piece with the ball designation device can be "fast" or "slow", it would depend on whether a designation of fast was associated with that game piece.

In order to complete a pass, lateral, or handoff, the thrower and the receiver, in one embodiment, must be in a straight line with each other, such as in a horizontal, vertical, or diagonal line. If the thrower and the receiver are not in line, then a pass cannot be thrown in one or more embodiments. In other embodiments, particularly where passing zones are used, the passer and the receiver do not have to be in a straight line of spaces.

If the ball doesn't reach, or there are no spaces left over, or the offense has finished running its extra spaces off a rolled dice pass, then the defense goes by moving up to two moves, for each defensive player game piece, one space at a time as before. Alternatively, in some embodiments, a defensive player game piece can take advantage of fast spaces if a designation indicating that the player is fast is associated with that defensive player game piece. The defense can intercept the pass by landing on the space with the ball.

If a space is occupied by a defensive player game piece, and an offensive player game piece wants to move into that space, and assuming the offensive player game piece has both of its two moves remaining, the offensive player may push a defensive player game piece in the direction of movement of the offensive player game piece, in at least one embodiment. The offensive player game piece may push a defensive player in any direction, which makes the rules in one embodiment straight forward to play. In one embodiment, the defensive player game piece is not allowed to push an offensive player.

A field goal can be done by generating a random number such as by rolling one die. A die roll of two or greater means that a field goal starting at the goal line is good. A die roll of three or greater means that a field goal starting at the ten yard line is good. A die roll of four or greater means that a field goal starting at the twenty is good. A die roll of five or greater means that a field goal starting at the thirty is good. A die roll of six means that a field goal starting at the forty is good.

In an alternative embodiment, a combination of the regular six sided die (such as 620 or 630) and the ½ die (640 or 650) can be rolled for all field goals and all extra points. The ball designation device, such as 204 and 804 can be moved a number of spaces, in a single column, along an image of a football field (such as on game board 100 or 400 of FIG. 12). In at least one embodiment the ball designation device must go past or over an image of a cross bar, such as 430c or 432c of an image of a goal post, such as 430 or 432. In the example of FIG. 12, a total of "three" of the combination of, for example die 620 and 640, would need to be rolled to make an extra point or a field goal from either goal line, of goal lines 416 or 418, through goal posts 430 and 432, respectively. In another embodiment, instead of rolling two dice, one die, such as a specially labelled "FG/PAT" die 800 shown in FIGS. 42A-B, can be rolled to attempt a field goal or an extra point.

In one embodiment, the offense has four downs to score before turning over the ball as in American football. The offense may kick a field goal on any down, and may punt on any down. A punt may be determined by rolling a single die, such as specially labelled "Punt" die 820 shown in FIGS. 44A-B, and having the ball designation device, such as 204 or 804, travel in a straight line, in a single direction, forward from the line of scrimmage, a number of spaces, equal to the number rolled on the die.

Figure 13:
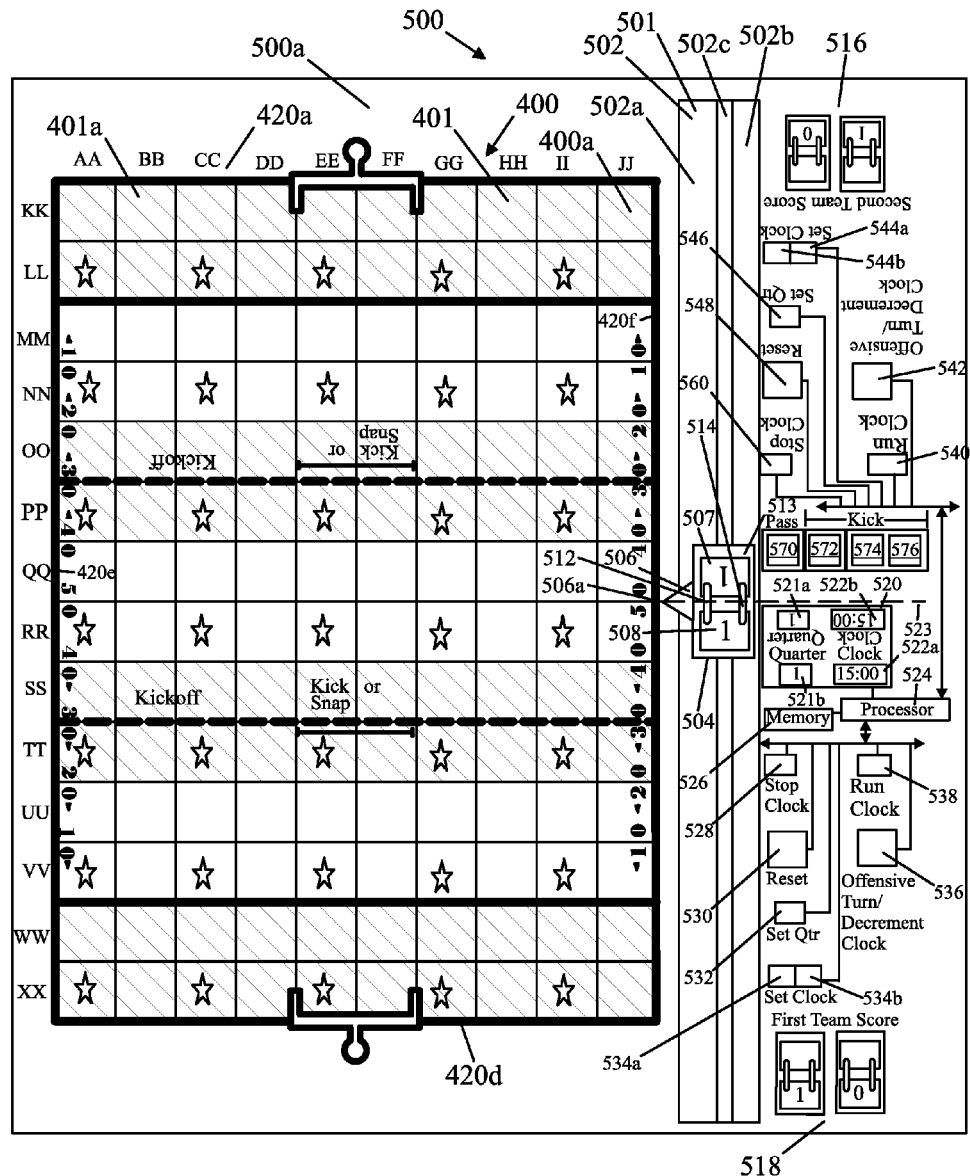
FIG. 13 shows top view of yet another football game board in accordance with another embodiment of the present invention.

FIG. 11 shows a computer apparatus 300 which can display an image of a game board, such as the game board 100 of FIG. 1, game board 400 of FIG. 12, or game board 500 of FIG. 13, in accordance with embodiments of the present invention on a computer monitor 306. The computer apparatus 300 includes a computer memory 302, a computer processor 304, the computer monitor 306, and a computer interactive device 308. The computer processor 304 may be connected by communications links to the computer monitor 306, the computer memory 302, and the computer interactive device 308.

The computer monitor 306 may display an image of the game board 100 and images of the game pieces 200a-c, 202a-c and ball designation device 204. The computer processor 304 may be programmed by computer software to allow the game pieces 200a-c and 202a-c (or 800a-c and 802a-c of FIGS. 33-35) and the ball designation device 204 (or 804) to move in accordance with the rules of one or more embodiments of the present invention for a football game as previously described and to not permit the pieces 200a-c, 202a-c, (or 800a-c and 802a-c), and device 204 (or 804) to move in a manner not described. The computer interactive device 308 may include a computer mouse, computer keyboard, and/or computer touch screen. The computer monitor 306 may be a computer touch screen and may be part of the computer interactive device 308. A first human player or person and an opponent second human player or person, can use the computer mouse and/or computer keyboard or touch screen of 308 to move the pieces 200a-c, 202a-c (or 800a-c and 802a-c) and device 204 (or 804) in the appropriate manner in accordance with embodiments of the football game previously described. For example, a first person or human player, may be able to move pieces 200a-c from the FIG. 2 state to the FIG. 3 state by clicking on images of those pieces and/or dragging those pieces from one space or image on the computer monitor 306 to another. The computer memory 302 may include rules for the football game as previously described, and that may be executed by the computer processor 304 as programmed by computer software. The computer processor 304 may be programmed to keep a score in the computer memory 302, such as a score for the first team (controlled by first person or first human player) and a score for the second team (controlled by the second person or second human player) and the computer processor 304 may cause the scores to be displayed on the computer monitor 306.

FIG. 12 shows a top view of a football game board 400 in accordance with another embodiment of the present invention. The football game board 400 may be a part of and may be printed on a piece of cardboard or other hard backing material or may be displayed on a computer monitor, such as a computer monitor 306 of FIG. 11 by a computer processor, such as 304, in accordance with a computer program stored in computer memory 302. The game board 400 can be used in combination with all of, some of, or none of the game rules, for playing a football game, as previously described with reference to FIGS. 1-11 in or more embodiments of the present invention.

The game board 400 includes a plurality of spaces 412, such as spaces 412a, 412b, 412c, and 412d. Similar to the game board 100 of FIG. 1, each of the plurality of spaces 412 may be rectangular and boarded by lines on four sides. The plurality of spaces 412 are arranged in a grid, which may typically be rectangular in at least one embodiment. The grid includes a plurality of columns marked near the top of FIG. 12, as AA, BB, CC, DD, EE, FF, GG, HH, II, and JJ, and a plurality of rows, marked on the left side as KK, LL, MM, NN, OO, PP, QQ, RR, SS, TT, UU, VV, WW, and XX. The markings AA-XX for the columns and rows are used for explanation purposes in this application, and may not appear on the game board 400 in at least one embodiment of the present invention. The game board 400 has a top surface 401 shown in FIG. 12 and in part in FIG. 25.

Each column, of columns AA-JJ, has a subset of the plurality 412 of spaces and each row, of the rows KK-XX, includes a subset of the plurality of spaces 412. In FIG. 12, each of columns AA-JJ has fourteen spaces, and each of the rows KK-XX has ten spaces of the plurality of spaces 412. In alternative embodiments, more columns and more rows than shown in FIG. 12 may be provided. However, to provide adequate spacing for player game pieces to run and get open for passes, it is preferred in one embodiment that the number of spaces in width be at least three times greater than the number of player game pieces on a team. For example, if there are three player game pieces on each side or team (in a three versus three game), then there should be at least nine spaces in width from a sideline 420e of the board 400 to a sideline 420f of the board 400. In one embodiment, ten spaces of width (of ten columns AA-JJ) are provided for teams with three player game pieces for each team.

The game board 400 includes an outer boundary 420, which may enclose all of the plurality of spaces 412, and which is a boundary for an American football field or field, image, or display 401a of an American football field. The outer boundary 420 includes an end line 420a, an end line 420d, and sidelines 420e and 420f. A line 420b is provided which cuts a top end zone section above a goal line 416 in half, and a line 420c is provided which cuts a bottom end zone section below a goal line 418, in half.

In at least one embodiment, the background color or the background shading for the plurality of spaces 412 alternates by row or by a number of rows. The background shading or color of the plurality of spaces 412 is an example of a characteristic of the plurality of spaces 412. For example, as shown in FIG. 12, rows WW and XX are shown with background hatching or shading, while the next set of rows UU and VV are shown with no background hatching or shading. Rows SS and TT are shown with background hatching or shading, rows QQ and RR are shown without background hatching or shading, rows OO and PP are shown with background hatching or shading, rows MM and NN are shown without background hatching or shading, and rows KK and LL are shown with background hatching or shading. The background hatching or shading may represent or may be replaced by a first color and the lack of background hatching or shading may represent or may be replaced by a second color which is substantially different from the first color. If spaces of rows OO and PP had a background color of any type of green, spaces of rows MM and NN would be colored substantially different if they had a background color of something which is not any type of green.

The spaces in rows KK and LL above the top goal line 416, and the spaces in rows WW and XX below the bottom goal line 418 may have a background color or background shading which is different from the rows SS, TT, OO, and PP. In at least one embodiment of the present invention, the background shading or background color does not need to alternate but rather merely to change in some manner every row or every number of rows. For example, spaces of spaces 412 in rows WW and XX would have the same or substantially the same first background color or background shading (such as in one example any type of green), spaces in rows UU and VV in FIG. 12, should have a second background color or shading which is different (preferably substantially different, such as any non green color) from the first background color or shading in rows WW and XX, while spaces SS and TT can have a third background color or shading which differs from both the first background color or shading and the second. Similarly rows QQ and RR, may have a fourth background color or shading, rows OO and PP may have a fifth background color or shading, rows MM and NN may have a sixth background color or shading, and rows KK and LL may have a seventh background color or shading. All of the first through seventh background colors or shading may be different, or in other embodiments some of them may be the same, but typically two adjacent groupings of rows would not have the same background color or shading, so that there may be a change in background color or shading from one grouping or rows to an adjacent grouping of rows. A grouping of rows may be a slight change in coloration of spaces to form a checkerboard. For example, the grouping of rows WW and XX may have a checkerboard pattern of light green and dark green spaces of spaces 412, while the adjacent grouping of rows, UU and VV may have a checkerboard pattern of light blue and dark blue spaces of spaces 412. It is important in one or more embodiments that there be a clear change in characteristic of the spaces from one grouping of rows (or passing zone) to another.

The plurality of spaces 412 includes a plurality of fast spaces 414, such as the fast space 414a. Each fast space is marked to indicate that it is a fast space. In one embodiment, a fast space is identified or marked by having a star symbol or some other graphic or graphic symbol in the space. For example the fast space 414a is marked with the star symbol or graphic symbol 415a. Each of the other fast spaces of fast spaces 414 is also marked with the same star symbol, as is the fast space 414a, in FIG. 12. FIG. 12 has fast spaces in the same locations and thus the same pattern as in the embodiment of FIG. 1, however other patterns may be possible, in other embodiments.

As in FIG. 1, in FIG. 12 there are alternating fast spaces in each even row from the top of FIG. 12 and there are alternating fast spaces in each odd column from the sideline 420e to the sideline 420f. There are alternating fast spaces in columns AA, CC, EE, GG, and II, and there are no fast spaces in columns BB, DD, FF, HH, and JJ. There are alternating fast spaces in each even row of rows LL, NN, PP, RR, TT, VV, and XX from the top of FIG. 12 and there are no fast spaces in each odd row of rows KK, MM, OO, QQ, SS, UU, and WW from the top of FIG. 12. This layout for the plurality of fast spaces 414 allows a user of a football game and of the game board 400 in accordance with an embodiment of the present invention to easily move one or more player game pieces, when permitted to do so, from one fast space to another fast space during a move without counting the non-fast spaces in between the fast spaces. Typically, in at least one embodiment only some of a plurality of player game pieces are allowed to take advantage of the fast spaces, which effectively allows those player game pieces to move faster than other player game pieces. Fast player game pieces or "fast players" and slow player game pieces or non fast player game pieces or "slow players" may move as previously described with reference to FIGS. 1-11.

The game board 400 in FIG. 12 also includes goal posts 430 and 432. The goal posts 430 and 432 may be considered to be part of an image of football field 401a although parts of goal posts 430 and 432 may lie outside of boundary 420. The goal post 430 includes post 430a, connecting piece 430b, crossbar 430c, and uprights 430d and 430e. The goal post 432 includes post 432a, connecting piece 432b, crossbar 432c, and uprights 432d and 432e. The crossbars 430c and 432c are parallel to, and overlap the end lines 420a and 420d, respectively. The uprights 430d and 432d overlap a line dividing columns DD and EE. The upright 430e and 432e overlap a line dividing columns FF and GG. The goal posts 430a and 432a are equidistant from the ends lines 420e and 420f.

The game board 400 in FIG. 12 also includes kickoff dashed lines 434a and 434b located on the yard lines identified by "30", i.e. the "30" yard lines. The kickoff lines 434a and 434b may also be identified with the words "Kickoff" as shown both right side up and upside down so the words can be read by a person (who controls a first team) located on the side of end line 420d and an opponent person (who controls opposing second team) located on the side of end line 420a. The kickoff lines 434a and 434b can be colored lines instead of dashed lines, such as yellow colored lines, to distinguish these lines from other lines separating rows KK-XX and columns AA-JJ. The game board 400 also includes "Kick or Snap" column identifiers 436a and 436b. The "Kick" or "snap" column identifiers 436a and 436b may also be identified by the words "Kick" or "snap" right side up and upside down to show to one person (at end line 420a) and his opponent (at end line 420d). The identifiers 436a and 436b indicate the columns of AA-JJ where a ball device (such as 204 in FIG. 2 or ball device 710 in FIGS. 23A-B or ball device 804 in FIG. 33), can be kicked or snapped from. In FIG. 12, the ball designation device, such as 204 (FIG. 2) or 804 (FIGS. 33-35) should be kicked or snapped, on a regular offensive football play from a scrimmage line, on a field goal, or on a kickoff, from a space in columns EE or FF, which are the central columns in game board 400.

On game board 400 there are yard line markers with numbers. The lines between rows UU and VV are marked with the number "10" on both the left sideline 420e and the right side line 420f and an arrow or triangular pointer to indicate in which direction the closest goal line is (in this case 418) of the two goal lines 416 and 418. Similarly, the lines between rows UU and TT, TT and SS, SS and RR, RR and QQ, QQ, and PP, PP and OO, OO and NN, and NN and MM, are marked with numbers 20, 30, 40, 50, 40, 30, 20, and 10, respectively, along with an appropriate arrow or triangular pointer. The yard line numbers may be printed on the board 400 or may be displayed on a computer monitor, such as monitor 306 by computer processor 304 as programmed by a computer program in computer memory 302 of FIG. 11.

In accordance with an embodiment of the present invention, the game board 400 may be used in a three first team player game pieces versus three second team player game pieces football game, where only three player game pieces, from each team, are placed on the board board 400 for any play.

In at least one embodiment, on an offensive turn of a play from a line of scrimmage, using the game board 400 shown in FIG. 12, each first team player game piece (on offense), which is not passing, pitching, kicking, or handing a ball designation device (such as 804 of FIG. 33) off to another first team player game piece or blocking a second team player game piece (on defense), may make two moves. If a first team player game piece (on offense) has been designated as a "fast" player, the first team player game piece (on offense) may take advantage of the "fast" spaces in the manner previously described with respect to FIGS. 1-11. If the first team player game piece (on offense) has not been designated a "fast" player then that player game piece cannot take advantage of the "fast" spaces, i.e. each space of spaces 412 must be counted when moving.

Figure 33:
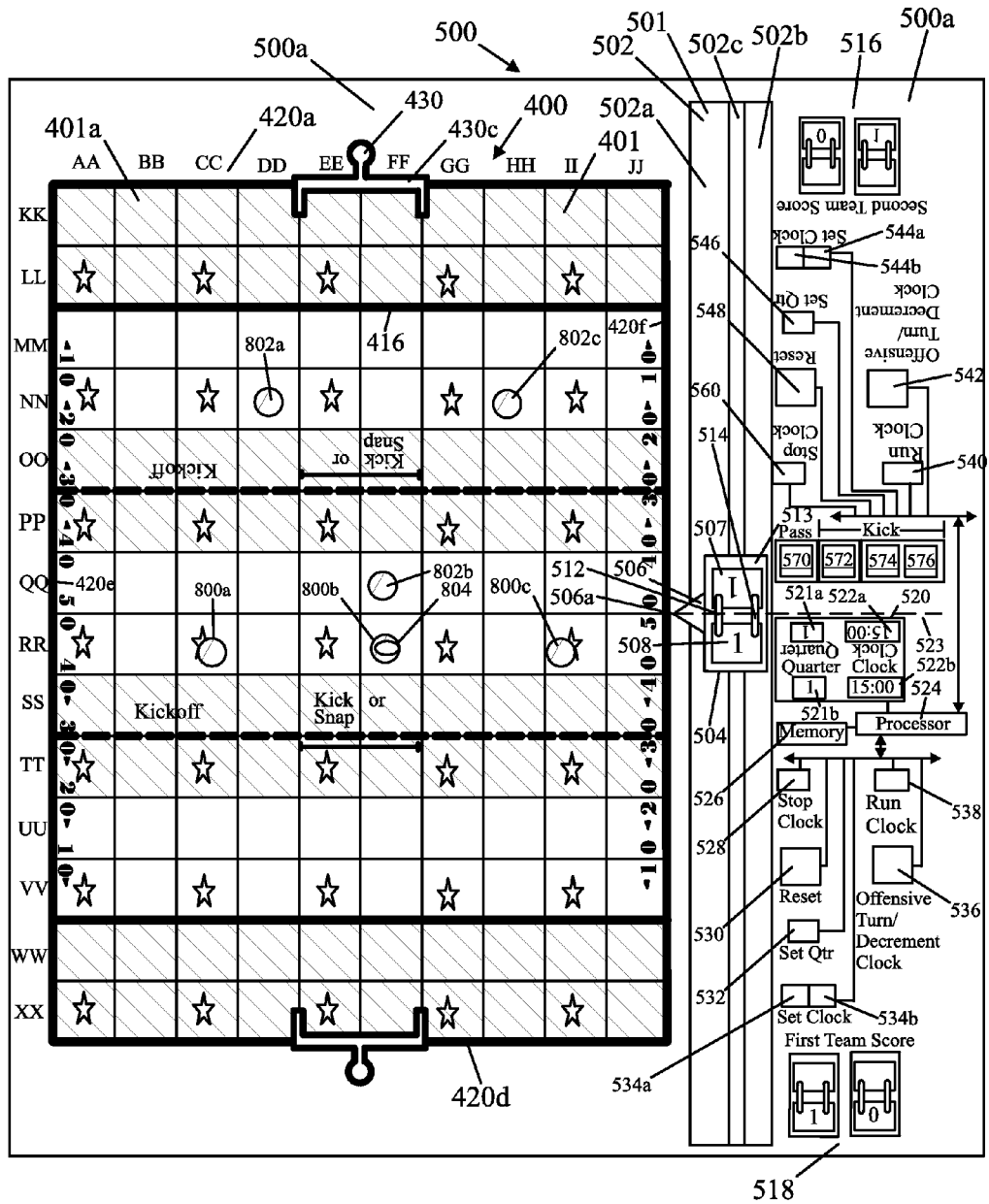
FIG. 33 shows a top view of the game board of FIG. 13 with three first team player game pieces and three second team player game pieces placed on the game board in certain locations, with a sliding device at a certain position, and with a clock device at a certain time in a state.

In at least one embodiment, if a first team player game piece (on offense) is throwing, handing off, kicking, or pitching a ball device, such as ball designation device 804 shown in FIG. 33, then that player cannot move on that turn, but rather the ball device, such as 804, moves.

Figure 14A:
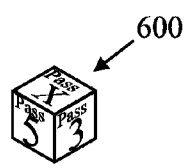
FIGS. 14A-14B show perspective views of a type of passing die.
Figure 14B:
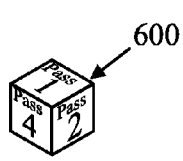

In at least one embodiment, if a first team player game piece (on offense) is receiving a pass, which has been thrown using a passing die, such as die 600 of FIGS. 14A-B or passing dice then that first team player game piece (on offense) cannot move during the turn when the passing die or dice are used.

In at least one embodiment, if a first team player game piece (on offense) is receiving a pitch, handoff or pass without a passing die or passing dice being used, then that player game piece can move two moves minus any moves the ball device, such as ball device 804 (of FIG. 33) has made, where the ball device 804 moves only in straight lines (when not moved with the passing die or dice), and the ball device 804 can otherwise take advantage of the fast spaces.

In at least one embodiment, if a first team player game piece (on offense) is blocking, the first team player piece (on offense) is allowed one push of one space of spaces 412, which means the first team player game piece (on offense) and the opposing second team player game piece (on defense) that is being pushed move in one direction, and an offensive player game piece can only push a defensive player game piece that is in an adjacent space.

In at least one embodiment, each defensive player game piece (of whichever of the first or second teams is on defense) is allowed to move two moves per defensive turn. If designated a "fast" player, a defensive player game piece (of whichever team is on defense) can take advantage of the "fast" spaces. A defensive player game piece can execute a covering move as previously described with reference to FIGS. 1-11, in one embodiment, but cannot, in one embodiment, jump over or step on and over an offensive player game piece on one defensive turn.

In at least one embodiment, passing from a passer first team player game piece (on offense) to a receiver first team player game piece (on offense), using the game board 400 of FIG. 12 can be done as follows. A person can roll a passing die (such as FIGS. 14A-B, 15A-B, 20A-B, or 21A-B), or otherwise generate a random number. If the random number is greater than or equal to the number of passing zones that the ball device 804 must pass through in order to reach the receiver player game piece then the pass is complete (unless the receiver is covered by a defender, i.e. the defender occupies the same space as the intended receiver). For example, referring to FIG. 12, if a passer player game piece is in the space (of spaces 412) in column FF and row TT, and a receiver game piece is in the space (of spaces 412) in column AA and row KK, then the person (whose team is on offense) must roll or otherwise generate a "4" in order to pass the ball device 804 from the zone where SS and TT rows are to the zone where KK and LL rows are. On its way from the passer player game piece in column FF and row TT, the ball device 804 would have to go one zone into a passing zone of rows QQ and RR, two zones into a passing zone of rows OO and PP, three zones into a passing zone of rows MM and NN, and four zones into a passing zone of rows KK and LL. There are thus four passing zone transitions, or substantial changes in color (or shading) as the ball device 804 goes from the space in column FF and row TT to the space in column AA and row KK and thus a "4" (or greater is some embodiments) is needed on a passing die or other random generator to complete the pass. If less than "4" is generated, i.e. such as "1", "2", or "3", then the pass, in one embodiment, is considered to be incomplete.

In at least one embodiment, the random number generator or die may include a non number designation that indicates that the pass is incomplete or the pass will be intercepted if a defensive player game piece is close enough to the intended receiver. In at least one embodiment, if an opposing player game piece (on defense) is in a space next to the intended first team receiver player game piece (on offense) and if the die is rolled and the non number designation comes up, then the pass is intercepted, and the defender player game piece next gets to move.

Figure 16A:
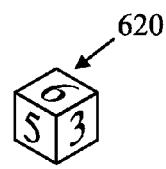
FIGS. 16A-16B show perspective views of a typical known six sided die.
Figure 16B:
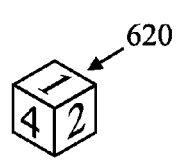
Figure 17A:
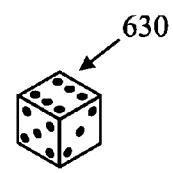
FIGS. 17A-17B show perspective views of a typical known six sided die.
Figure 17B:
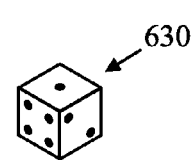
Figure 18A:
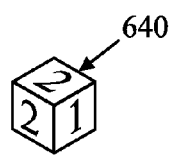
FIGS. 18A-18B show perspective views of a first type of "1" or "2" die for use with an embodiment of the present invention.
Figure 18B:
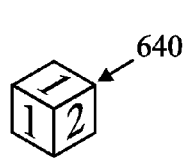
Figure 19A:
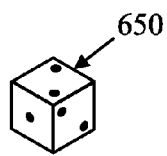
FIGS. 19A-19B show perspective views of a second type of "1" or "2" die for use with an embodiment of the present invention.
Figure 19B:
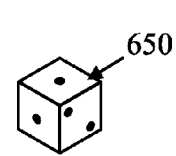

In at least one embodiment, a kickoff can be done using a passing die (600, 610, 660 or 670, with "X" counted as 0) and a regular six sided die (620 or 630), while a field goal can be done using a regular six sided die, such as 620 in FIGS. 16A-16B or 630 in FIGS. 17A-17B, and a die which has six sides but has only three "2"'s and three "1"'s, so that either a "1" or a "2" is generated, such as 640 in FIGS. 18A-B or 650 in FIGS. 19A-B. This combination of dice is helpful to make the game seem more like football, since the farthest field goal possible will be "50" yards (a total roll of 8 will go over cross bar 430c, when as in FIG. 33, ball designation device 804 starts in row RR (i.e. is at fifty yard line, since first team 800a-c is going towards goal line 416, and the ball device 804 can be moved through the uprights, such as uprights 430*d* and 430*e* or 432*d* and 432*e* and over the cross bars 430*c* and 432*c*, when an appropriate number is thrown using the dice. For example, the ball device 804 may be located in row RR, at the fifty yard line facing the goal post 430 in the column EE or FF (kicking or snap columns) as shown in FIG. 33, in a situation where the line of scrimmage is the "50" yard line. A person may roll a regular die (620 or 630) in combination with a "½" die (640 or 650). The person may then move the ball designation device 804 in a directly upwards vertical direction towards the goal post 430 the number of spaces indicated by the regular die in combination with the ½ die. For example, if "six" and "2" came up on the two dice, then the person can move the ball designation device 804, shown in FIG. 33, from row RR column FF in a straight vertical upwards line up through the uprights 430*d* and 430*e* and over the cross bar 430*c* to indicate that a field goal has been made. I.e. the ball designation device 804 moves one space from row RR and column FF to row QQ and column FF, next one space to row PP and column FF, next one space to row OO and column FF, next one space to row NN and column FF, next one space to row MM and column FF, next one space to row LL and column FF, next one space to row KK and column FF, and next over the cross bar 430*c*, for a total of eight spaces. A person would move the ball designation device along the image 401*a* of the football field on the game board 400, and count each space. As in American football, if the field goal is good, then the team who made it gets three points. A scoring device, such as 518 in FIG. 13, can be incremented by three to represent the three points. If less than seven had been rolled in this example, the ball designation device 804 would not have made it over or past the cross bar 430*c* and the field goal would be missed, no points for the player who kicked it, and possession is given to the other team.

Figure 42A:
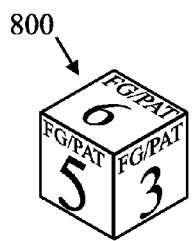
FIGS. 42A-B show perspective views of a six sided die for field goals and extra points.
Figure 42B:
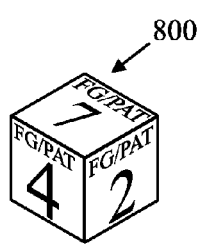

Alternatively, the single die 800 in FIGS. 42A-B marked "FG/PAT" can be rolled for field goals and extra points, in which case the longest field goal would be from a line of scrimmage at the "40" yard line closer to the goal post kicked towards then the opposite goal post. For kickoffs, alternatively, the single die 810 in FIGS. 43A-B marked "Kickoff" can be rolled for kickoffs.

In at least one embodiment of the present invention, after extensive testing, it has been found that a three on three version of the football game plays better if the team which is on offense is allowed two fast player game pieces (of its three player game pieces) and the opposing team which is on defense is allowed only one fast player game piece. (of its three player game pieces). It has also been found that the game plays better when each team is allowed to disguise which player game pieces are fast and which are slow.

FIG. 13 shows top view of a football game board 500 in accordance with another embodiment of the present invention. The football game board 500 may include the game board 400 described in detail with reference to FIG. 12.

In addition, the game board 500 may include a ball or ball designation device location indicator 501. The ball location indicator 501 may include a track device 502 in which a sliding device 504 may slide to identify a line of scrimmage yard line location for a football or ball designation device, such as 804 in FIG. 33, on the football field 401*a* of the game board 400, before the start of a play or after a play has concluded. The track device 502 may include rails 502*a* and 502*b*, and may have a slot 502*c*. The rails 502*a* and 502*b*, and the slot 502*c* are parallel to the columns AA-JJ of the board 400 and surface 400*a*. The sliding device 504 includes a pointer or triangular piece 506, having a point, tip or vertex 506*a* located adjacent the end line 420*f*. In FIG. 13, the sliding device 504 has been placed in a location so that it points to the "50" yard line of the game board 400 or 400*a*. The sliding device 504 can be slid up and down in directions parallel to the columns AA-JJ, to put the point or tip 506*a*, next to any of the goal lines 416, 418, the "50" yard line, any of the yard lines "10", "20", "30", "40" nearer to the goal line 416 than the goal line 418, or any of the yard lines "10", "20", "30", "40", nearer to the goal line 418 than 416.

Figure 36A:
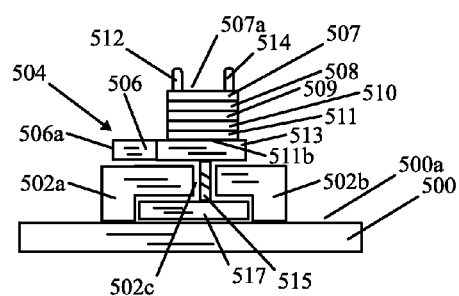
FIGS. 36A-D show front, rear, left side, and right side views, respectively, of a sliding device for use with the game board of FIG. 13, with the sliding device in a state.
Figure 36B:
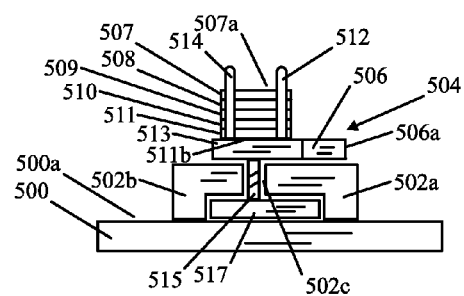

The sliding device 504 may include a top piece or portion, such as 513 shown in FIGS. 36A-F, which lies above and moves above the rails 502*a* and 502*b*, a bottom piece or portion 517 shown in FIGS. 36A-B, which lies underneath and moves underneath the rails 502*a* and 502*b*, and a connecting piece or portion, such as 515 shown in FIG. 36A-F which connects the top piece 513 and the bottom piece 517 and which lies in the slot 502*c*.

The sliding device 504 may include a football down indicator (i.e. for first, second, third, or fourth down in a football game). The football down indicator may include a plurality of plates, such as including plates 507-511 shown in FIGS. 37A-C, 38A-C, 39A-C, 40A-C, and 41A-C, respectively. In accordance with an embodiment of the present invention, the plates 507-511 may be held by loops, rings, or U shaped fasteners 512 and 514 which allow the plates to be flipped to change the football down, similar to what is done with a down marker in an actual American football game.

Figure 37A:
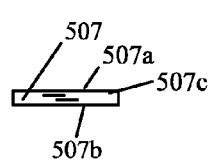
FIGS. 37A-C show side, bottom, and top views, respectively, of a first plate for use with the sliding device of FIGS. 36A-D.
Figure 37B:
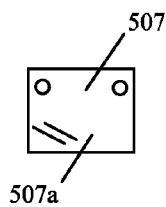
Figure 37C:
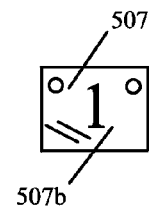
Figure 38A:
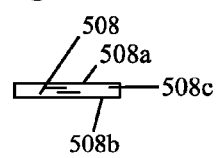
FIGS. 38A-C show side, bottom, and top views, respectively, of a second plate for use with the sliding device of FIGS. 36A-D.
Figure 38B:
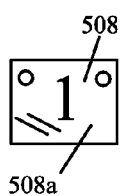
Figure 38C:
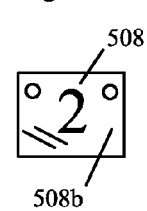
Figure 39A:
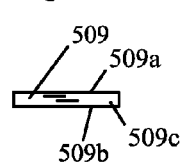
FIGS. 39A-C show side, bottom, and top views, respectively, of a first plate for use with the sliding device of FIGS. 36A-D.
Figure 39B:
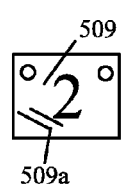
Figure 39C:
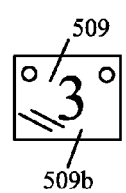
Figure 40A:
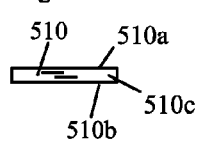
FIGS. 40A-C show side, bottom, and top views, respectively, of a second plate for use with the sliding device of FIGS. 36A-D.
Figure 40B:
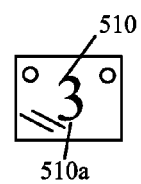
Figure 40C:
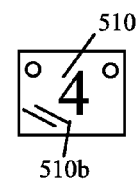
Figure 41A:
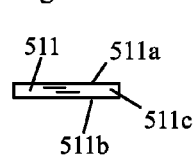
FIGS. 41A-C show side, bottom, and top views, respectively, of a second plate for use with the sliding device of FIGS. 36A-D.
Figure 41B:
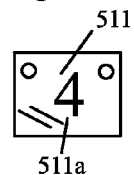
Figure 41C:
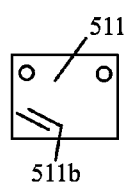

FIGS. 37A-C, 38A-C, 39A-C, 40A-C, and 41A-C show side, top, and bottom views of plates 507, 508, 509, 510, and 511, respectively. As shown in FIGS. 37A-C, plate 507 has a top surface 507*a* which is blank and a bottom surface 507*b* on which is displayed "1" (for first down). As shown in FIGS. 38A-C, plate 508 has a top surface 508*a* on which is displayed "1" (for first down) and a bottom surface 508*b* on which is displayed "2" (for second down). As shown in FIGS. 39A-C, plate 509 has a top surface 509*a* on which is displayed "2" (for second down) and a bottom surface 508*b* on which is displayed "3" (for third down). As shown in FIGS. 40A-C, plate 510 has a top surface 510*a* on which is displayed "3" (for second down) and a bottom surface 510*b* on which is displayed "4" (for fourth down). As shown in FIGS. 41A-C, plate 511 has a top surface 511*a* on which is displayed "4" (for fourth down) and a bottom surface 510*b* which is blank.

Each of plates 507-511 has two holes into which the loops, or U-shaped connectors 512 and 514 are inserted to hold or attach the plates 507-511 to the portion 513, but allow the plates 507-511 to be flipped over so that either the top surface or the bottom surface of the appropriate plate can be viewed. For example, in FIG. 34, the plate 507 has been flipped over (from the orientation shown in FIG. 36A-D so that in FIG. 34, surface 507*b* can be viewed (i.e. is face up with respect to top surface 500*a* of board 500) and the surface 507*a* is face down with respect to surface 500*a* of board 500, so surface 507*a* cannot be viewed. In FIG. 35, the plate 508 has been flipped over (from the orientation shown in FIG. 34 so that in FIG. 35, surface 508*b* can be viewed (i.e. is face up with respect to surface 500*a* of board 500) and the surface 508*a* is face down with respect to surface 500*a* of board 500, so surface 508*a* cannot be viewed. By flipping over one or more of plates 507-511, the down can be changed from "1" (1st down), to "2" (2nd down), to "3" (third down), and to "4" (fourth down).

The game board 500 also includes a first team score device 518 and a second team score device 516. In FIG. 13, the devices 516 and 518 may include a plurality of flip plates which allow two digit scores from "00" to "99" for each team. The devices 516 and 518 may be or may be replaced by any scoring mechanism which allows for such scores, such as digital scoring mechanisms, rotary scoring mechanisms, or any other scoring mechanisms. The devices 516 and 518 may show one team's score or both teams' scores, so that both persons playing the game can easily view both teams' scores. Score keeping devices may be provided by processor 524, memory 526, and a computer display 520.

The game board 500 may also include processor or computer processor 524, memory or computer memory 526, and display or computer display 520. The processor 524 may be programmed by a computer program stored in memory 526 to display a number indicating a quarter of an American football game, along with the designation of "Quarter" or an abbreviation of "Quarter" (such as 1st, 2nd, 3rd, or 4th quarter), and to display a time remaining in the particular quarter, along with a designation of "Clock" in the display 520. For example, in FIG. 13, "1" is displayed under the right side up designation of "Quarter", in display portion 521*b*, and "15:00" indicating fifteen minutes and zero seconds remaining, is displayed under the designation of "Clock", in display portion 522*b* on the display 520. There is also an identical, but upside down version of the quarter and clock time which is simultaneously displayed, in display portions 521*a* and 522*a* on display 520, so that both the person on the end line 420*a* and the opponent person on the end line 420*d* can easily see the quarter and the time remaining on the clock.

The processor 524 is electronically connected to buttons or actuators 528, 530, 532, 534*a*, 534*b*, 536, and 538. The actuators 528, 530, 532, 534*a*, 534*b*, 536, and 538 may be push buttons and may be actuated by pushing them. Actuating or pushing, actuator 528 causes the clock time displayed on display 520 to stop. Actuating or pushing, actuator 538 causes the clock time displayed on display 520 to run down. Actuating or pushing, actuator 530 causes the clock time displayed on display 520 to be reset to fifteen minutes, and the quarter to be reset to "1" for the first quarter, in one embodiment. Actuating 530 in other embodiments, may cause the clock time to be set to different amounts of time, such as for example two, five, or ten minutes for shorter games. Actuating or pushing actuator 536 causes the clock time to be changed, such as immediately reduced, by a certain amount of time, such as a certain number of seconds. I.e. actuating the actuator 536 may cause the clock time to go from fifteen minutes "15:00", to "14:45", i.e. the clock time in this example is immediately changed (lowered) by fifteen seconds. Actuator 534*a* can be used to set the minutes of the clock time to a certain amount, while actuator 534*b* can be used to set the seconds of the clock to a certain amount. For example, holding down actuator 534*a* may cause the minutes to cycle through from "0" through "15", and holding down acutator 534*b* may cause the seconds to cycle through from "00" to "59", until the respective actuators are released and then the minutes or seconds are set.

The processor 524 may also be electronically connected to buttons or actuators 560, 548, 546, 544*a*, 544*b*, 542, and 540, which may perform the same or similar functions to their counterparts 528, 530, 532, 534*a*, 534*b*, 536, and 538, respectively. Two sets of actuators may be used, in at least one embodiment, so that the person near end line 420*a* (controlling first team) and the person near end line 420*d* (controlling second team), may each have a set of actuators, which are labelled facing the appropriate person.

In at least one embodiment, the game board 400 may be displayed on computer monitor 306, in which case, the processor 304 and the memory 302 (FIG. 11) may perform the functions of processor 524 and memory 526. Alternatively the game board 400 may be printed on a backing, such as a cardboard backing of game board 500, and in this case the processor 524, memory 526, and actuators 560, 548, 546, 544*a*, 544*b*, 542, and 540, 528, 530, 532, 534*a*, 534*b*, 536, and 538, may be physically attached along with connective wiring to the backing of the game board 500, so that game board 400 occupies one space on the backing of game board 500 and the processor 524, memory 526 and actuators occupy another space on the game backing as shown by FIG. 13.

FIGS. 14A-14B show perspective views of a type of a passing die 600. In at least one embodiment, the passing die 600 is labeled on each side with the designation "Pass" typically permanently fixed thereon such as by printing. The passing die 600 is a solid six sided cube. FIG. 14A shows a top, front, and right side perspective view of the passing die 600. FIG. 14B shows a bottom, rear, and left side perspective view of the passing die 600. The passing die 600 has top, front, right, bottom, rear, and left surfaces. The top surface of the die 600 has printed on it or otherwise fixed thereon, such as permanently fixed thereon, an "X" which when it comes up on a roll of die 600 indicates that a pass will either be incomplete or intercepted. The front, right, bottom, rear, and left surfaces of the die 600 have printed on them or otherwise fixed thereon, such as permanently fixed thereon, a "5", "3", "1", "4", and "2", respectively, and the number that comes up on a roll of die 600 indicates that a ball designation device, such as ball designation device 804 shown in FIGS. 33-35 can move up to that number of passing zones on a pass.

Figure 15A:
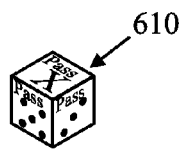
FIGS. 15A-15B show perspective views of another type of passing die.
Figure 15B:
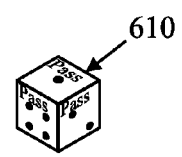

FIGS. 15A-14B show perspective views of a type of a passing die 610. The passing die is also labeled with a designation of "Pass". The passing die 610 may be the same as the passing die 600 except that one dot, two dots, three dots, four dots, and five dots, for FIGS. 15A-B, are shown in place of "1", "2", "3", "4", and "5", respectively, in FIGS. 14A-14B.

FIGS. 16A-16B show perspective views of a known six sided die 620. The die 620 is a solid six sided cube. FIG. 16A shows a top, front, right side perspective view of the known die 620. FIG. 16B shows a bottom, rear, left side perspective view of the known die 620.

FIGS. 17A-17B show perspective views of a known six sided die 630. The die 630 is a solid six sided cube. FIG. 17A shows a top, front, right side perspective view of the known die 630. FIG. 17B shows a bottom, rear, left side perspective view of the known die 630.

FIGS. 18A-18B show perspective views of a type of one/two (½) die 640 which can be rolled in an embodiment of the present invention along with either die 620 or 630 for kicking field goals. Alternatively the combination of a known die, such as 620 or 630 and a ½ die may be replaced by one die with numbers from one through eight, or with some other random number generator that randomly generates one of whole numbers one through eight for field goal kicking. In other embodiment, a lower or higher maximum number, rather than eight, may be used, to lower the maximum possible length of field goals kicked or increase the maximum possible length of field goals kicked.

The die 640 is a solid six sided cube. FIG. 18A shows a top, front, right side perspective view of the die 640. FIG. 18B shows a bottom, rear, left side perspective view of the die 640. The die 640 has top, front, right, bottom, rear, and left surfaces, which have printed thereon or otherwise fixed thereto the numbers "2", "2", "1", "1", "1", and "2", so that there is a fifty percent chance of rolling a "2" and a fifty percent chance of rolling a "1" with die 640.

The die 650 is the same as the die 640 except that the numbers "2", "2", "1", "1", "1", and "2", have been replaced with two dots, two dots, one dot, one dot, one dot, and two dots, respectively.

Figure 20A:
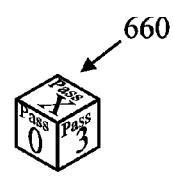
FIGS. 20A-20B show perspective views of another type of passing die.
Figure 20B:
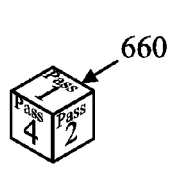

FIGS. 20A-20B show perspective views of a passing die 660. The die 660 is labelled with the designation of "Pass".

The passing die 660 may be the same as the passing die 600 except that the "5" number has been replaced with "0". If the die 660 is used the ball designation device 804 can only move up to a maximum of four passing zones (when a "4" is rolled with die 660), while if die 600 is used the ball designation device 204 can be moved up to a maximum of five passing zones (when a "5" is rolled with die 600). Other number arrangements or dot arrangements can be used, in other embodiments, to decrease or increase the maximum number of passing zones that the ball designation device 204 can move through on a pass.

Figure 21A:
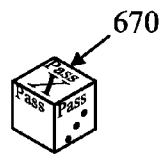
FIGS. 21A-21B show perspective views of another type of passing die.
Figure 21B:
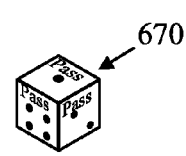

FIGS. 21A-21B show perspective views of a passing die 670 which is the same as passing die 660, except dots are used in place of numbers.

Figure 22A:
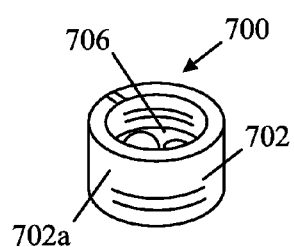
FIGS. 22A-D show perspective views of a player game piece.
Figure 22B:
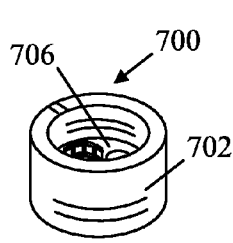
Figure 22C:
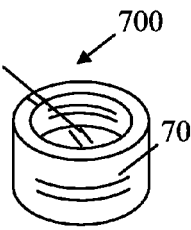
Figure 22D:
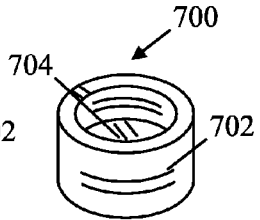
Figure 22E:
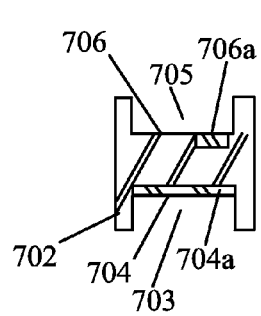
FIG. 22E shows a cross sectional view of the player game piece of FIGS. 22A-D.
Figure 22F:
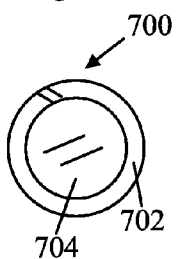
FIGS. 22F-G show bottom and top views of the player game piece of FIGS. 22A-D.
Figure 22G:
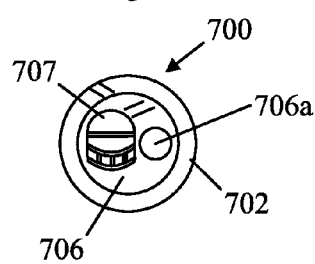

FIGS. 22A-2D show perspective views of a player game piece 700. FIG. 22E shows a cross sectional view of the player game piece 700. FIGS. 22F-2G show bottom and top views of the player game piece 700. The player game piece 700 can be used for any one of the first team player game pieces 200a-c or the second team player game pieces 202a-c shown in FIGS. 2-9 or the first team player game pieces 800a-c or the second team player game pieces 802a-c shown in FIGS. 33-35. The player game piece 700 can be placed on and used on the game board 100 shown in FIG. 1, the game board 400, and the game board 500, in conjunction with some or all of the rules for an American football game as described herein in this application.

The player game piece 700 includes a peripheral, cylindrical wall 702, an upper surface 706, and a lower surface 704. The player game piece 700, includes an attachment device 706a and an attachment device 704a. The peripheral wall 702 surrounds an upper cavity or indentation 705 near the upper surface 706. The peripheral wall 702 surrounds a lower cavity or indentation 703 near the lower surface 704. There is a symbol 707, such as a football helmet, on the upper surface 706 to indicate that player game piece 700 represents a football player. The symbol 707 may be colored a first color and/or decorated with a first design for the first team, and colored a second color (different from the first) and/or decorated a second design (different from the first) for the second team. Symbols or designs specific to each team may also be placed on an exterior 702a of the peripheral wall 702.

Figure 23A:
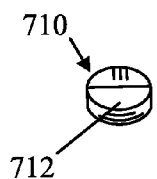
FIGS. 23A-B show perspective views of a football game piece or ball designation device.
Figure 23B:
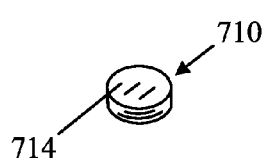
Figure 24A:
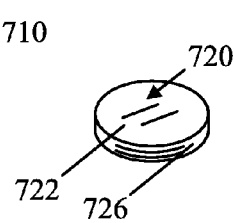
FIGS. 24A-B show perspective views of a "fast" player indicator.
Figure 24B:
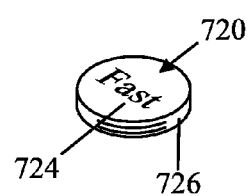

FIGS. 23A-23B show perspective views of a football game piece or ball designation device 710. The ball designation device 204 of FIG. 2-10, or 804 of FIGS. 33-35, may be or may be replaced by the ball designation device 710. The ball designation device 710 may be a solid piece, having a football or elliptical outer shape. The device 710 may have a top surface 712 and a bottom surface 714. FIGS. 24A-24B show perspective views of a "fast" player indicator 720. The indicator 720 may be a solid piece which may be circular. The indicator 720 may have a top surface 722, a bottom surface 724, and a body 726. The word "Fast" may be printed on or otherwise permanently fixed on the surface 724.

Figure 25:
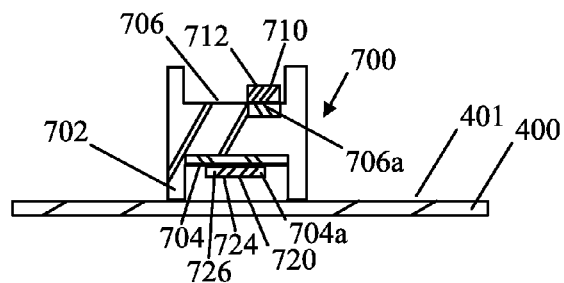
FIG. 25 shows the "fast" player indicator of FIGS. 24A-B and the ball designation device of FIGS. 23A-B attached to the player game piece of FIGS. 22A-G.
Figure 29A:
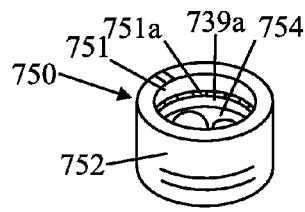
FIGS. 29A-D show perspective views of a player game piece in accordance with another embodiment of the present invention.
Figure 29B:
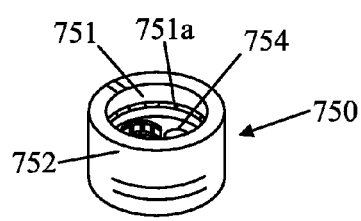
Figure 29C:
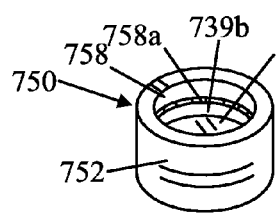
Figure 29D:
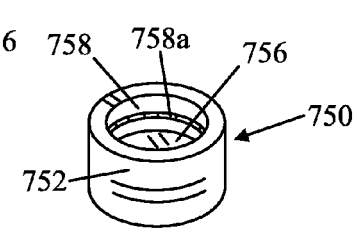

FIG. 25 shows a cross sectional view of the "fast" player indicator 720 of FIGS. 24A-24B and the ball designation device 710 of FIGS. 23A-23B attached to the player game piece 700 of FIGS. 22A-22G. In accordance with an embodiment of the present invention, the ball designation device 710 and the attachment device 706a of the player game piece 700 may attach to each other by magnetic force. For example, the ball designation device 710 may be a magnet or may be a metal (which is attracted by a magnet) while the attachment device 706a may be metal (which is attracted by a magnet) or magnet, so that devices 710 and 706a are held together by magnetic force. Alternatively, other attachment devices can be used, for example device 710 may be a Velcro (trademarked) portion, such as a hook and/or loops portion, while device 706a may be a Velcro (trademarked) portion, such as a hook and/or loops portion which attaches to and detaches from device 710. Similarly, the indicator 720 and the attachment device 704a may attach to each other by magnetic force. For example, the indicator 720 may be a magnet or may be a metal (which is attracted by a magnet) while the attachment device 704a may be metal (which is attracted by a magnet) or magnet, so that the indicator 720 and the attachment device 704a are held together by magnetic force. Alternatively, other attachment devices can be used, for example indicator 720 may be a Velcro (trademarked) portion, such as a hook and/or loops portion, while device 704a may be a Velcro (trademarked) portion, such as a hook and/or loops portion which attaches to and detaches from device 720.

In accordance with a method of an embodiment of the present invention, the player game piece 700 is placed on the top surface 401 of the game board 400 (or the game board 100 or 500) with the ball designation device 710 (which may be the same as 204 or 804) attached to the attachment device 706a and the indicator 720 attached to the attachment device 704a. The surface 724 showing the designation "Fast" is completely hidden from view by a combination of the peripheral wall 702 and the board 400. The indicator 720 is attached to the attachment device 704 so that the "Fast" designation on the surface 724 can be seen, by taking the player game piece 710 off of the board 4100 and flipping the player game piece 710 over to see the surface 724, without removing the indicator 720 from the player game piece 710. In this manner, a hidden indicator can be associated or not associated, such as by being attached or not attached to the player game piece 710 to indicate whether game piece 710 is a "fast" player which can take advantage of the fast spaces such as 114 or 414, as previously described with reference to FIG. 1 and FIG. 12, respectively. When playing a football game in accordance with an embodiment, of the present invention, a first person, controlling the first team, and a second person controlling the opposing second team, may thus secretly associate or not associate fast designations, such as by attaching or not attaching "fast" indicators, such as 720, to each player game piece (such as each of player game pieces 200a-c and 202a-c previously described for FIG. 2-10 or 800a-c and 802a-c of FIGS. 33-35) to determine whether each is a "fast" player. In at least one embodiment, if a "fast" indicator 720 is not attached, then the player game piece may be considered to be "slow", i.e. cannot take advantage of the fast spaces 114 (FIG. 1) or 414 (FIG. 12).

The player game piece 700 may have the ball designation device 710 attached and thus may be a ball carrier. (i.e. may be the quarterback with the ball, or a running back with the ball, or any other player game piece in active possession of the ball). In at least one embodiment, the indicator 720 is separate from the ball designation device 710, such that the ball carrier may be designated a "fast" player or a "slow" player.

The "fast" indicator 720 is shown as a removable or detachable piece as described with reference to FIG. 24B and FIG. 25. However, in some embodiments, the indicator 720 may be permanently attached to the player game piece 710 in the hidden position shown in FIG. 25. In such embodiments, all of a team's player game pieces would have the same appearance except for the surface 724, which would indicate a "fast" player for some of the team's player game pieces, and would have no indicator or would indicate a "slow" player for others of the team's player game pieces. In an embodiment where "fast" indicators or designations are permanently attached, the first team typically would need four first team player game pieces (although only three would play on the board, such as board 400) and the second team would also need four second team player game pieces (although only three would play on the board, such as board 400). This is because when one team is on offense it would be able to use two fast players, with one slow player, while on defense it would need two slow players, with one fast player. Thus four player game pieces would be needed for each team (when they are permanently marked in at least one embodiment) although only three play for each team on the board 400. Four player game pieces, for each team can be provided with a game board, such as 400 in a kit for an embodiment of the present application.

However, because of the fact that typically there are only three player game pieces for each team on the top surfaces of the game boards 100 or 400 when playing the game, because of manufacturing defects from player game piece to player game piece (i.e. difficulties in getting the player game pieces to exactly resemble each other), and potential scratches, smudges, irregularities, or other disfigurements which over time would make player game pieces on the same team look somewhat different, it is preferred that the "fast" indicator 720 be a removable or detachable indicator, or otherwise changeable indicator. In this manner it will be virtually impossible for the opposing team to guess which of the other team's player game pieces are "fast" and which are "slow".

Figure 34:
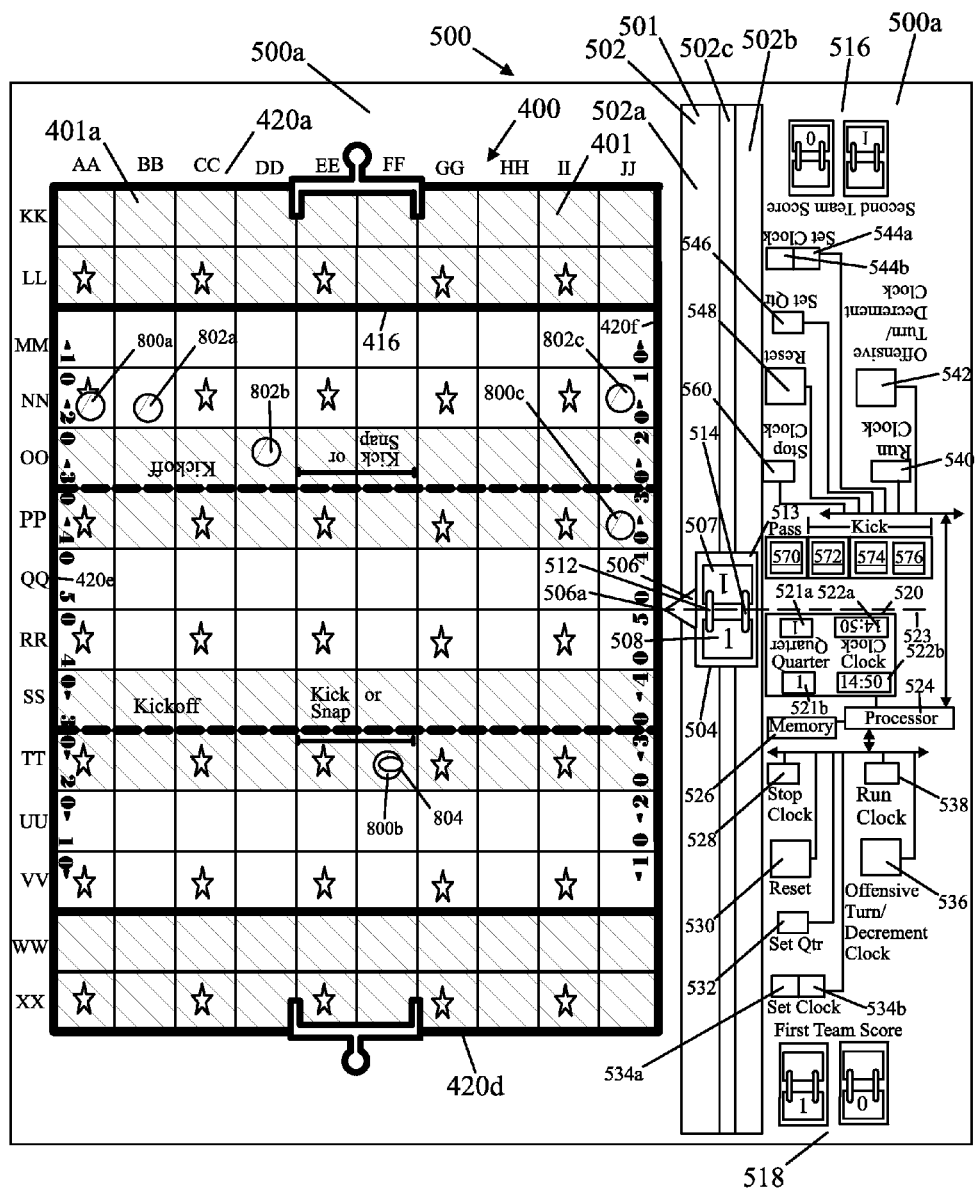
FIG. 34 shows a top view of the game board of FIG. 13 with the three first team player game pieces and the three second team player game pieces, of FIG. 33, placed on the game board in locations different from FIG. 33, and with the clock device at a different time from FIG. 33, in a state different from FIG. 33.
Figure 35:
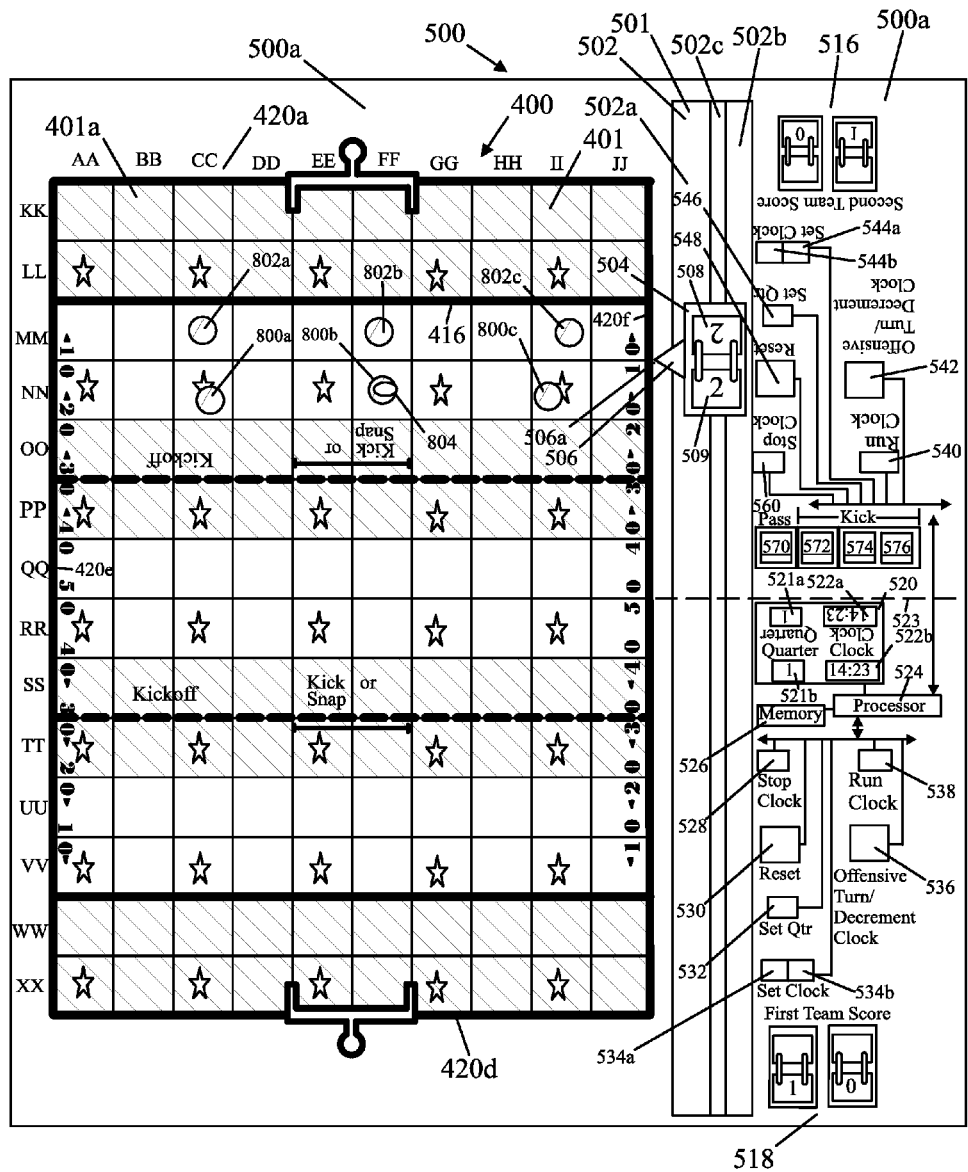
FIG. 35 shows a top view of the game board of FIG. 13 with the three first team player game pieces and the three second team player game pieces of FIG. 33, placed on the game board in locations different from FIG. 33 and FIG. 34, with the sliding device at a different position from FIG. 33 and FIG. 34, and with the clock device at a different time from FIG. 33 and FIG. 34, in a state different from FIG. 33 and FIG. 34.

FIGS. 26A-26C show perspective views of another player game piece 730 which can be used for any of the player game pieces 200*a-c* and 202*a-c* referred to in FIG. 2-10, or 800*a-c* and 802*a-c* of FIGS. 33-35, on any of the game boards 100 or 400. The player game piece 730 may be the same as the player game piece 700 except as will be described. The player game piece 730 may include a peripheral wall 732, a top surface 734, and a bottom surface 736. FIG. 26A shows a top perspective view, while FIGS. 26B and 26C show bottom perspective views from the front and rear respectively. As shown in FIGS. 26B-26C, the peripheral wall 732 may have an inner surface 738 from which an annular ridge or protruding ridge or bump 738*a* extends into a cavity 739 which is surrounded by the peripheral wall 732.

FIGS. 27A-2C show bottom, top, perspective, and cross sectional views of a removable attachment device or indicator 740 for indicating a fast player or fast player game piece. The device or indicator 740 includes a bottom surface 742 and a top surface 749 on which the designation "Fast" is located. The device 740 includes a body portion 744 which having a lip 744*a*, an indentation 744*b*, and a lip 744*c*, all of which may be cylindrical or substantially cylindrical. The device 740 also includes an indented portion 746, and a portion 748, each of which may also be cylindrical or substantially cylindrical. The location of portions 746 and 744*b* are shown by dashed lines in FIG. 27B, but typically would not be visible from that view.

FIG. 28A shows a cross sectional view of the player game piece 730 and the attachment device or indicator 740.

FIG. 28B shows a cross sectional view of the player game piece 730 and the attachment device 740 for indicating a fast player, which has been attached to the player game piece 730. The attachment device 740 has been attached to the game piece 730 so that the annular ridge 738*a* of the game piece 730 lies inside of or fits within the indentation or gap 744*b* of the indicator 744 thereby holding the indicator 740 to the game piece 730. Each of the ridge 738*a* and the indentation 744*b* may be considered to be an attachment device. The indicator 740 may alternatively have a ridge and the game piece 730 may have an indentation. The portions 748, 746, and gap 746*a* shown in FIG. 27B are used to allow the indicator 740 to be easily detached or removed from the game piece 730 to change from "fast" back to "slow" (where "slow" may be indicated by no fast indicator 740 attached to 730). A coin or fingernail may be wedged between portion 748 and 744 to pry the indicator 740 free from the player game piece 730.

Player game piece 730 is shown placed on a surface 401 of the game board 400 so that the indicator 740 is completely hidden and the "fast" indication on surface 749 is hidden. The game piece 730 may be lifted off of the board 400 and the "fast" indicator on surface 749 may be looked at by turning the piece 730 over, without removing the indicator 740.

Figure 30A:
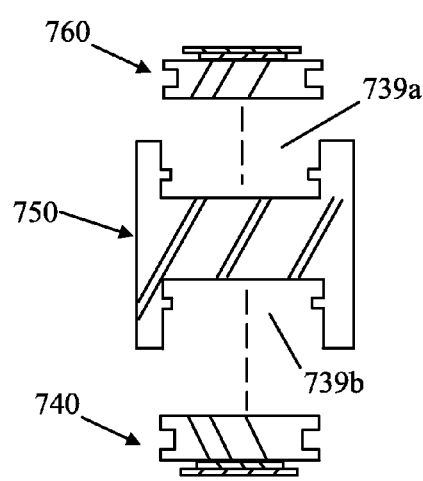
FIG. 30A shows a cross sectional view of the player game piece of FIGS. 29A-D and two attachment devices, one for indicating a fast player and one for indicating a ball device, with the two attachment devices not attached.

FIGS. 29A-29D show front top, rear top, front bottom, and rear bottom perspective views of a player game piece 750 in accordance with another embodiment of the present invention. The player game piece 750 is the same as the player game piece 730 of FIGS. 26A-C, except that an annular ridge 751*a* has also been provided extending from an inner surface 751, into a top cavity 739*a*, which can be used to removably attach a ball designation device, such as 204. The ball designation device 204 or 804 may be or may be replaced by a ball designation device 760 which is shown in FIG. 30A. The ball designation device 760 may have a football appearance symbol or coloring on a top surface 769, but otherwise may be similar to or the same as the indicator or device 740 referred to in FIGS. 27A-D.

The player game piece 750 may include a top surface 754, a peripheral wall 752, and a bottom surface 756. The player game piece 750 may include an annular ridge 758*a* extending from an inner surface 758 into a lower cavity 739*b*.

Figure 30B:
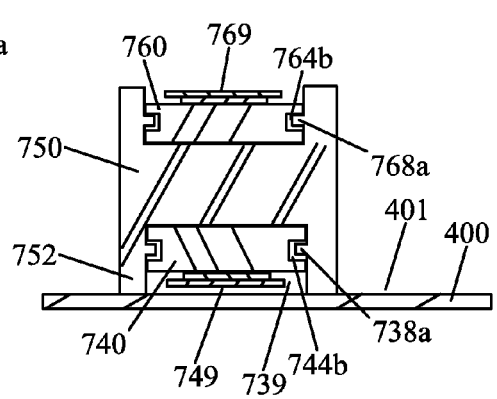
FIG. 30B shows a cross sectional view of the player game piece of FIGS. 29A-D and the two attachment devices shown in FIG. 30A, with the two attachment devices attached.

FIG. 30A shows a cross sectional view of the player game piece 750 of FIGS. 29A-D and two attachment devices 760 and 740, 740 for indicating a "fast" player and 760 for indicating a ball designation device, such as 204, with the two attachment devices not attached. FIG. 30B shows a cross sectional view of the player game piece 750 of FIGS. 29A-D and the two attachment devices, 740 and 760 shown in FIG. 30A, with the two attachment devices attached. As in FIG. 28B, the surface 749 showing the "fast" indication is hidden by a peripheral wall, in this case 752, and the game board 400.

FIGS. 31A-C show top, bottom, and top perspective views of a toggle device 770 which can be set to either indicate a "fast" player or a "slow player". FIG. 31A shows the toggle device 770 is a first state in which it has been set to display a "Fast" designation. FIG. 31C shows the toggle device 770 is a second state in which it has been set to display a "Slow" designation. The toggle device 770 may be a mechanical or electrical toggle switch. The toggle device 770 may include a button or actuator 774 which can be pressed or otherwise actuated to change the designation displayed on a display 772 from one state to another. If the display 772 shows "Fast", pressing the button 774 causes the display 772 to change to showing "Slow". If the display 772 shows "Slow", pressing the button 774 causes the display 772 to change to showing "Fast".

FIG. 32 shows the toggle device 770 of FIGS. 31A-C attached to a player game piece 780. The player game piece 780 may be similar or the same as player game piece 700 except as will be described. The player game piece 780 may have an upper surface 786, a peripheral wall 782, and a lower surface 784. The toggle device 770 may be permanently attached to the lower surface 784. The display 772 is hidden by the wall 782 and the game board 400, when the player game piece 780 with the attached toggle device 770 is placed on the game board 400. The game piece 780 can be lifted off of the game board and the display can be looked at to determine if the game piece 780 has been designated as a fast or slow player.

FIG. 33, shows a top view of the game board 500 which includes the game board 400 previously described with reference to FIGS. 12 and 13, and with first team player game pieces 800a, 800b, and 800c and second team player game pieces 802a, 802b, and 802c, placed on the surface 401 of the board 400, in an initial offensive play setup state. The first team player game pieces 800a-c are placed so that they are on one side of a line of scrimmage, which is the "50" yard line in this case (the line between row QQ and RR), and the second team player game pieces 802a-c are placed so that they are on another side of the line of scrimmage (the "50" yard line) at the start of an offensive play for the first team. In one embodiment, after the offensive team (the team with ball designation device 804) has placed and set its player game pieces, the second team (the team without the ball designation device 804), in one embodiment may change or set its player game pieces. Each of the player game pieces 800a-c and 802a-c have been placed in a separate space of the plurality of spaces 412, so that each piece lies in one space and does not extend into another space of spaces 412.

FIG. 33 shows that the sliding device 504 has been placed in a location on the game board 500 so that the tip or vertex 506a is the triangular piece 506 points to and is adjacent to the "50" yard line, identifying the current line of scrimmage for the current offensive play. FIG. 33 shows quarter displays 521a and 521b (521a is upside down so it can be seen by the person playing the game near end line 420a, while 521b is right side up so it can be seen by the opponent person playing the game near end line 420d). The quarter displays 521a and 512b both show the number "1" indicating the first quarter of an American football game, which typically lasts four quarters. FIG. 33 also shows that clock displays 522a and 522b of display 520 are currently displaying "15:00" which stands for fifteen minutes and zero seconds. Display 522a is upside down and display 522b is right side up to be viewed by persons playing the game, at end line 420a and 420d, respectively.

In at least one embodiment, two or up to two player game pieces of the offensive player game pieces (i.e. two of 800a-c, for the FIGS. 33-35 example) can be designated "fast" players. The offensive player game pieces are the game pieces of the team with the ball or ball designation device 804, which for the offensive play shown in FIGS. 33-35, would be player game pieces 800a-c. For example, player game pieces 800a-b may have been designated as fast players by the first person controlling the first team while 800c may have been designated as slow.

In at least one embodiment, only one player game piece of the defensive player game pieces (i.e. only one of 802a-c in the example of FIGS. 33-35) can be a "fast" player. For example, 802c may have been designated as a fast player by the second person controlling the second team while 802b-c may have been designated as slow. Player game pieces are designated as "fast" or "slow" prior to an offensive play starting and retain whatever designation they started with during an entire offensive play. An offensive play, which may include one or more offensive turns and one or more defensive turns, typically begins with an offensive turn and may end with a defensive player game piece landing on the same space of spaces 412 as the offensive player game piece that is carrying the ball designation device 804, with an incomplete pass, with an offensive player game piece going out of bounds intentionally, with an offensive player game piece that is carrying the ball designation device 804 crossing the goal line of the other team (for a touchdown, for six points for offense), such as goal line 416 in this example, for a touchdown, or with a successful or unsuccessful field goal attempt.

After extensive testing, the inventor has determined that allowing the defense only one "fast" player, while allowing the offensive team two (or up to two) fast players, in a three versus three game, provides a better game because it allows the offense enough of an advantage to be able to pass or run the ball, and be able to score. If the offense and the defense were allowed the same number of fast players, the offense would have a very difficult time scoring and moving the ball.

An individual player game piece, such as any one of player game pieces 800a-c and 802a-c, may have a "fast" designation associated with it or not associated with it. For example any of player game pieces 800a-c or 802a-c may be set to be a "fast" player, may be changed to a "fast" player, or may permanently be a "fast" player, using the appropriate devices or methods, referred to in FIGS. 22A-D, 24A-D, 25, 26A-C, 27A-D, 28A-B, 29A-D, 30A-B, 31A-C, and 32. Each person (of the two human persons playing the game) may set or change his player game pieces to "fast" or "slow" in secret so that the opposing person controlling the other team cannot see which player game pieces of the opposing team are "fast" or "slow" just prior to the player game pieces being placed on the board 400, such as the placement shown in FIG. 33, before a start of an offensive play. Alternatively, each person (of the two human persons playing the game) may switch player game pieces in secret, if the player game pieces are identical or substantially identical except for a "fast" or "slow" designation which is hidden, without the opposing person knowing which players are "fast" or "slow".

The designation for "fast" or "slow" player game piece does not have to include the word "fast" or "slow" but rather can be, for example, a number, letter, color, or anything else to indicate "fast" or "slow". For example a fast player game piece may have the number "1" designation or a blue color in a hidden location, to signify a fast player game piece and a "slow" player game piece may have a number "0" designation or a red color, respectively, in a hidden location to signify a slow player game piece.

In this manner, the first person controlling the first team, does not know that 802c, in this example, is a fast player or that 802a-b are slow players, and the second person controlling the second team does not know that 800a-b are fast players and 800c is a slow player, unless the appropriate piece of 800a-c and 802a-c is picked up off of the board 400 and turned over to reveal the presence or absence of a "fast" or "slow" indicator or designation.

When a person wants to move his player game piece by taking advantage of "fast" spaces, he or she must reveal that his player game piece is a fast player. For example, if the first person wants to move 800a from row RR, column CC in FIG. 33, on one offensive turn, first to the fast space in row PP, column CC, and then to the fast space in row NN, column AA, then the person must show that 800a is a fast player. In at least one embodiment, on a non pass play and non transfer of ball designation device 804 play, on one team's turn, each player game piece can be moved up to two moves, but a fast player can go from one fast space of 414 (marked with star) to another adjacent fast space (marked with star) on one move, while a slow player can only go from one space to the next adjacent space of 412 on one move. Thus effectively a "fast" player can move four spaces of spaces 412 on two fast moves, while a "slow" player can only move two spaces of spaces 412 on two regular or slow moves.

After the offensive team's turn (i.e. the turn of the team with the ball designation device 804), the defensive team can move its players up to two moves each, with its one fast player, in this case 802c being able to make "fast" moves.

FIG. 34 shows a top view of the game board 500 which includes the game board 400 previously described with reference to FIGS. 12 and 13, and with the first team player game pieces 800a, 800b, and 800c and with the second team player game pieces 802a, 802b, and 802c, placed on the surface 401 of the game board 400, so that the pieces 800a-c have been moved from their initial setup state in FIG. 33, after a first offensive turn and a first defensive turn. The offensive player game pieces 800a-b have been moved two moves each, for the first offensive turn, and the defensive player game pieces 802a-b have been moved two moves each, for the first defensive turn, which follows the first offensive turn, to change from the FIG. 33 state to the FIG. 34 state.

The player game piece 800a was designated a "fast" piece and for its first move was moved from row RR, column CC to row PP, column CC (a "fast" move) and then for its second move was moved from row PP, column CC to row NN, column AA (also a "fast" move). The player game piece 800b was moved from row RR, column FF to row SS, column FF for its first move, and from row SS, column FF to row TT, column FF for its second move. Note that although the player game piece 800b was designated a "fast" player game piece or player, it did not take advantage of the fast spaces. The player game piece 800c, which was not designated a fast player, has been moved firstly from row RR, column II, to row QQ, column JJ, and the on its second move from row QQ, column JJ to row PP, column JJ.

After the offensive player game pieces have moved for the first offensive turn, the defensive player game pieces can be moved. The player game piece 802a, which was not designated a "fast" player game piece, has been moved from row NN, column DD to row NN, column CC on its first move, and then to row NN, column BB on its second move. The player game piece 802b, not designated a "fast" player has been moved from row QQ, column FF to row PP, column EE on its first move, and then row OO, column DD on its second move. The player game piece 802c, designated a "fast" player, has been moved from row NN, column HH to row NN, column II on its first move, and then to row NN, column JJ on its second move. Since the player game piece 802c has not made a fast move (i.e. has not gone from one fast space to the next adjacent fast space, vertically, horizontally, or diagonally) without counting intervening non fast spaces) the person controlling player game piece 802c does not have to reveal that 802c is a "fast" player.

In accordance with an embodiment of the present invention, the ball designation device 804 is not allowed to cross the line of scrimmage (which in this example is the "50" yard line), on the first offensive turn of an regular offensive play from scrimmage (i.e. not a punt, kick, field goal attempt, or extra point attempt).

After the first offensive turn and the first defensive turn, shown by the change from the state of FIG. 33 to the state of FIG. 34, if the person controlling the team on offense wants to pass the ball designation device 804 using a passing die, in at least one embodiment, the person controlling the offense uses his or her entire second offensive turn to roll a passing die, such as for example one of passing dies 14A-15B or 20A-21B, and none of the player game pieces 800a-c are moved. The person, controlling the offensive team must indicate, in at least one embodiment, which person is being passed to prior to rolling the passing die (one of 600, 610, 660, or 670). For example, let's say that player game piece 800a is the receiver game piece being passed to in FIG. 34. For the ball designation device 804 to be passed from passer player game piece 800b, which is in the passing zone of rows SS and TT (where spaces of 412 have substantially the same background color or shading), to the receiver player game piece 800a, which is in the passing zone of rows MM and NN, the ball designation device 804 must go from the passing zone of rows SS and TT, to the passing zone of rows QQ and RR, next to the passing zone of rows OO and PP, and finally to the passing zone of rows MM and NN. Every time there is a passing zone transition there is a count of one. So it takes a rolled "3" or more on the particular passing die used (for example one of 600, 610, 660 or 670) for a completed pass from player game piece 800b to player game piece 800a in FIG. 34, i.e. to transfer the ball designation device 804 from 800b to 800a, as moved along the image of football field 401a, in a single direction, through the three passing zone transitions. If the roll of the passing die comes up "2" or less than the pass is incomplete. If the roll of the passing die comes up "X", then the ball is intercepted by the defensive player game piece 802a because the defensive player game piece 802a is in a space of spaces 412 which is adjacent the space the receiver game piece 800a is in. The ball also would have been intercepted if the defensive player game piece 802a was in the space in row MM, column AA, the space in row MM, column BB, the space in row OO, column AA, the space in row OO, column BB, or on top of piece 800a in the space in row NN column AA (a covering move). If no defensive player game piece (of pieces 802a-c) was adjacent to the intended receiver or in the same space as the receiver, then the pass would be incomplete when an "X" is rolled using the appropriate passing die, in at least one embodiment.

Assuming a player game piece, such as 800a in FIG. 34, is in a space of spaces 412 which is next to either sideline 420e or sideline 420f, the player game piece may use its next move to step out of bounds. This may be used to end an offensive play and to prevent a clock time remaining display from running down on a clock device in between offensive plays as will be explained. During an interception teams alternate turns as before, with two moves for each player game piece. Player game pieces, of 800a-c and 802a-c, retain the "fast" or "slow" designations, set at the start of an offensive play, for the duration of the offensive play, which may include one or more offensive turns and one or more defensive turns, and typically would include any interception.

The clock displays 522a and 522b show "14:50" which stands for fourteen minutes and fifty seconds in FIG. 34. In accordance with an embodiment of the present invention, for every offensive turn or for every play or offensive play (and in some embodiments for every offensive turn and for every defensive turn) the clock displays 522a and 522b are changed by a predetermined amount of time, such as a predetermined plurality of seconds. The person controlling the team on offense (or on defense in some embodiments) may press or otherwise actuate the actuator 536 to cause the clock displays 522a and 522b to immediately change by having the time remaining displayed immediately reduced a plurality of seconds. In the example, shown by FIG. 34, the clock displays 522a and 522b have been immediately changed to be ten seconds lower (i.e. clock displays do not count down in response to actuator 536 but are immediately changed from "15:00" to "14:50") in response to the actuation of actuator 536. In at least one embodiment, in contrast to regular American football, the clock displays 522a-b do not run down during an offensive play (i.e. they do not count down one second at a time for every corresponding second in time, during an offensive play), but rather are immediately changed, so they are reduced a predetermined plurality of seconds in response to actuator 536. Instead of actuator 536, the processor 304 may be programmed to automatically immediately reduce the time remaining displayed on displays 522a and 522b by a predetermined plurality of seconds after a play, an offensive play, an offensive turn, or a defensive turn.

In at least one embodiment, the clock displays 522a-b may be run (i.e. count down one second for every second in time) in response to actuation of the run clock actuator 538. The run clock actuator 538 may be actuated to allow the clock to run in between offensive plays if that is typically done in American football (i.e. while no play is occurring, the three offensive and three defensive player game pieces are typically not all on the game board 400 or the play has ended, and the two opponent individuals are deciding where to put their player game pieces initially on the game board 400 before a play or deciding which player game pieces to designate as "fast" or "slow" players). For example, if game piece 800a catches a pass and then defensive game piece 802a lands on the same space as 800a (in row NN, column AA of FIG. 34) then the play is over, and the run clock actuator 538 may be actuated to cause the clock to run since the ball carrier was tackled in bounds, which is when the clock would typically run in American Football. The clock displays 522a and 522b may for example, run down to "14:23" as shown in FIG. 35. The clock displays 522a-b may run down a maximum number of seconds, such as thirty-five seconds, between plays, so that the offense can't delay the game. In at least one embodiment, the person controlling the offensive player game pieces, would actuate or press the stop clock actuator 528 when the offensive player game pieces, such as 800a-c have been initially set for the next offensive play from scrimmage. In this manner the offense can run much less than the maximum, of for example, thirty-five seconds, between offensive plays, by simply quickly setting its offensive player game pieces, in this case 800a-c on the game board 400 for the next offensive play. In at least one embodiment the defense does not control the running of the clock, and how long the defense takes to initially set its game pieces prior to the running of an offensive play, in this case game pieces 802a-c, will not affect the time run off the clock displays 522a-b.

If the offense decided to kick a field goal from the position shown in FIG. 33, then the person controlling the offense may simply roll a regular six side die, such as 620 of FIGS. 16A-B or 630 of FIGS. 17A-B, along with a "½" die such as 640 of FIGS. 18A-B or 650 of FIGS. 19A-B, and move the ball designation device 804 from one side of the line of scrimmage in a straight line in a column in one direction towards a goal post in accordance with the number rolled. Alternatively the "FG/PAT" single die 800 of FIG. 42A can be used. During regular offensive plays (non kicks), the offense may not be allowed to move the ball designation device 804 over the line of scrimmage on the first offensive turn, however during a field goal, the offense, in one embodiment is permitted to move the ball designation device 804 over the line of scrimmage on its first offensive turn, before the defense has moved. In at least one embodiment, on a field goal attempt or play, the defensive player game pieces may not be moved. On a field goal attempt, the ball designation device 804 is moved, in a single direction, along the image of football field 401a, in one column of the board 400, the total of the regular die and the "½" die or the number of the die 800 of FIGS. 42A-B. So for example, if a six and a two come up on the roll of the two dice, then the ball designation device 804 can be moved eight as follows: from the space in row RR, column FF in FIG. 33, to the space in row QQ, column FF, next to the space in row PP, column FF, next to the space in row OO, column FF, next to the space in row NN, column FF, next to the space in row MM, column FF, next to the space in row LL, column FF, next to the space in row KK, column FF, and next over the cross bar 430c for a successful field goal. If a combination roll of seven or less was rolled for regular die (620 or 630) and the "½" die (640 or 650) then the field goal would have been unsuccessful.

Figure 36C:
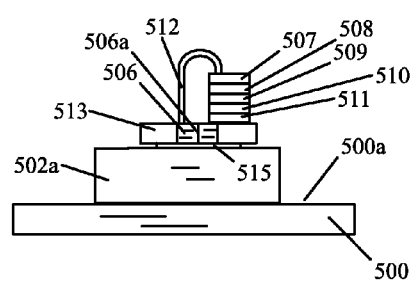
Figure 36D:
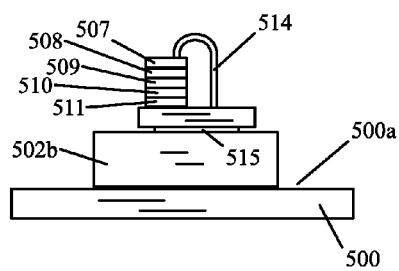

FIGS. 36A-D show front, rear, left side, and right side views of a sliding device 504 for use with the game board 500 of FIG. 13, with the sliding device 504 in a state. The sliding device 504 includes plates 507, 508, 509, 510, and 511, ring, U-shaped or loop shaped fasteners 512 and 514, pointer 506 having edge, tip, or vertex 506a, base plate 513, connecting member 515, and base plate 517. In the state of FIGS. 36A-D plates 507-511 are stacked on top of each other in one stack such that only the top surface 507a of plate 507 can be seen from a top view. As shown in FIG. 37B, the top surface 507a may be blank, i.e. have no number. FIGS. 36A-B also show rails 502a-b, and a portion of game board 500 and surface 500a. FIG. 36C shows rail 502a, a portion of game board 500 and surface 500a, while FIG. 36D shows rails 502b and a portion of game board 500 and surface 500a.

The sliding device 504 slides along slot 502c and rails 502a-b on the top surface 500a of the game board 500 as shown by referring to FIG. 13 and FIGS. 36A-D. The U-shaped connectors or fasteners 512 and 514 hold or connect plates 507, 508, 509, 510, and 511 to portion or base 513. The U-shaped fasteners 512 and 514 and the plates 507-511 may be considered to be part of a football down indicator, which indicates whether the team on offense is on its first, second, third, or fourth down. The portion 513 is connected to intermediate portion or connecting member 515 which is connected to portion or base 517. Portions 515 and 517 may be rectangular plates. In operation, the sliding device 504 can slide parallel to and adjacent to the end line 420f, shown in FIG. 13, so that tip 506a of triangular pointer 506 is moved to be set to point to a particular yard line where the current line of scrimmage is. For example, FIG. 34 shows the pointer 506a or 506 pointing to the "50" yard line while FIG. 35 shows the pointer 506a or 506 pointing to the "10" yard line. After the offensive play which resulted in the ball designation device 804 moving from the "50" yard line to the "10" yard line, has completed, the sliding device 504 is slid from the position in FIG. 34 to the position in FIG. 35, and the down indicator is changed to "2" to indicate second down. In FIG. 34, the "1" printed or otherwise fixed on a surface 507b of plate 507 (shown in FIG. 37C) is shown and the "1" on a surface 508a (shown in FIG. 38B) of plate 508 is shown. In FIG. 35, a "2" on the surface 508b (FIG. 38C) of the plate 508 is shown and a "2" on a surface 509a (FIG. 39B) of the plate 509 is shown.

The rails 502a and 502b shown in FIGS. 34 and 36A-B may be made of a stiff but flexible plastic, such that the rails 502a and 502b hold the sliding device 504 to the board 500, but allow the board 500 to be folded in half, such as along approximately the "50" yard line, and along dashed line 523 shown in FIG. 35. The display 520, including clock displays 522a-b and quarter displays 521a-b, may be located either above or below the line 532, so that the display 520 does not prevent the board 500 from being folded in half.

Figure 36E:
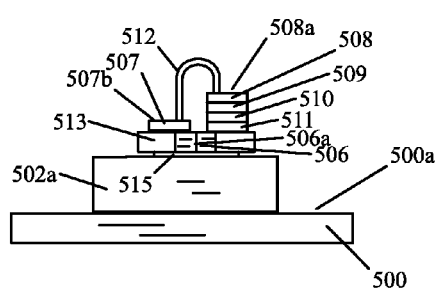
FIG. 36E shows the sliding device of FIGS. 36A-D, with the sliding device in a state different from FIGS. 36A-D.

FIG. 36E shows the sliding device 504 with the sliding device 504 in a state different from FIGS. 36A-D. In FIG. 36E, plate 507 has been flipped over so that now there is a stack with only plate 507 and a stack with plate 508 on top. In the state of FIG. 36E, the surface 507b (FIG. 37C) and the surface 508a (FIG. 38B) are shown from a top view of the board 500 as in FIG. 34. Thus a "first down" is indicated to both the person controlling the one team at end line 420a and an opponent person controlling the opposing team at end line 420b.

Figure 36F:
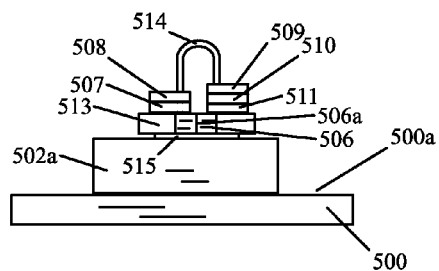
FIG. 36F shows the sliding device of FIGS. 36A-D, with the sliding device in a state different from FIGS. 36A-D and from FIG. 36E.

FIG. 36F shows the sliding device 504 with the sliding device 504 in a state different from FIGS. 36A-D and from FIG. 36E. In FIG. 36F plate 508 has been flipped over so that now there is a stack with plates 507 and 508 (508 on top) and a stack with plate 509 on top. In the state of FIG. 36F, the surface 508b (FIG. 38C) and the surface 509a (FIG. 39B) are shown from a top view of the board 500 as in FIG. 35. Thus a "second down" is indicated to both the person controlling the one team at end line 420a and an opponent person controlling the opposing team at end line 420b. In this manner, the appropriate down (of 1st, 2nd, third, and fourth downs) can be indicated by flipping the appropriate plates of 507-511.

FIGS. 37A-C, FIGS. 38A-C, FIGS. 39A-C, FIGS. 40A-C, and FIGS. 41A-C show side, bottom, and top views of plates 507-511, respectively. Each of plates 507-511 may be a rectangular solid plate, such as made of hard plastic. Plates 507-511 may include top surfaces 507a, 508a, 509a, 510a, 511a, bottom surfaces 507b, 508b, 509b, 510b, and 511b and peripheral walls 507c, 508c, 509c, 510c, and 511c, respectively.

FIGS. 42A-B show perspective views of a six sided die 800 for field goals and extra points. An extra point is also known as a PAT or point after touchdown. FIG. 42A shows a top, front, right side perspective view of the die 800, while FIG. 42B shows a bottom, rear, left side perspective view of the die 800. A designation of "FG/PAT" may be printed or otherwise fixed on each side of the die 800 to identify the die 800 as being used for field goals and extra points. In at least one embodiment, a ball designation device, such as 804, is placed on one side (i.e. above or below the line) of the line of scrimmage, and if a person wishes to try for a field goal, the person, rolls the die 800 an moves the ball designation device 804 in a straight column towards the goal post towards which the person's team is heading. The die 800 would allow a field goal from at most the "40" yard line, between rows PP and QQ in FIG. 33, for a rolled number "7" to go over the cross bar 430c in FIG. 33 if the person's team is trying to score a touchdown over the opponent's goal line 416.

Figure 43A:
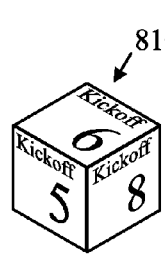
FIGS. 43A-B show perspective views of a six sided die for kickoffs.
Figure 43B:
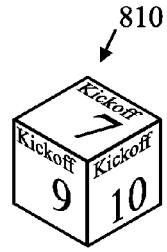

FIGS. 43A-B show perspective views of a six sided die 810 for kickoffs. FIG. 43A shows a top, front, right side perspective view of the die 810, while FIG. 43B shows a bottom, rear, left side perspective view of the die 810. A designation of "Kickoff" may be printed or otherwise fixed on each side of the die 810 to identify the die 810 as being used for kickoffs. In at least one embodiment, a ball designation device, such as 804, is placed in a row on one side of a kickoff line (i.e. above or below the line), such in the row TT behind the dashed kickoff line between rows SS and TT, if a person's team is kicking to the other team and towards the goal line 416. The person "kicks" the ball by rolling the die 810 and moving the ball designation device 804 in either straight column of spaces 412, or a straight diagonal of spaces 412, in a single direction, towards the goal line 416. In at least one embodiment, the person whose team is kicking, has to announce beforehand if they are kicking straight or diagonally. The kickoff numbers on the die 810 will "kick" the ball designation 804 just outside of the image of field 401a for a roll or "10" for a straight directional column line of spaces 412.

Figure 44A:
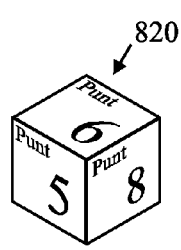
FIGS. 44A-B show perspective views of a six sided die for punts.
Figure 44B:
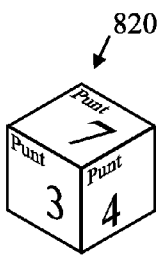

FIGS. 44A-B show perspective views of a six sided die 820 for punts. FIG. 44A shows a top, front, right side perspective view of the die 820, while FIG. 44B shows a bottom, rear, left side perspective view of the die 820. A designation of "Punt" may be printed or otherwise fixed on each side of the die 820 to identify the die 820 as being used for punts. In at least one embodiment, a ball designation device, such as 804, is placed on one side of the line of scrimmage (either above or below as appropriate), and if a person wishes to punt, the person, rolls the die 820, on the first offensive turn, and moves the ball designation device 804 in a straight column of spaces 412 or a diagonal of spaces 412 in a single direction, towards which the person's team is heading. Generally the ball designation device 804 is placed on the side of the line of scrimmage (above or below) for a play which is furthest from the goal line the team running the play needs to go to cross to score a touchdown.

Figure 45A:
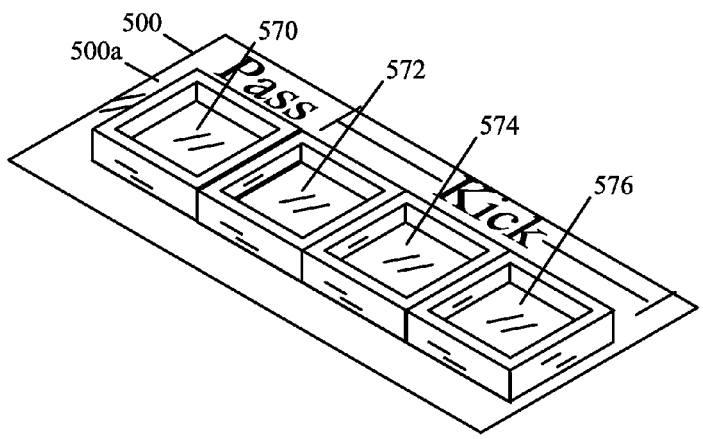
FIG. 45A shows a perspective view of a plurality of die retainer receptacles with the receptacles shown empty.
Figure 45B:
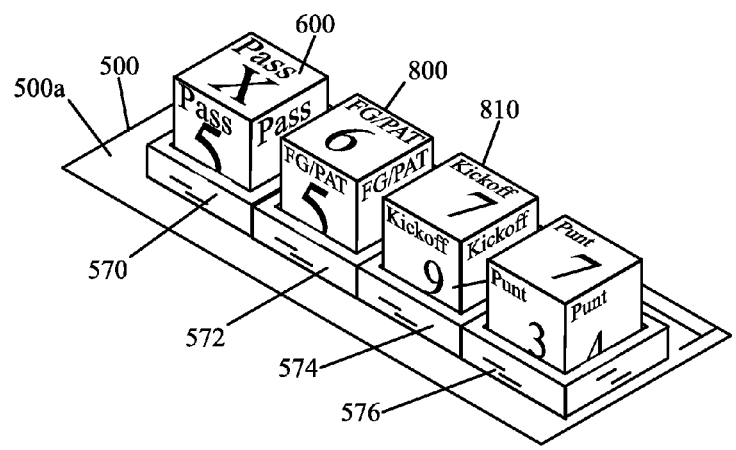
FIG. 45B shows a perspective view of the plurality of die retainer receptacles with dice shown placed in the receptacles.

FIG. 45A shows a perspective view of a plurality of die retainer receptacles 570, 572, 574, and 576, with the receptacles shown empty. Each of the receptacles 570, 572, 574, and 576 may be an indentation or an open square or rectangular box fixed to the surface 500a of the game board 500 into which a die can be snugly fit. The receptacle 570 may be identified by the designation "Pass" (which may printed on or otherwise fixed, such as permanently, on the surface 500a of the board 500) to stand for a passing die, such as 600 of FIGS. 14A-B. The receptacles 572, 574, and 576 may collectively be identified by the designation "Kick" (which may printed on or otherwise fixed, such as permanently, on the surface 500a of the board 500). The die 600, die 800, die 810, and die 820 may be configured to snugly fit in the receptacles 570, 572, 574, and 576, as shown in FIG. 45B, so that dice 600, 800, 810, and 820 do not slide substantially and are held to board 500.

Instead of dice, such as dice 600, 800, 810, and 820, one or more random number generators can be provided. For example, receptacles 570, 572, 574, and 576 may be replaced by actuators in communication with processor 524 of FIG. 33, which when actuated may generate a random number on a computer display 520 on the surface 500a of the board 500. An actuator for "Pass" when actuated may display a random number between "1" and "5" (inclusive) or "X" to simulate the function of the pass die 600. Alternatively, the computer processor 524 may simply move a displayed ball designation device, such as 804, on a computer display to an appropriate receiver, for a pass, if the appropriate number is generated after actuating an actuator for "Pass". If actuators are used for field goals, PATs, kickoffs, and punts, the computer processor 524 may simply move a displayed ball designation device 804 the appropriate number of spaces in response to the actuation of actuator.

Figure 46:
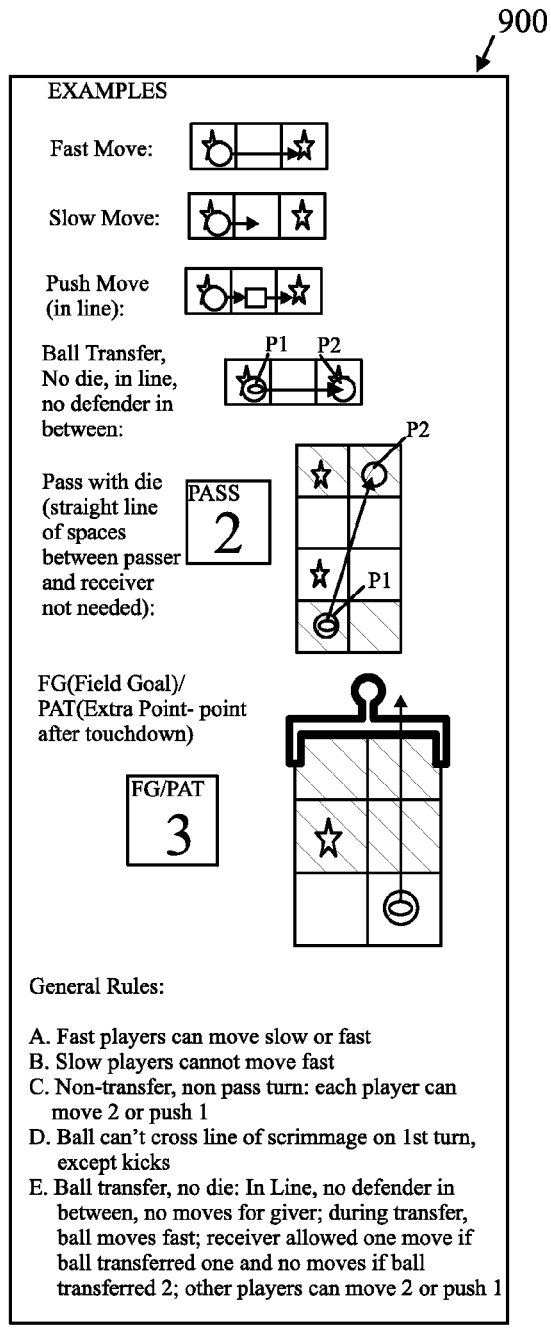
FIG. 46 shows a top view of a sheet of quick reference examples and rules which may be placed on a game board of an embodiment of the present invention.

FIG. 46 shows a top view of a sheet 900 of quick reference examples and rules which may be fixed on the surface 500a of the game board 500 of an embodiment of the present invention. The sheet 900 typically would be fixed to the board 500 at a location different from the football field image 401a, and different from the sliding device 504 (if any), and any clock device, actuators or score keeping devices. Two sheets 900 can be provided, one for the person controlling one team, and one for the person controlling the other team. Alternatively, the sheet 900 can be provided as one or more sheets separate from game board 500.

Figure 47:
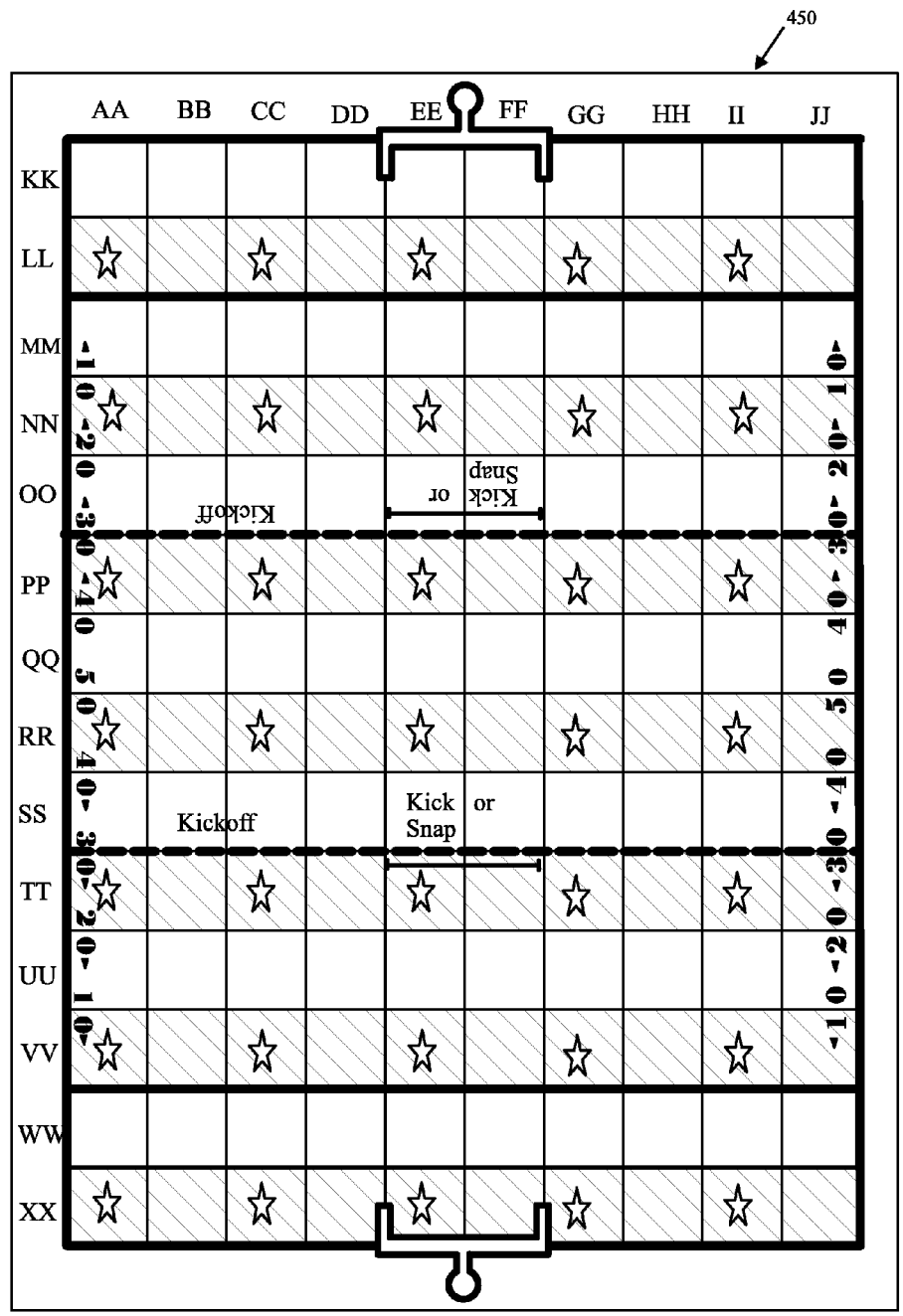
FIG. 47 shows a top view of a game board in accordance with another embodiment of the present invention.

FIG. 47 shows a top view of a game board 450 in accordance with another embodiment of the present invention. The game board 450 may be identical to game board 400 except that game board 450 has passing zones which are one row each. The game board 450 may replace game board 400 on game board 500 on FIG. 13. Spaces of Rows KK, MM, OO, QQ, SS, UU, and WW in FIG. 47 have a no hatched background shading, while spaces of rows LL, NN, PP. RR, TT, V V, and XX have a hatched background shading. In at least one embodiment, if a passer player game piece is in row SS of FIG. 47 and a receiver player game piece is in row QQ, for example, then two passing zone transitions are needed to pass from the passer to the receiver. I.e. the receiver is two rows away from the passer. A passing die or passing dice may be rolled to determine if the pass is completed as previously described with reference to FIGS. 12, 13, and 33-35, except each of the passing zones are now one row, instead of two. In a non-preferred embodiment, the FIG. 1 game board 100 can be used, and rows can be counted between passer and receiver to pass the ball. Alternatively, rows and columns can be counted between passer and receiver to pass the ball. A die or dice can be rolled and the ball designation device 804 can be moved from passer to receiver a number of rows and/or a number of columns. However, using game board 100 for passing can be tedious since it is more difficult to tell how far away a receiver is from a passer if rows and/or columns are counted on the board 100. The game boards 400 and 450, which use passing zones, where each passing zone has spaces having the same characteristic, and adjacent passing zones have spaces of a substantially different characteristic, makes passing less tedious and the game better to play. The game board 400 is in some ways better than game board 450, because there is less counting required, and if a passing die is used, the range required for the passing die is less, which may mean that one die can be used instead of two dice. Also for game board 400, it is much easier for a person playing the game to see, what roll of the die, or random number is required to complete a pass, before the person decides to pass. Otherwise the person may spend a lot of time tediously counting spaces. However, the game board 450 may arguably offer more accuracy in passing.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A computer implemented method of playing an American football game on a game board displayed on a computer display, the game board having an image of a football field comprised of a grid of a plurality of spaces, said grid having a plurality of rows and a plurality of columns, each of the plurality of rows having a subset of spaces of the plurality of spaces, and each of the plurality of columns having a subset of spaces of the plurality of spaces, wherein the football game includes a plurality of player game pieces, which includes a first team comprised of a plurality of first team player game pieces, including a first team first player game piece and a first team second player game piece, and the plurality of player game pieces includes a second team comprised of a plurality of second team player game pieces, including a second team first player game piece and a second team second player game piece and the method comprising:

receiving by at least one computer processor, inputs on a computer interactive device from a first player and a second player to respectively move the plurality of first team player game pieces and the plurality of second team player game pieces;

processing by the at least one computer processor the received inputs to execute the football game and display the football game on the computer display in accordance with the received inputs, the at least one computer processor programmed to allow the first player and second player to respectively move the plurality of first team player game pieces and the plurality of second team player game pieces in a plurality of offensive plays and defensive plays;

as part of a first offensive play, placing the first team first player game piece on a first space of the plurality of spaces, on a first side of a line of scrimmage, so that a first designation is associated with the first team first player game piece, wherein the first designation as associated with the first team first player game piece is hidden from view when the first team first player game piece is placed on the first space, but the first designation as associated with the first team first player game piece is configured so that a first person controlling the first team first player game piece is able to reveal the first designation as associated with the first team first player game piece;

wherein the line of scrimmage is a line between a row of the plurality of rows and another row of the plurality of rows;

as part of the first offensive play, placing the first team second player game piece on the first side of the line of scrimmage and on a second space of the plurality of spaces, different from the first space, so that the first designation is not associated with the first team second player game piece;

as part of the first offensive play, initially placing a football designation device on either the first team first player game piece or the first team second player game piece, so that the football designation device is not hidden from view, wherein the football designation device is different from the first designation;

as part of the first offensive play, placing the second team first player game piece on a second side of the line of scrimmage opposing the first side, and on a third space of the plurality of spaces, different from the first and second spaces, so that the first designation is associated with the second team first player game piece, wherein the first designation as associated with the second team first player game piece is hidden from view when the second team first player game piece is placed on the third space, but the first designation as associated with the second team first player game piece is configured so that a second person controlling the second team first player game piece is able to reveal the first designation as associated with the second team first player game piece;

as part of the first offensive play, placing the second team second player game piece on the second side of the line of scrimmage, and on a fourth space of the plurality of spaces, different from the first, second, and third spaces, so that the first designation is not associated with the second team second player game piece; and wherein the plurality of spaces includes a plurality of fast spaces and a plurality of non fast spaces;

wherein the plurality of fast spaces includes a first, a second, a third, a fourth, a fifth, a sixth, a seventh, and an eighth fast space;

wherein there are one or more non fast spaces between the first fast space and the second fast space in a first straight line;

wherein there are one or more non fast spaces between the third fast space and the fourth fast space in a second straight line;

wherein there are one or more non fast spaces between the fifth fast space and the sixth fast space in a third straight line;

wherein there are one or more non fast spaces between the seventh fast space and the eighth fast space in a fourth straight line;

wherein each fast space of the plurality of fast spaces has a first graphic, such that any space of the plurality of spaces having the first graphic is a fast space; and wherein each non fast space of the plurality of non fast spaces does not have the first graphic, such that any space of the plurality of spaces not having the first graphic is a non fast space; and further comprising during a first team first offensive turn as part of the first offensive play, moving each of the first team player game pieces a predetermined number of moves;

wherein the predetermined number of moves for the first team first player game piece includes moving the first team first player game piece from the first fast space to the second fast space, in the first straight line, and counting this movement as one move, without counting one or more non fast spaces that are between the first fast space and the second fast space in the first straight line; and wherein the predetermined number of moves for the first team second player game piece include moving the first team second player game piece from the third fast space to the fourth fast space, in the second straight line, and counting this movement as more than one move, by counting one or more non fast spaces that are between the third fast space and the fourth fast space in the second straight line;

further comprising during a second team first defensive turn, which follows the first team first offensive turn, as part of the first offensive play, moving each of the second team player game pieces the predetermined number of moves;

wherein the predetermined number of moves for the second team first player game piece include moving the second team first player game piece from the fifth fast space to the sixth fast space, in the third straight line, and counting this movement as one move, without counting one or more non fast spaces that are between the fifth fast space and the sixth fast space in the third straight line; and wherein the predetermined number of moves for the second team second player game piece include moving the second team second player game piece from the seventh fast space to the eighth fast space, in the fourth straight line, and counting this movement as more than one move, by counting one or more non fast spaces that are between the seventh fast space and the eighth fast space in the fourth straight line;

wherein the at least one computer processor alternates turns between the first team and the second team, until one of the plurality of second team player game pieces occupies the same space of the plurality of spaces as the football designation device which ends the first offensive play.

2. The method of claim 1 wherein
the first designation as associated with the first team first player game piece is configured so that a first person controlling the first team first player game piece by a computer interactive device is able to reveal the first designation as associated with the first team first player game piece; and the first designation as associated with the second team first player game piece is configured so that a second person controlling the second team first player game piece by a computer interactive device is able to reveal the first designation as associated with the second team first player game piece.

3. The method of claim 1 wherein
the first team first player game piece is placed on the first space by being displayed on the computer display;

the first team second player game piece is placed on the second space by being displayed on the computer display;

the second team first player game piece is placed on the third space by being displayed on the computer display;

the second team second player game piece is placed on the fourth space by being displayed on the computer display;

the football designation device is placed on either the first team first player game piece or the first team second player game piece by being displayed on the computer display;

the first designation as associated with the first team first player game piece is configured so that it is able to be revealed by the first person using a computer interactive device to cause the first designation as associated with the first team first player game piece to be displayed on the computer display; and the first designation as associated with the second team first player game piece is able to be revealed by the second person using a computer interactive device to cause the first designation as associated with the second team first player game piece to be displayed on the computer display.

4. The method of claim 1
wherein the grid includes a plurality of passing zones;

wherein each passing zone of the plurality of passing zones includes one or more adjacent rows of the plurality of rows;

wherein spaces of the plurality of spaces in each passing zone have a substantially same characteristic as spaces in the same passing zone, and a substantially different characteristic from spaces in adjacent passing zones of the plurality of passing zones;

wherein movement of the ball designation device, along the image of the football field of the game board, from one passing zone of the plurality of passing zones to an adjacent passing zone of the plurality of passing zones is a passing zone transition;

the method further comprising:
generating a random number; and
using the at least one computer processor to move the football designation device from a first team passer player game piece of the plurality of first team player game pieces to a first team receiver player game piece of the plurality of first team player game pieces if the random number satisfies a mathematical relationship with respect to a number of passing zone transitions when moving, in a first direction, the football designation device along the image of the football field of the game board from a first location on the game board on which the first team passer player game piece is located to a second location on the game board on which the first team receiver player game piece is located;

wherein the first team passer player game piece and the first team receiver player game piece are not located in the same row of the plurality of rows, are not located in the same column of the plurality of columns, and there is not a straight diagonal line of spaces from and including a space at the first location of the first team passer player game piece to a space at the second location of the first team receiver player game piece;

wherein the first team passer player game piece is the first team first player game piece and the first team receiver player game piece is the first team second player game piece, if the football designation device was initially placed on the first team first player game piece; and wherein the first team receiver player game piece is the first team second player game piece and the first team receiver player game piece is the first team first player game piece, if the football designation device was initially placed on the first team second player game piece.

5. The method of claim 1 further comprising after the first offensive play has ended:
- using the at least one computer processor to alter the first team first player game piece, in response to inputs via a computer interactive device, so that the first designation is no longer associated with the first team first player game piece;
- using the at least one computer processor to alter the second team first player game piece, in response to inputs via a computer interactive device, so that the first designation is no longer associated with the second team first player game piece;
- using the at least one computer processor to alter the first team second player game piece, in response to inputs via a computer interactive device, so that the first designation is associated with the first team second player game piece;
- using the at least one computer processor to alter the second team second player game piece, in response to inputs via a computer interactive device, so that the first designation is associated with the second team second player game piece;
- as part of a second offensive play, using the at least one computer processor to place the first team second player game piece on a fifth space of the plurality of spaces, on a first side of a second line of scrimmage, so that the first designation is associated with the first team second player game piece, wherein the first designation as associated with the first team second player game piece is hidden from view when the first team second player game piece is placed on the fifth space, but the first designation as associated with the first team second player game piece is configured so that a first person controlling the first team second player game piece is able to reveal the first designation as associated with the first team second player game piece;
    - as part of the second offensive play, using the at least one computer processor to place the first team first player game piece on the first side of the second line of scrimmage and on a sixth space of the plurality of spaces, different from the fifth space, so that the first designation is not associated with the first team first player game piece;
- as part of the second offensive play, using the at least one computer processor to initially place a football designation device on either the first team first player game piece or the first team second player game piece, so that the football designation device is not hidden from view, wherein the football designation device is different from the first designation;
- as part of the second offensive play, using the at least one computer processor to place the second team second player game piece on a second side of the second line of scrimmage opposing the first side, and on a seventh space of the plurality of spaces, different from the fifth and sixth spaces, so that the first designation is associated with the second team second player game piece, wherein the first designation as associated with the second team second player game piece is hidden from view when the second team second player game piece is placed on the seventh space, but the first designation as associated with the second team second player game piece is configured so that a second person controlling the second team second player game piece is able to reveal the first designation as associated with the second team second player game piece; and
- as part of the second offensive play using the at least one compute processor to place the second team first player game piece on the second side of the second line of scrimmage, and on an eighth space of the plurality of spaces, different from the fifth, sixth, and seventh spaces, so that the first designation is not associated with the second team first player game piece.

6. The method of claim 1 further comprising actuating an actuator for the first offensive play to cause a time remaining displayed on a clock device to immediately change from a first time remaining to a second time remaining, wherein the difference between the first time remaining and the second time remaining is a predetermined plurality of seconds.

7. The method of claim 6 further comprising causing the time remaining displayed on the clock device to count down, in between the first offensive play and a second offensive play, so that one second is taken off the time remaining displayed on the clock device for each second that goes by.

8. The method of claim 1 further comprising generating a random number on a field goal attempt for the first team;

using the at least one computer processor to move the ball designation device, a number of the plurality of spaces of the image of the football field, in a column of the plurality of columns of the image of the football field, based on the random number, until the ball designation device crosses an image of a cross bar of an image of a goal post;

and when the ball designation device crosses the image of the cross bar of the image of the goal post, using the at least one computer processor to increase a score for the first team on a score keeping device by three points.

9. An apparatus comprising at least one computer processor;
at least one computer memory;
a computer display; and
a computer interactive device;

wherein at least one computer processor is programmed by a computer program stored in the at least one computer memory to display a game board, on the computer display, the game board having an image of a football field, wherein the football field includes grid of a plurality of spaces, said grid having a plurality of rows and a plurality of columns, each of the plurality of rows having a subset of spaces of the plurality of spaces, and each of the plurality of columns having a subset of spaces of the plurality of spaces;

wherein the at least one computer processor is programmed by a computer program stored in the at least one computer memory to display on the computer display a plurality of first team player game pieces, including a first team first player game piece and a first team second player game piece;

wherein the at least one computer processor is programmed by a computer program stored in the at least one computer memory to display on the computer display a plurality of second team player game pieces, including a second team first player game piece and a second team second player game piece;

wherein the at least one computer processor is programmed by a computer program stored in the at least one computer memory to associate, in response to a user using the computer interactive device, a first designation with the first team first player game piece and as associated the first designation is hidden from view when the first team first player game piece is placed on a first space of the plurality of spaces, but the first designation as associated with the first team first player game piece is configured so that a first person controlling the first team first player game piece is able to reveal the first designation as associated with the first team first player game piece;

wherein the first designation is not associated with the first team second player game piece;

wherein the at least one computer processor is programmed by a computer program stored in the at least one computer memory to associate, in response to a user using the computer interactive device, the first designation with the second team first player game piece and as associated the first designation is hidden from view when the second team first player game piece is placed on a second space of the plurality of spaces, but the first designation as associated with the second team first player game piece is configured so that a second person controlling the second team first player game piece is able to reveal the first designation as associated with the second team first player game piece;

wherein the first designation is not associated with the second team second player game piece; and wherein the at least one computer processor is programmed by a computer program stored in the at least one computer memory to display on the computer display a football designation device, which is different from the first designation, wherein the football designation device is configured to be placed on any one of the plurality of first team player game pieces or any one of the plurality of second team player game pieces so that the football designation device is not hidden from view;

wherein the plurality of spaces includes a plurality of fast spaces and a plurality of non fast spaces;

wherein the plurality of fast spaces includes a first, a second, a third, a fourth, a fifth, a sixth, a seventh, and an eighth fast space;

wherein there are one or more non fast spaces between the first fast space and the second fast space in a first straight line;

wherein there are one or more non fast spaces between the third fast space and the fourth fast space in a second straight line;

wherein there are one or more non fast spaces between the fifth fast space and the sixth fast space in a third straight line;

wherein there are one or more non fast spaces between the seventh fast space and the eighth fast space in a fourth straight line;

wherein each fast space of the plurality of fast spaces has a first graphic, such that any space of the plurality of spaces having the first graphic is a fast space; and wherein each non fast space of the plurality of non fast spaces does not have the first graphic, such that any space of the plurality of spaces not having the first graphic is a non fast space.

10. The apparatus of claim 9 further comprising wherein the first team first player game piece is configured by the at least one computer processor so that it can be altered by a user using the computer interactive device to associate or disassociate the first designation with the first team first player game piece;

wherein the first team second player game piece is configured by the at least one computer processor so that it can be altered by a user using the computer interactive device to associate or disassociate the first designation with the first team second player game piece;

wherein the second team first player game piece is configured by the at least one computer processor so that it can be altered by a user using the computer interactive device to associate or disassociate the first designation with the second team first player game piece;

wherein the second team second player game piece is configured by the at least one computer processor so that it can be altered by a user using the computer interactive device to associate or disassociate the first designation with the second team second player game piece;

wherein the first designation when associated with any of the first team first player game piece, the first team second player game piece, the second team first player game piece, or the second team second player game piece is hidden from view when the first team first player game piece, the first team second player game piece, the second team first player game piece, and the second team second player game piece are placed on first, second, third, and fourth spaces, respectively, of the plurality of spaces, but the first designation as associated with any of the first team first player game piece, the first team second player game piece, the second team first player game piece, or the second team second player game piece is configured so that a person controlling the first team first player game piece, the first team second player game piece, the second team first player game piece, or the second team second player game piece by using the computer interactive device is able to reveal the first designation as associated with the first team first player game piece, first team first player game piece, the first team second player game piece, the second team first player game piece, or the second team second player game piece, respectively.

11. The apparatus of claim 9 wherein the grid includes a plurality of passing zones;

wherein each passing zone of the plurality of passing zones includes one or more adjacent rows of the plurality of rows;

wherein spaces of the plurality of spaces in each passing zone have a substantially same characteristic as spaces in the same passing zone, and a substantially different characteristic from spaces in adjacent passing zones;

wherein movement of the ball designation device, along the image of the football field of the game board, from one passing zone of the plurality of passing zones to an adjacent passing zone of the plurality of passing zones is a passing zone transition;

the method further comprising:

generating a random number; and using the at least one computer processor to move the football designation device from a first team passer player game piece of the plurality of first team player game pieces to a first team receiver player game piece of the plurality of first team player game pieces if the random number satisfies a mathematical relationship with respect to a number of passing zone transitions when moving, in a first direction, the football designation device along the image of the football field of the game board from a first location on the game board on which the first team passer player game piece is located to a second location on the game board on which the first team receiver player game piece is located;

wherein the first team passer player game piece and the first team receiver player game piece are not located in the same row of the plurality of rows, are not located in the same column of the plurality of columns, and there is not a straight diagonal line of spaces from and including a space at the first location of the first team passer player game piece to a space at the second location of the first team receiver player game piece;

wherein the first team passer player game piece is the first team first player game piece and the first team receiver player game piece is the first team second player game piece, if the football designation device was initially placed on the first team first player game piece; and wherein the first team passer player game piece is the first team second player game piece and the first team receiver player game piece is the first team first player game piece, if the football designation device was initially placed on the first team second player game piece.

12. The apparatus of claim 9 wherein the grid includes a plurality of passing zones;

wherein each passing zone of the plurality of passing zones includes one or more adjacent rows of the plurality of rows; and wherein spaces of the plurality of spaces in each passing zone have a substantially same characteristic as spaces in the same passing zone, and a substantially different characteristic from spaces in adjacent passing zones of the plurality of passing zones.

13. The apparatus of claim 9 further comprising displaying a clock on the computer display; and wherein the clock displays a time remaining on the computer display which is immediately changed from a first time remaining to a second time remaining in response to the computer processor, wherein the difference between the first time remaining and the second time remaining is a predetermined plurality of seconds.

14. The apparatus of claim 9 further comprising the plurality of fast spaces and the plurality of non fast spaces are arranged so that the columns of the plurality of columns alternate between having fast spaces and having no fast spaces;

wherein in each row of the plurality of rows which has fast spaces, fast spaces alternate with non fast spaces;

wherein in each column of the plurality of columns which has fast spaces, fast spaces alternate with non fast spaces; and and wherein there are at least two rows of the plurality of rows which have fast spaces, and at least two columns of the plurality of columns which have fast spaces.

15. The apparatus of claim 9 wherein the first team first player game piece, the first team second player game piece, the second team first player game piece, and the second team second player game piece are displayed on different spaces from each other, on the game board on the computer display by the computer processor in accordance with the computer program stored in the computer memory;

the football designation device is displayed on one of the plurality of spaces of the game board on the computer display by the computer processor in accordance with the computer program stored in the computer memory; and the first designation as associated with the first team first player game piece is configured so that the first designation as associated with the first team first player game piece is able to be revealed by the first person using a computer interactive device to cause the first designation as associated with the first team first player game piece to be displayed on the computer display; and the first designation as associated with the second team first player game piece is configured so that the first designation as associated with the second team first player game piece is able to be revealed by the second person using a computer interactive device to cause the first designation as associated with the second team first player game piece to be displayed on the computer display.

16. The apparatus of claim 9 further comprising a first random result generator, wherein the first random result generator is labeled with the word "pass" or a synonym of the word "pass";

a second random result generator, wherein the second random result generator is labeled with the word "kick" or a synonym of the word "kick";

wherein the first random result generator is configured to produce a first result of a first range of results which include a first range of integer numbers; and wherein the second random result generator is configured to product a second result of a second range of results which include a second range of integer numbers which differs from the first range of integer numbers.

17. A computer implemented method of playing a football game on a game board displayed on a computer display, the game board having an image of a football field comprised of a grid of a plurality of spaces, said grid having a plurality of rows and a plurality of columns, each of the plurality of rows having a subset of spaces of the plurality of spaces, and each of the plurality of columns having a subset of spaces of the plurality of spaces, wherein the football game includes a plurality of player game pieces, which includes a first team comprised of a plurality of first team player game pieces, including a first team first player game piece and a first team second player game piece, and the plurality of player game pieces includes a second team comprised of a plurality of second team player game pieces, including a second team first player game piece and a second team second player game piece and the method comprising:

receiving by at least one computer processor, inputs on a computer interactive device from a first player and a second player to respectively move the plurality of first team player game pieces and the plurality of second team player game pieces;

processing by the at least one computer processor the received inputs to execute the football game and display the football game on the computer display in accordance to the received inputs, wherein the football game is played by:

placing the first team first player game piece on a first space of the plurality of spaces, on a first side of a line of scrimmage;

wherein the line of scrimmage is a line between a row of the plurality of rows and another row of the plurality of rows;

placing the first team second player game piece on the first side of the line of scrimmage and on a second space of the plurality of spaces, different from the first space;

initially placing a football designation device on either the first team first player game piece or the first team second player game piece;

placing the second team first player game piece on a second side of the line of scrimmage opposing the first side, and on a third space of the plurality of spaces, different from the first and second spaces;

placing the second team second player game piece on the second side of the line of scrimmage, and on a fourth space of the plurality of spaces, different from the first, second, and third spaces;

wherein the grid includes a plurality of passing zones;

wherein each passing zone of the plurality of passing zones includes one or more adjacent rows of the plurality of rows;

wherein spaces of the plurality of spaces in each passing zone have a substantially same characteristic as spaces in the same passing zone, and a substantially different characteristic from spaces in adjacent passing zones;

wherein movement of the ball designation device, along the image of the football field of the game board, from one passing zone of the plurality of passing zones to an adjacent passing zone of the plurality of passing zones is a passing zone transition;

the method further comprising:

generating a random number; and moving the football designation device from a first team passer player game piece of the plurality of first team player game pieces to a first team receiver player game piece of the plurality of first team player game pieces if the random number satisfies a mathematical relationship with respect to a number of passing zone transitions when moving, in a first direction, the football designation device along the image of the football field of the game board from a first location on the game board on which the first team passer player game piece is located to a second location on the game board on which the first team receiver player game piece is located;

wherein the first team passer player game piece and the first team receiver player game piece are not located in the same row of the plurality of rows, are not located in the same column of the plurality of columns, and there is not a straight diagonal line of spaces from and including a space at the first location of the first team passer player game piece to a space at the second location of the first team receiver player game piece;

wherein the first team passer player game piece is the first team first player game piece and the first team receiver player game piece is the first team second player game piece, if the football designation device was initially placed on the first team first player game piece; and wherein the first team passer player game piece is the first team second player game piece and the first team receiver player game piece is the first team first player game piece, if the football designation device was initially placed on the first team second player game piece.

* * * * *